US011350445B2

(12) United States Patent
Fujishiro et al.

(10) Patent No.: US 11,350,445 B2
(45) Date of Patent: May 31, 2022

(54) COMMUNICATION CONTROL METHOD FOR CONTROLLING A USER EQUIPMENT TO PERFORM EARLY DATA TRANSMISSION

(71) Applicant: KYOCERA Corporation, Kyoto (JP)

(72) Inventors: Masato Fujishiro, Yokohama (JP); Chiharu Yamazaki, Tokyo (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 117 days.

(21) Appl. No.: 16/786,743

(22) Filed: Feb. 10, 2020

(65) Prior Publication Data
US 2020/0187245 A1    Jun. 11, 2020

Related U.S. Application Data

(63) Continuation of application No. PCT/JP2018/029342, filed on Aug. 6, 2018.
(Continued)

(51) Int. Cl.
*H04W 74/00*    (2009.01)
*H04W 76/27*    (2018.01)
(Continued)

(52) U.S. Cl.
CPC ..... *H04W 74/002* (2013.01); *H04W 52/0229* (2013.01); *H04W 72/0413* (2013.01);
(Continued)

(58) Field of Classification Search
CPC .............. H04W 74/002; H04W 76/27; H04W 52/0229; H04W 72/0413; H04W 72/14; H04W 74/0833

See application file for complete search history.

(56) References Cited

U.S. PATENT DOCUMENTS

2012/0294146 A1    11/2012 Wu
2014/0128029 A1    5/2014 Fong et al.
(Continued)

FOREIGN PATENT DOCUMENTS

EP    3 267 732 A1    1/2018
JP    2010-232811 A    10/2010
(Continued)

OTHER PUBLICATIONS

R2-1706685 "RACH Configuration for NR" Interdigital 3GPP WG2#NR AdHoc#2 Jun. 27-29, 2017 (Year: 2017).*
(Continued)

*Primary Examiner* — Jeffrey M Rutkowski
*Assistant Examiner* — Basil Ma
(74) *Attorney, Agent, or Firm* — Studebaker & Brackett PC

(57) ABSTRACT

A communication control method in a mobile communication system, comprises a step A of transmitting, by a first radio communication device to a second radio communication device, information on whether to perform an early data transmission which transmits data using a predetermined message during a random access procedure, and a step B of determining, by the second radio communication device, after the second radio communication device receives the information, whether to perform the early data transmission based on the received information. The first radio communication device is one of a radio terminal and a base station, and the second radio communication device is the other of the radio terminal and the base station. The step A is performed earlier than transmission timing of the predetermined message.

9 Claims, 30 Drawing Sheets

Related U.S. Application Data

(60) Provisional application No. 62/652,342, filed on Apr. 4, 2018, provisional application No. 62/630,915, filed on Feb. 15, 2018, provisional application No. 62/627,313, filed on Feb. 7, 2018, provisional application No. 62/586,981, filed on Nov. 16, 2017, provisional application No. 62/564,430, filed on Sep. 28, 2017, provisional application No. 62/560,775, filed on Sep. 20, 2017, provisional application No. 62/543,469, filed on Aug. 10, 2017.

(51) Int. Cl.
  *H04W 52/02* (2009.01)
  *H04W 72/04* (2009.01)
  *H04W 72/14* (2009.01)
  *H04W 74/08* (2009.01)

(52) U.S. Cl.
  CPC ....... *H04W 72/14* (2013.01); *H04W 74/0833* (2013.01); *H04W 76/27* (2018.02)

(56) References Cited

U.S. PATENT DOCUMENTS

| | | | |
|---|---|---|---|
| 2016/0014815 A1* | 1/2016 | Vajapeyam | H04W 4/70 370/329 |
| 2016/0374048 A1* | 12/2016 | Griot | H04W 68/005 |
| 2017/0099660 A1* | 4/2017 | Oh | H04L 5/0064 |
| 2017/0230883 A1 | 8/2017 | Dang | |
| 2018/0035342 A1 | 2/2018 | Fujishiro et al. | |
| 2018/0324854 A1* | 11/2018 | Phuyal | H04W 74/085 |

FOREIGN PATENT DOCUMENTS

| | | |
|---|---|---|
| JP | 2013-528985 A | 7/2013 |
| JP | 2014-522199 A | 8/2014 |
| JP | 2016-537938 A | 12/2016 |
| WO | 2016/163545 A1 | 10/2016 |
| WO | 2016/204985 A1 | 12/2016 |

OTHER PUBLICATIONS

R1-1708800 Qualcomm "Early data transmission" 3GPP WG1 #89 Hangzhou May 2017 (Year: 2017).*

Ericsson; "Early Data Transmission for LTE-MTC"; 3GPP TSG-RAN WG1 #89s; R1-1706886; May 15-19, 2017; pp. 1-9; Hangzhou, China.

LG Electronics; "Data Transmission During Random Access Procedure in MTC" 3GPP TSG RAN WG1 Meeting #89; R1-1707570; May 15-19, 2017; pp. 1-5; Hangzhou, P.R. China.

LG Electronics; "Data Transmission During Random Access Procedure in NB-IoT" 3GPP TSG RAN WG1 Meeting #92bis; R1-1804522; Apr. 16-20, 2018; pp. 1-9; Sanya, China.

Interdigital Inc.; "RACH Configuration for NR"; 3GPP TSG-RAN WG2#NR AdHoc#2; R2-1706685; Jun. 27-29, 2017; pp. 1-3; Qingdao, China.

Huawei et al.; "Early DL Data Transmission"; 3GPP TSG RAN WG2 Meeting #101; R2-1802222; Feb. 26-Mar. 2, 2018; pp. 1-6; Athens, Greece.

Ericsson; "Details on PRACH Partitioning for EDT"; 3GPP TSG RAN WG2 #101; R2-1803078; Feb. 26-Mar. 2, 2018; pp. 1-11; Athens, Greece.

Intel Corporation; "[101#58][NB-IoT/MTC R15] EDT Security Issues"; 3GPP TSG RAN WG2 Meeting #101bis; R2-1804899; Apr. 16-20, 2018; pp. 1-34; Sanya, China.

Huawei; "Report of the Email Discussion [101#57][NB-IoT/MTC R15] EDT Remaining Issues"; 3GPP TSG-RAN WG2 Meeting #101 bis; R2-1805078; Apr. 16-20, 2018; pp. 1-25; Sanya, China.

VIA Telecom; Access Procedure Enhancements for MTC Applications; 3GPP TSG-RAN WG2 Meeting #70bis; R2-103968; Jun. 28-Jul. 2, 2010; total 4 pages; Stockholm, Sweden.

Qualcomm Incorporated, "Early data transmission", 3GPP TSG-RAN WG1 Meeting #89, R1-1708800, May 15-19, 2017, total 10 pages, Hangzhou, China.

* cited by examiner

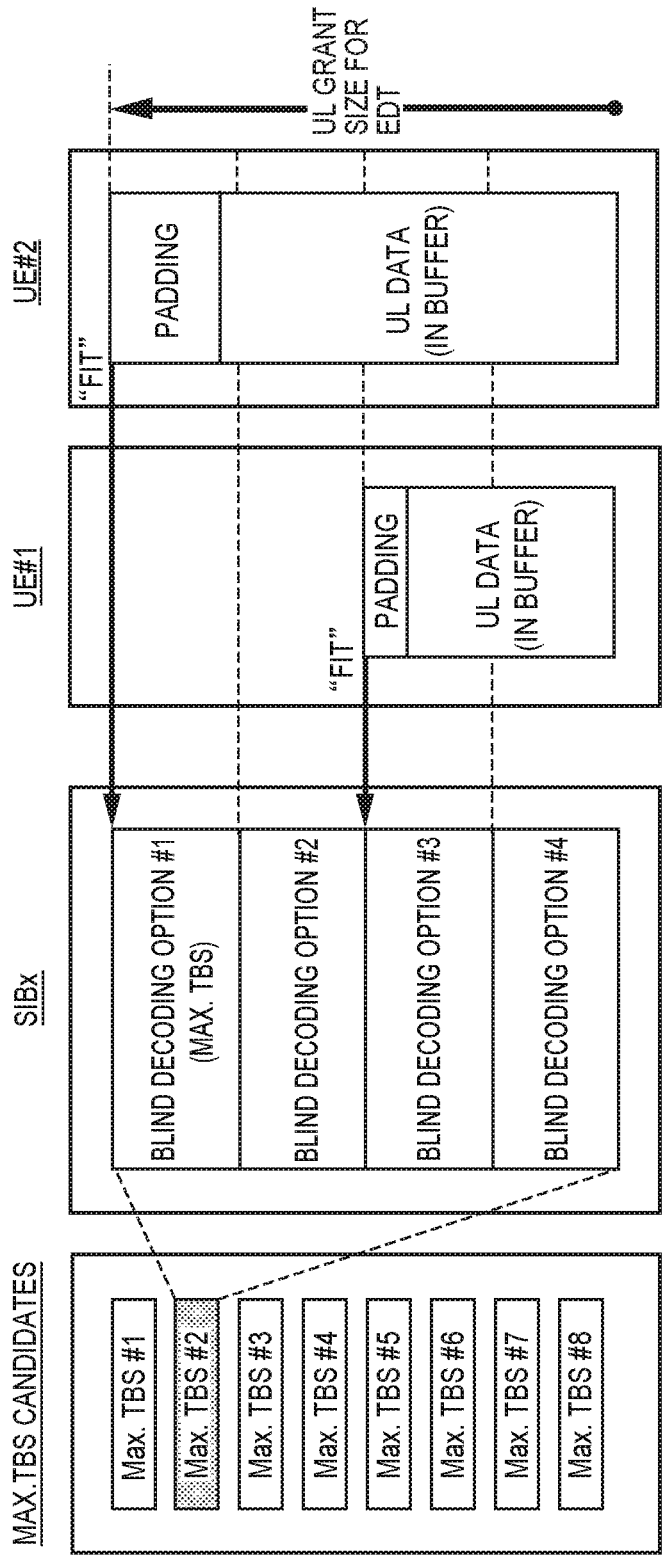

COMMUNICATION CONTROL METHOD FOR CONTROLLING A USER EQUIPMENT TO PERFORM EARLY DATA TRANSMISSION

RELATED APPLICATIONS

The present application claims the benefits of priorities of U.S. Provisional Application No. 62/543,469 (filed on Aug. 10, 2017), U.S. Provisional Application No. 62/560,775 (filed on Sep. 20, 2017), U.S. Provisional Application No. 62/564,430 (filed on Sep. 28, 2017), U.S. Provisional Application No. 62/586,981 (filed on Nov. 16, 2017), U.S. Provisional Application No. 62/627,313 (filed on Feb. 7, 2018), U.S. Provisional Application No. 62/630,915 (filed on Feb. 15, 2018), and U.S. Provisional Application No. 62/652,436 (filed on Apr. 4, 2018). The content of which is incorporated by reference herein in their entirety.

TECHNICAL FIELD

The present invention relates to a communication control method in a mobile communication system.

BACKGROUND ART

In recent years, radio terminals targeting machine type communication (MTC) and Internet of Things (IoT) services that perform communication without human intervention have attracted attention. Such a radio terminal is required to realize cost reduction, coverage expansion, and low power consumption. For this reason, in 3rd generation partnership project (3GPP), a category of a new radio terminal whose transmission/reception bandwidth is limited to only a part of the system transmission/reception bandwidth is specified.

SUMMARY

A communication control method according to one embodiment is a method in a mobile communication system. The communication control method comprises steps of: transmitting, by a base station, a system information block (SIB) indicating that an allowable amount of data allowed to be transmitted in an early data transmission which transmits uplink user data using message 3 during a random access procedure; receiving, by a radio terminal in an RRC idle mode, the SIB; and determining, by the radio terminal, to perform the early data transmission when an amount of transmission data to the base station is less than or equal to the allowable amount of data indicated by the SIB.

The communication control method may further comprises steps of: selecting, by the radio terminal, a PRACH resource used for a random access preamble transmission from among PRACH resources used for the early data transmission, after determining to perform the early data transmission; and transmitting, by the radio terminal, the random access preamble to the base station using the selected PRACH resource.

In the communication control method, the PRACH resource used for the early data transmission is provided for each extended coverage level, and the selecting step may include a step of selecting a PRACH resource corresponding to the extended coverage level applied to the radio terminal.

The communication control method may further comprise a step of transmitting, by the base station to the radio terminal, a random access response including an uplink grant in response to a reception of the random access preamble, wherein the random access response may include information indicating whether the uplink grant is used for the early data transmission.

The communication control method may further comprise steps of: receiving, by the radio terminal, the random access response from the base station; and terminating, by the radio terminal, the early data transmission when the uplink grant included in the random access response is not used for the early data transmission.

A communication control method according to one embodiment is a communication control method for controlling an early data transmission performing an uplink user data transmission from a base station to a radio terminal during a random access procedure. The communication control method comprises a step A of transmitting, to the radio terminal by the base station, a first timer value for the random access procedure without the early data transmission and a second timer value for the random access procedure with the early data transmission, a step B of selecting, by the radio terminal, the second timer value in response to determining that the radio terminal performs the early data transmission, and a step C of starting, by the radio terminal, a timer setting the second timer value when transmitting the uplink data by the early data transmission.

A communication control method according to one embodiment is a communication control method for controlling an early data transmission performing a downlink user data transmission from a base station to a radio terminal during a random access procedure. The communication control method comprises a step A of transmitting, to the radio terminal by the base station, information regarding a condition on an amount of data in the early data transmission, a step B of receiving, from the base station by the radio terminal, information regarding the condition on the amount of data, a step C of estimating, by the radio terminal, an amount of downlink user data to be received from the base station in the early data transmission, and a step D of starting, by the radio terminal, the early data transmission when the estimated amount of downlink user data satisfies the condition on the amount of data.

A communication control method according to one embodiment is a communication control method for controlling an early data transmission in which a radio terminal transmits or receives, during a random access procedure, user data whose amount is less than or equal to a maximum amount of user data set from a base station. The communication control method comprises a step A of determining, by the radio terminal, the maximum amount of user data recommended by the radio terminal, and a step B of transmitting, to the base station by the radio terminal in an RRC connected mode, information indicating the maximum amount of user data recommended by the radio terminal.

BRIEF DESCRIPTION OF DRAWINGS

FIG. 32 is a diagram related to a supplementary note.

DESCRIPTION OF EMBODIMENTS

First Embodiment (Overview of First Embodiment)

Radio terminals targeting MTC or IoT have a less amount of data to be transmitted and received and a less frequency of transmitting and receiving data than general radio terminals. Therefore, in order for the radio terminals targeting the MTC or the IoT to efficiently perform communication, early data transmission in which data is transmitted using a predetermined message during a random access procedure has been studied. However, the current mobile communication system does not assume that data is transmitted during the random access procedure, and there is no mechanism that can realize the early data transmission.

Therefore, an object of the present disclosure is to provide a communication control method that can realize early data transmission.

A communication control method according to a first embodiment is a method in a mobile communication system. The communication control method includes steps of: (A) transmitting, by a first radio communication device, to a second radio communication device, information on whether to perform early data transmission in which data is transmitted using a predetermined message during a random access procedure, and (B) determining, by the second radio communication device, whether to perform the early data transmission based on the received information after the second radio communication device receives the information. The first radio communication device is one of a radio terminal and a base station, and the second radio communication device is the other of the radio terminal and the base station. The step A is performed earlier than transmission timing of the predetermined message.

(Mobile Communication System)

Figure 1:
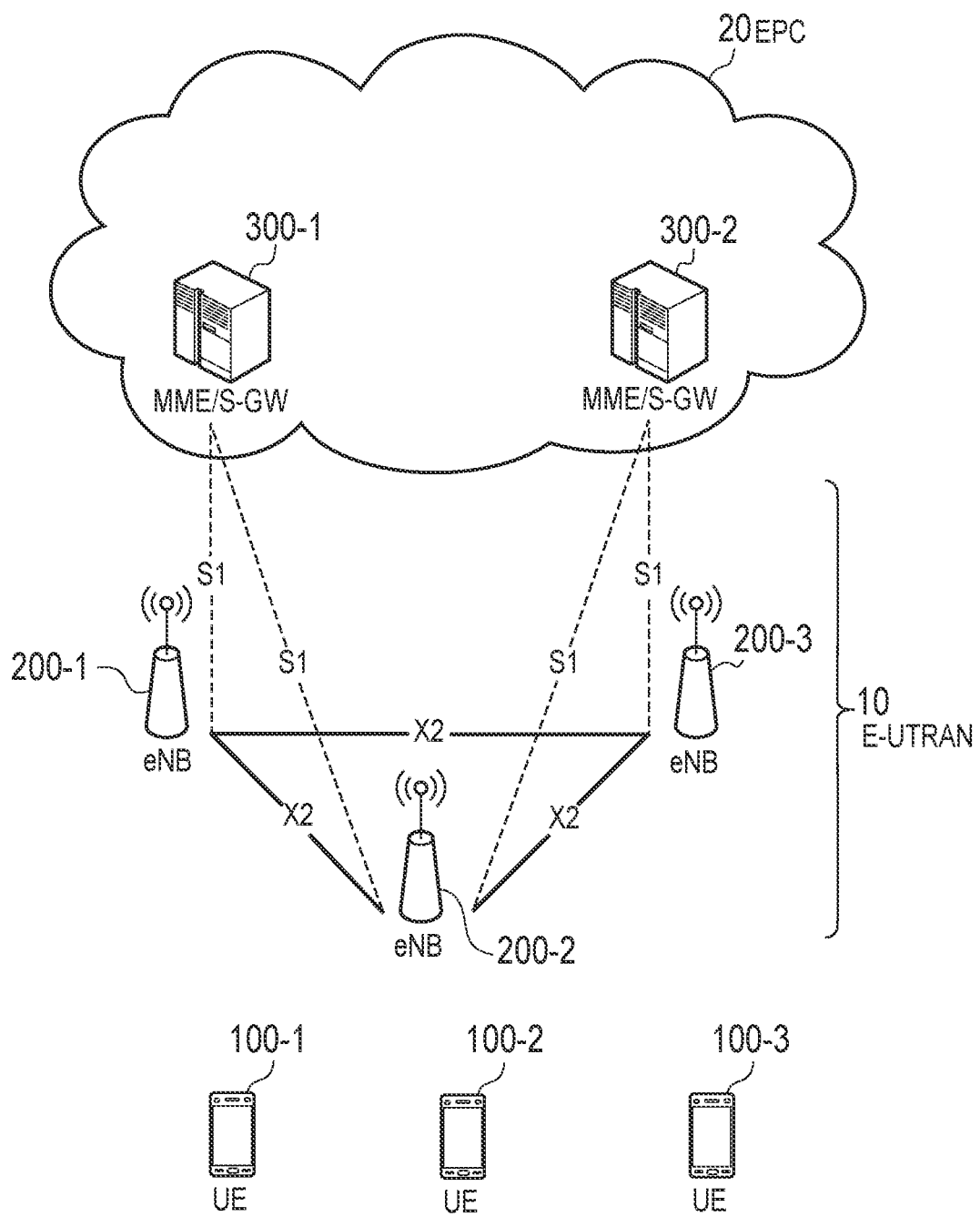
FIG. 1 is a diagram illustrating a configuration of the LTE system (mobile communication system) according to an embodiment.

Next, a configuration of a mobile communication system according to a first embodiment will be described. FIG. 1 is a diagram illustrating a configuration of a long term evolution (LTE) system that is a mobile communication system according to the first embodiment. The LTE system is a mobile communication system based on the 3GPP standard.

The LTE system includes a radio terminal (UE: user equipment) 100, a radio access network (E-UTRAN: evolved-UMTS terrestrial radio access network) 10, and a core network (EPC: evolved packet core) 20.

The UE 100 is a mobile communication device. The UE 100 performs radio communication with an eNB 200 that manages a cell (serving cell) in which the UE 100 exists.

An E-UTRAN 10 includes a base station (eNB: evolved Node-B) 200. The eNBs 200 are connected to each other via an X2 interface. The eNB 200 manages one or a plurality of cells. The eNB 200 performs radio communication with the UE 100 which sets up the connection with a cell of the eNB 200. The eNB 200 has a radio resource management (RRM) function, a routing function of user data (hereinafter, sometimes referred to as "data"), a measurement control function for mobility control and scheduling, and the like. The "cell" is used as a term indicating a smallest unit of a radio communication area. The "cell" may also be used as a term indicating a function of performing the radio communication with the UE 100 or a resource. One cell belongs to one carrier frequency.

The EPC 20 includes mobility management entity (MME) and a serving gateway (S-GW) 300. The MME performs various mobility controls and the like on the UE 100. The MME manages information on a tracking area (TA) in which the UE 100 exists by communicating with the UE 100 using non-access stratum (NAS) signaling. The tracking area is an area composed of a plurality of cells. The S-GW performs data transfer control. The MME and the S-GW are connected to the eNB 200 via an S1 interface.

Figure 2:
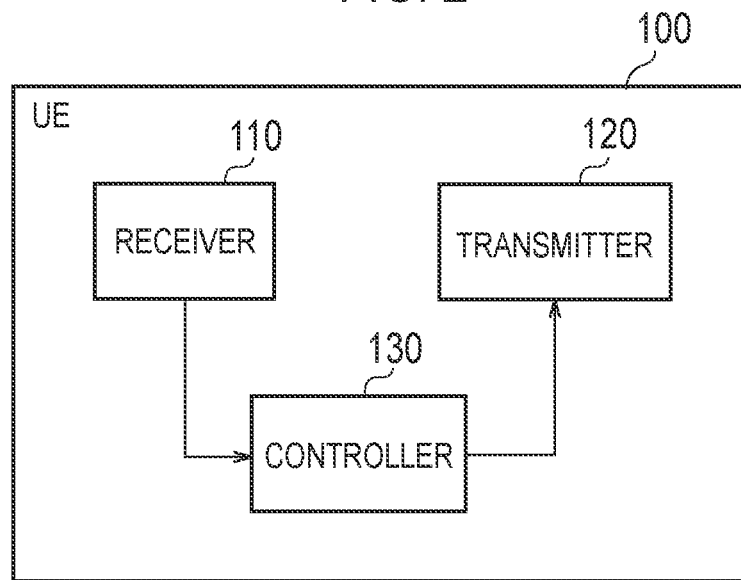
FIG. 2 is a diagram illustrating a configuration of a UE (radio terminal) according to the embodiment.

FIG. 2 is a diagram illustrating a configuration of the UE 100 (radio terminal). The UE 100 includes a receiver 110, a transmitter 120, and a controller 130.

The receiver 110 performs various receptions under the control of the controller 130. The receiver 110 includes an antenna and a receiving device. The receiving device converts a radio signal received by the antenna into a baseband signal (received signal) and outputs the baseband signal to the controller 130.

The transmitter 120 performs a variety of transmission under the control of the controller 130. The transmitter 120 includes an antenna and a transmitting device. The transmitting device converts the baseband signal (transmitted signal) output from the controller 130 into the radio signal and transmits the radio signal from the antenna.

The controller 130 performs various controls in the UE 100. The controller 130 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

Figure 3:
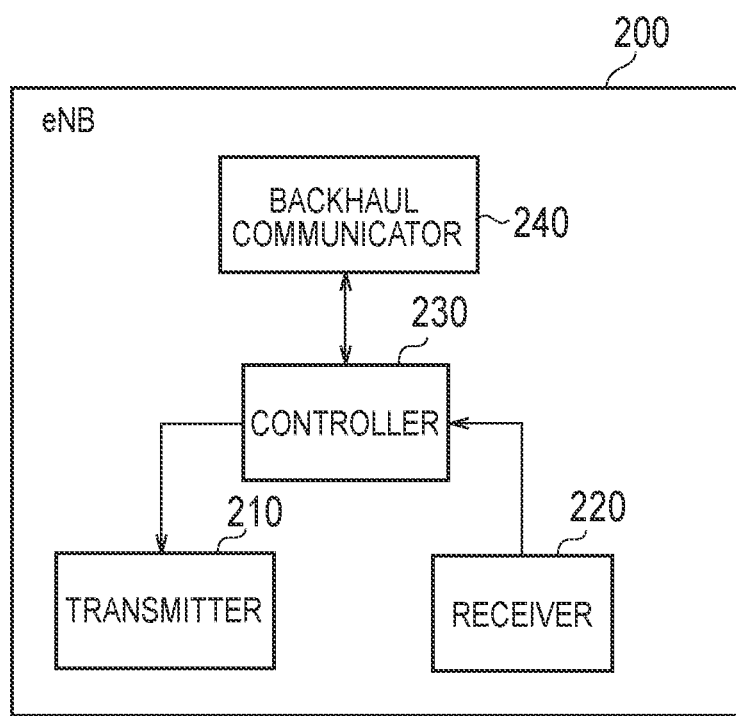
FIG. 3 is a diagram illustrating a configuration of an eNB (base station) according to the embodiment.

FIG. 3 is a diagram illustrating a configuration of the eNB 200 (base station). The eNB 200 includes a transmitter 210, a receiver 220, a controller 230, and a backhaul communicator 240.

The transmitter 210 performs a variety of transmission under the control of the controller 230. The transmitter 210 includes an antenna and a transmitting device. The transmitting device converts a baseband signal (transmitted signal) output from the controller 230 into a radio signal and transmits the radio signal from the antenna.

The receiver 220 performs a variety of reception under the control of the controller 230. The receiver 220 includes an antenna and a receiving device. The receiving device converts the radio signal received by the antenna into the baseband signal (received signal) and outputs the baseband signal to the controller 230.

The controller 230 performs various controls in the eNB 200. The controller 230 includes at least one processor and memory. The memory stores a program executed by the processor and information used for processing by the processor. The processor may include a baseband processor and a CPU. The baseband processor performs modulation/demodulation, encoding/decoding, and the like of the baseband signal. The CPU performs a variety of processing by executing programs stored in the memory. The processor executes processing to be described later.

The backhaul communicator 240 is connected to an adjacent eNB via an X2 interface. The backhaul communicator 240 is connected to an MME/S-GW 300 via an S1 interface. The backhaul communicator 240 is used for communication performed on the X2 interface, communication performed on the S1 interface, and the like.

Figure 4:
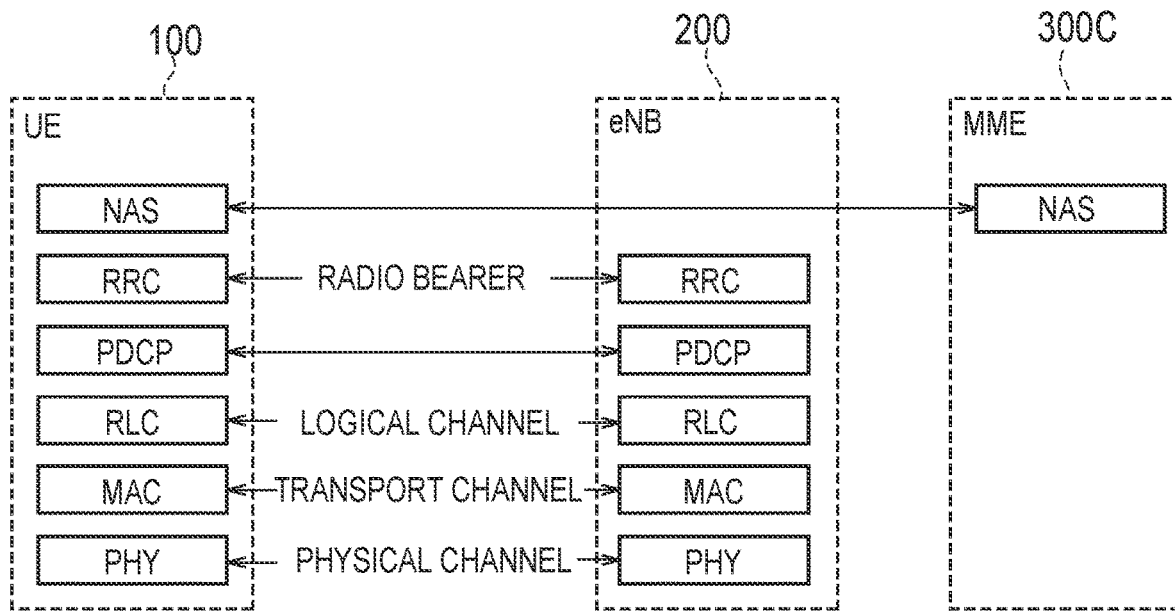
FIG. 4 is a diagram illustrating a protocol stack of a radio interface in the LTE system according to the embodiment.

FIG. 4 is a diagram illustrating a configuration of a protocol stack of a radio interface in the LTE system. As illustrated in FIG. 4, a radio interface protocol is divided into a first layer to a third layer of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs encoding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs priority control of data, retransmission processing by hybrid ARQ (HARQ), a random access procedure, and the like. The data and control information are transmitted between the MAC layer of the UE 100 and the MAC layer of the eNB 200 via a transport channel. The MAC layer of the eNB 200 includes a scheduler. The scheduler determines uplink and downlink transport formats (transport block size, modulation and encoding scheme (MCS)) and a resource block allocated to the UE 100.

The RLC layer transmits data to an RLC layer on a receiving side using the functions of the MAC layer and the PHY layer. The data and control information are transmitted between the RLC layer of the UE 100 and the RLC layer of the eNB 200 via a logical channel.

The PDCP layer performs header compression/expansion and encryption/decryption.

The RRC layer is defined only in a control plane that handles the control information. The RRC signaling for various configurations is transmitted between the RRC layer of the UE 100 and the RRC layer of the eNB 200. The RRC layer controls logical channels, transport channels, and physical channels in response to establishment, re-establishment, and release of a radio bearer. When there is a connection (RRC connection) between the RRC of the UE 100 and the RRC of the eNB 200, the UE 100 is in an RRC connected mode. When there is no connection (RRC connection) between the RRC of the UE 100 and the RRC of the eNB 200, the UE 100 is in an RRC idle mode.

The NAS layer located above the RRC layer performs session management, mobility management, and the like. NAS signaling is transmitted between the NAS layer of the UE 100 and a NAS layer of MME 300C. The UE 100 has functions such as an application layer in addition to a radio interface protocol.

Figure 5:
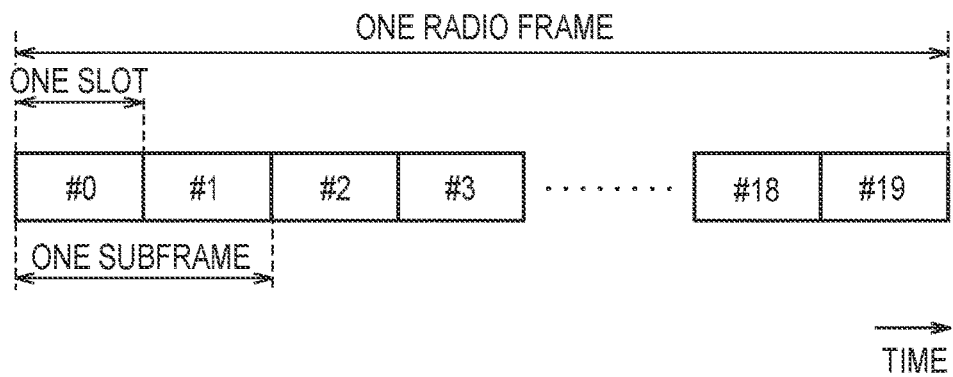
FIG. 5 is a diagram illustrating a configuration of a radio frame in the LTE system according to the embodiment.

FIG. 5 is a diagram illustrating a configuration of a radio frame used in the LTE system. The radio frame is composed of 10 subframes on a time base. Each subframe is composed of two slots on the time base. Lengths of each subframe are 1 ms. Lengths of each slot are 0.5 ms. Each subframe includes a plurality of resource blocks (RBs) in a frequency base. Each subframe includes a plurality of symbols on the time base. Each resource block includes a plurality of subcarriers on the frequency base. Specifically, one RB is composed of 12 subcarriers and one slot. One resource element (RE) is composed of one symbol and one subcarrier. Of the radio resources (time/frequency resources) allocated to the UE 100, a frequency resource can be specified by a resource block, and a time resource can be specified by a subframe (or slot).

In the downlink, a section of several head symbols of each subframe is an area which can be used as a physical downlink control channel (PDCCH) for mainly transmitting downlink control information. The remaining part of each subframe is an area which can be used as a physical downlink shared channel (PDSCH) for transmitting downlink data.

In the uplink, both end portions of each subframe in the frequency direction is an area which can be used as a physical uplink control channel (PUCCH) for mainly transmitting uplink control information. The remaining part of each subframe is an area which can be used as a physical uplink shared channel (PUSCH) for mainly transmitting uplink data.

(Overview of eMTC and NB-IoT)

An overview of eMTC and NB-IoT will be described. In the first embodiment, a scenario is assumed in which there is a UE 100 in a new category targeting the MTC and IoT services. The UE 100 in the new category is a UE 100 whose transmission/reception bandwidth is limited to only a part of a system transmission/reception bandwidth (LTE transmission/reception bandwidth). The UE in the new category is referred to as, for example, category M1 and category narrow band (NB)-IoT. The category M1 is a category to which an enhanced machine type communications (eMTC) UE belongs. The category NB-IoT (category NB1) is a category to which the NB-IoT UE belongs. The category M1 limits the transmission/reception bandwidth of the UE 100 (eMTC UE) to, for example, 1.08 MHz (that is, a bandwidth of 6 resource blocks). The category NB-IoT (category NB1) further limits the transmission/reception bandwidth of the UE 100 (NB-IoT UE) to 180 kHz (that is, a bandwidth of one resource block). By the narrowing of the bandwidth, it is possible to realize cost reduction and power consumption required for the eMTC UE and the NB-IoT UE.

Figure 6:
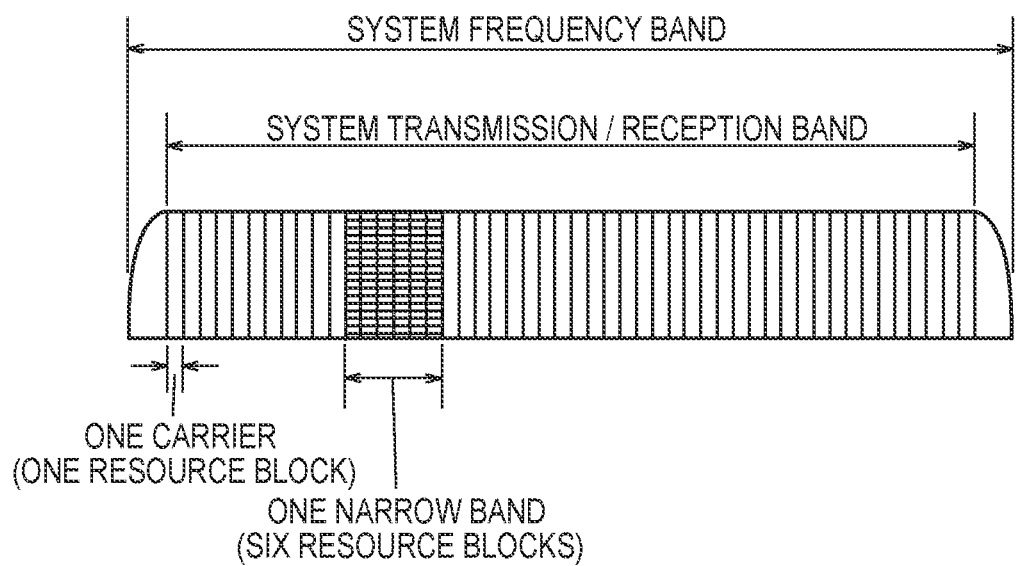
FIG. 6 is a diagram illustrating a frequency channel handled by an eMTC UE and an NB-IoT UE.

FIG. 6 is a diagram illustrating a frequency channel handled by the eMTC UE and the NB-IoT UE. As illustrated in FIG. 6, a frequency bandwidth of a system frequency band of the LTE system may be 10 MHz. The bandwidth of the system transmission/reception bandwidth is, for example, 50 resource blocks=9 MHz. The bandwidth of the frequency channel that is available by the eMTC UE is within 6 resource blocks=1.08 MHz. The frequency channel within 6 resource blocks that is available by the eMTC UE is referred to as a "narrow band (NB)". The bandwidth of the frequency channel that is available by the NB-IoT UE is 1 resource block=180 kHz. The frequency channel of 1 resource block that is available by the NB-IoT UE is referred to as a "carrier".

The eMTC UE is operated within the LTE transmission/reception bandwidth. The NB-IoT UE supports a form operated within the LTE transmission/reception bandwidth, a form operated in a guard band outside the LTE transmission/reception bandwidth, and a form operated within the frequency band dedicated to the NB-IoT.

The eMTC UE and the NB-IoT UE support an enhanced coverage (EC) function using repeated transmission or the like in order to realize coverage extension. The enhanced coverage function may include repetition that repeatedly transmits the same signal using a plurality of subframes. The coverage can be extended as the number of times of repetitions increases. The enhanced coverage function may include power boosting that increases a power density of the transmitted signal. As an example, the power density increases by narrowband transmission that narrows the frequency bandwidth of the transmitted signal. The coverage can be extended as the power density of the transmitted signal increases. The enhanced coverage function may include lower MCS transmission that lowers the MCS used for the transmitted signal. The coverage can be extended by performing transmission using MCS with a low data rate and high error tolerance.

(Overview of Random Access Procedure)

Figure 7:
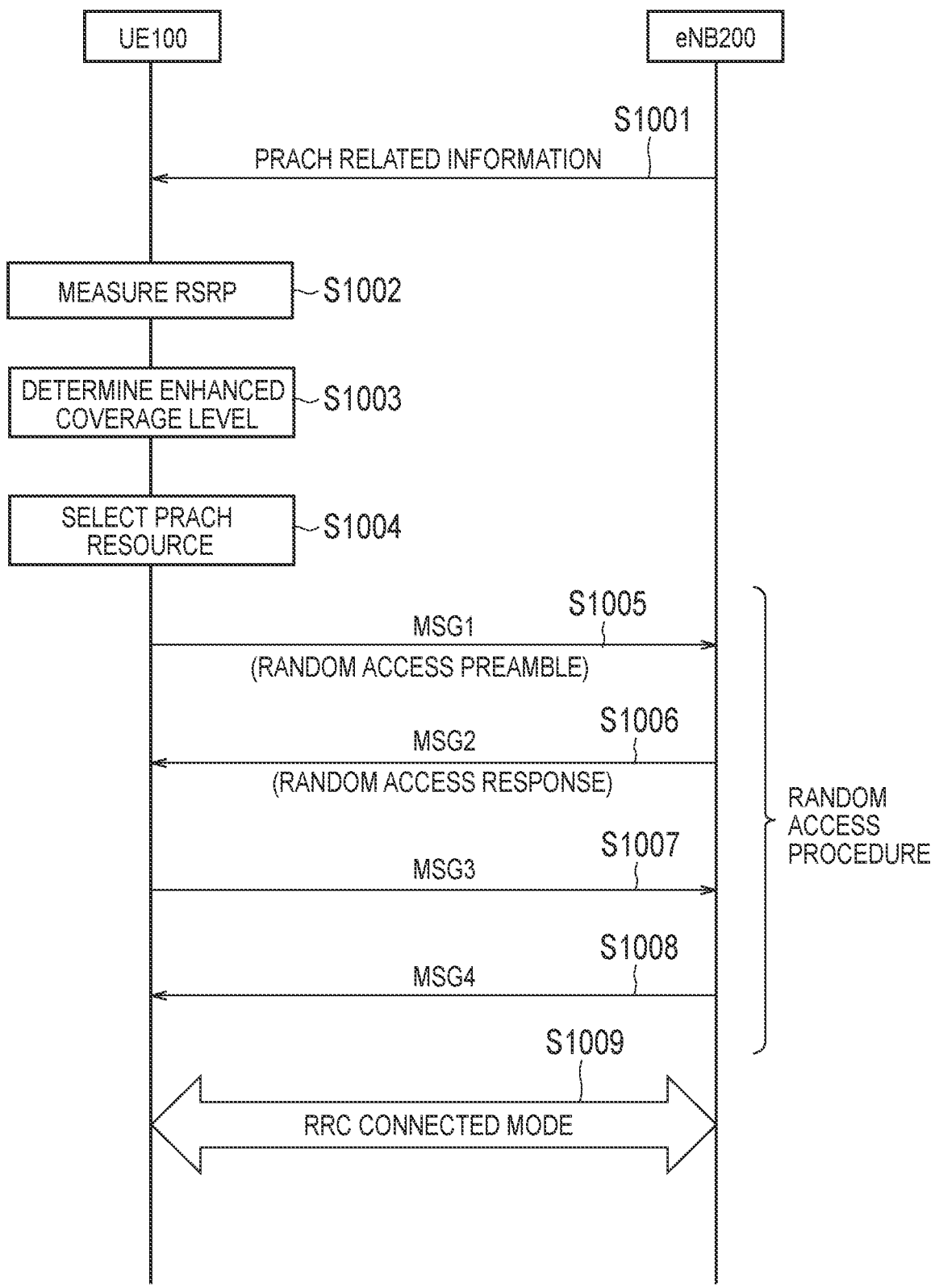
FIG. 7 is a diagram illustrating a random access procedure for the eMTC UE and the NB-IoT UE.

FIG. 7 is a diagram illustrating the random access procedure for the eMTC UE and the NB-IoT UE. In an initial state, the UE 100 is in the RRC idle mode. The UE 100 executes the random access procedure in order to transition to the RRC connected mode. Such a case is referred to as an initial connection (Initial access from RRC_IDLE). At the time of the initial connection, a contention based random access procedure is applied.

The UE 100 selects a cell of the eNB 200 as a serving cell. If first cell selection criteria (first S-criteria) for normal coverage are not satisfied and second cell selection criteria (second S-criteria) for enhanced coverage are satisfied, the UE 100 may determine that the UE 100 is in the enhanced coverage. The "UE in the enhanced coverage" means a UE that is required to use an enhanced coverage function (enhanced coverage mode) in order to access a cell. Note that the eMTC UE is essential to use the enhanced coverage mode. Here, the description will be made under the assumption that the UE 100 is in the enhanced coverage.

In step S1001, the eNB 200 transmits physical random access channel (PRACH) related information by broadcast signaling (for example, SIB). The PRACH related information includes various parameters provided for each enhanced coverage level. As an example, for the enhanced coverage level, a total of four levels of enhanced coverage levels 0 to 3 are defined. Various parameters include a reference signal received power (RSRP) threshold, a PRACH resource, and the maximum number of times of preamble transmissions. The PRACH resource includes a radio resource (time/frequency resource) and a signal sequence (preamble sequence). The UE 100 stores the received PRACH related information.

In step S1002, the UE 100 measures the RSRP based on the reference signal transmitted from the eNB 200.

In step S1003, the UE 100 determines its own enhanced coverage level (CE level) by comparing the measured RSRP with the RSRP threshold for each enhanced coverage level. The enhanced coverage level indicates a degree of enhanced coverage required for the UE 100. The enhanced coverage level is related to at least the number of times of transmissions (that is, the number of times of repetitions) in the repetition.

In step S1004, the UE 100 selects the PRACH resource corresponding to its own enhanced coverage level.

Steps S1005 to S1008 constitute the random access procedure. In step S1005, the UE 100 transmits Msg1 (random access preamble) to the eNB 200 using the selected PRACH resource. Note that the "Msg" is an abbreviation for a message. The eNB 200 specifies the enhanced coverage level of the UE 100 based on the PRACH resource used for the received Msg1.

In step S1006, the eNB 200 transmits, to the UE 100, Msg2 (random access response) including scheduling information indicating a PUSCH resource allocated to the UE 100. The UE 100 can transmit the Msg1 plural times up to the maximum number of times of preamble transmissions corresponding to its own enhanced coverage level until the UE 100 normally receives the Msg2.

In step S1007, the UE 100 transmits Msg3 to eNB 200 based on the scheduling information. The Msg3 may be an RRC connection request message.

In step S1008, the eNB 200 transmits Msg4 to the UE 100. The Msg4 may be an RRC connection setup message.

In step S1009, the UE 100 transitions to the RRC connected mode in response to the reception of the Msg4. At this time, the UE 100 may transmit Msg5: RRC connection setup complete message to the eNB 200. Thereafter, the eNB 200 controls the repetition and the like to the UE 100 based on the specified enhanced coverage level.

(Operation Related to Early Data Transmission) The operation related to the early data transmission according to the first embodiment will be described.

The early data transmission is a transmission method for transmitting data (user data) using a predetermined message during the random access procedure. The predetermined message is at least one of the Msg1 (random access preamble), the Msg2 (random access response), the Msg3 (for example, RRC connection request message), the Msg4 (RRC connection setup message), and the Msg5 (RRC connection setup complete message). Note that the "transmitting data using the predetermined message" is at least one of transmitting data by including the data in the predetermined message, transmitting data by adding the data to the predetermined message, and transmitting data by associating the data with the predetermined message.

The early data transmission may be applied to a UE in an RRC suspend state. The RRC suspend state is one state of the RRC idle mode and is a special state in which the UE context is held in a network. In the random access procedure for the UE in the RRC suspend state to be resumed to the RRC connected mode, the Msg3 is an RRC connection resume request message, the Msg4 is an RRC connection resume message, and the Msg5 is an RRC connection resume complete message.

The communication control method according to the first embodiment includes steps of: (A) transmitting, by a first radio communication device, to a second radio communication device, information on whether to perform early data transmission in which data is transmitted using a predetermined message during a random access procedure, and (B) determining, by the second radio communication device, whether to perform the early data transmission based on the received information after the second radio communication device receives the information. The first radio communication device is one of the UE 100 and the eNB 200, and the second radio communication device is the other of the UE 100 and the eNB 200. The step A is performed earlier than transmission timing of the predetermined message.

An overview of operation patterns 1 to 4 according to the first embodiment will be described. The operation patterns 1 to 4 can be combined with at least a part of the operations in the above-mentioned "overview of random access procedure" (see FIG. 7).

In the operation pattern 1 according to the first embodiment, the step A includes steps of: selecting a resource to be applied to the random access preamble transmission based on whether the UE 100 performs the early data transmission; and transmitting, by the UE 100, a random access preamble to which the selected resource is applied. In the step B, the eNB 200 determines whether to perform the early data transmission based on the resource applied to the random access preamble.

In the operation pattern 2 according to the first embodiment, in the step A, the UE 100 transmits, to the eNB 200, a notification indicating that the early data transmission is performed while the UE 100 is in the connected mode. The operation pattern 2 further includes steps of: transitioning the UE 100 from the connected mode to the idle mode after the transmission of the notification; and retaining, by the eNB 200 or a higher network device, the notification while the UE 100 is in the idle mode. In the step B, the eNB 200 determines whether to perform the early data transmission based on the held notification during the random access procedure.

In the operation pattern 3 according to the first embodiment, in the step A, the eNB 200 transmits, to the UE 100, a notification indicating whether to perform the early data transmission prior to starting the random access procedure by at least one of a paging message, downlink control information (DCI), and/or a physical downlink shared channel (PDSCH). In the step B, the UE 100 determines whether to perform the early data transmission based on the notification from the eNB 200.

In the operation pattern 4 according to the first embodiment, in the step A, the eNB 200 transmits, to the UE 100, information indicating the amount of data allowed to be transmitted by the early data transmission prior to starting the random access procedure. In the step B, the UE 100 determines whether to perform the early data transmission based on the amount of data notified from the eNB 200 and the amount of data transmitted from the UE 100 to the eNB 200.

Figure 8:
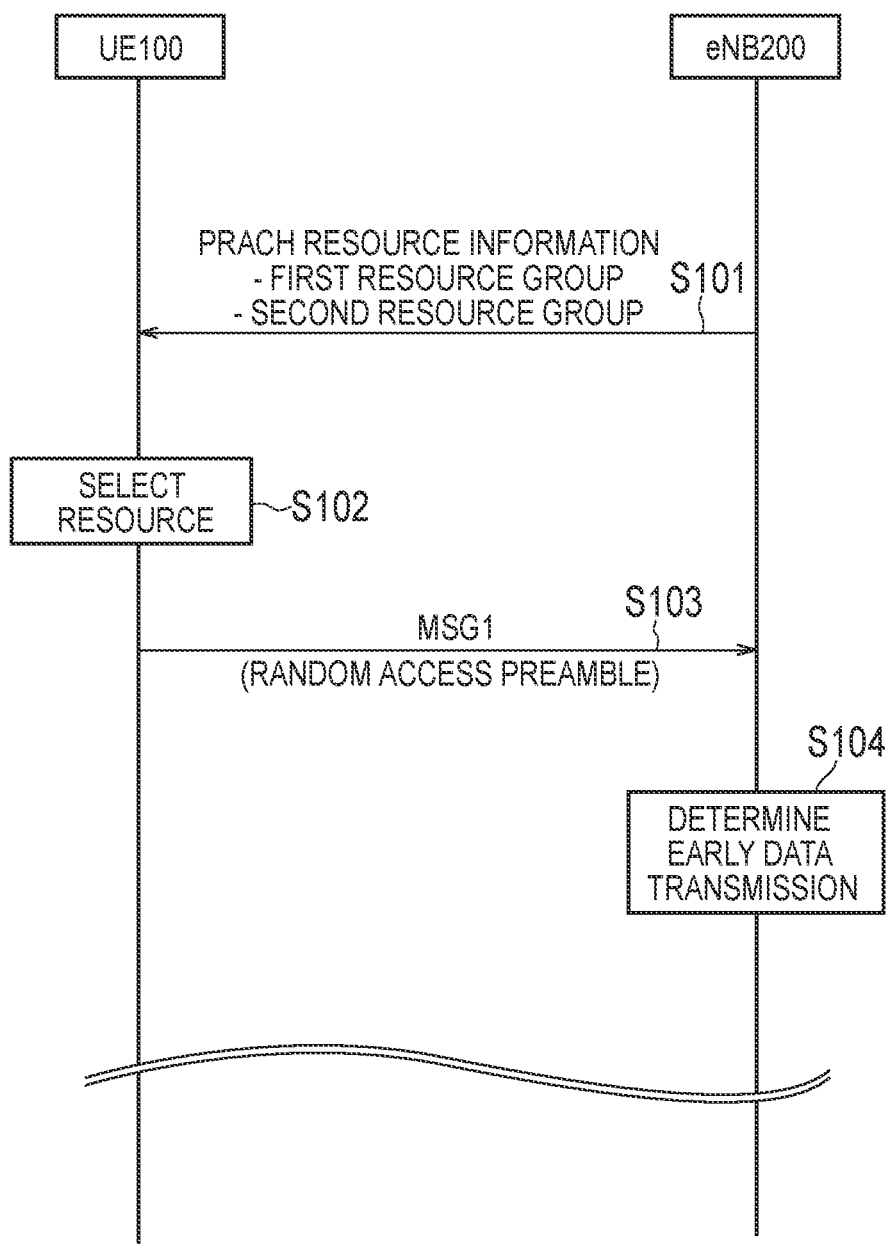
FIG. 8 is a diagram illustrating operation pattern 1 according to a first embodiment.

(1) Operation Pattern 1 FIG. 8 is a diagram illustrating the operation pattern 1 according to the first embodiment. The difference from the operation in the above-mentioned "overview of random access procedure" will be mainly described.

As illustrated in FIG. 8, in step S101, the eNB 200 transmits (broadcasts) PRACH resource information indicating a PRACH resource (PRACH resource pool), which is a resource that can be used for the random access preamble transmission by system information (SIB). The PRACH resource includes a radio resource (time/frequency resource) and/or a signal sequence (preamble sequence).

The PRACH resource includes a first resource group (PRACH resource pool) indicating that the early data transmission is performed (indication to perform the early data transmission), and a second resource group (PRACH resource pool) indicating that the early data transmission is not performed. The PRACH resource divided into the first resource group and the second resource group may be a radio resource (time/frequency resource). The PRACH resource divided into the first resource group and the second resource group may be a signal sequence (preamble sequence).

The eNB 200 includes information indicating the first resource group and information indicating the second resource group in the SIB. The second resource group may be the PRACH resource similar to the conventional one. The first resource group may be a PRACH resource secured separately from the conventional PRACH resource.

The first resource group may include a first resource subgroup indicating that uplink data is transmitted by the early data transmission and a second resource subgroup indicating that downlink data is received by the early data transmission. Further, the first resource group may include a third resource subgroup indicating that both the uplink data transmission and the reception of the downlink data are performed by the early data transmission. The eNB 200 may include information indicating at least one of a plurality of resource subgroups (first resource subgroup, second resource subgroup, and third resource subgroup) in the SIB.

The UE 100 in the RRC idle mode receives the SIB from the eNB 200. The UE 100 in the RRC idle mode determines that the RRC connection needs to be setup, and starts a preparation for the random access procedure. Here, the UE 100 may determine that it is necessary to setup the RRC connection in order to transmit the uplink data in response to the generation of the uplink data in the UE 100. In response to receiving, from eNB 200, a paging message addressed to the UE 100, the UE 100 may determine that it is necessary to setup an RRC connection in order to receive downlink data.

In step S102, the UE 100 in the RRC idle mode selects a resource to be applied to the random access preamble transmission from the PRACH resources notified by the SIB. The UE 100 selects the resource in the first resource group, when performing the early data transmission. On the other hand, the UE 100 selects the resource in the second resource group, when not performing the early data transmission. Whether to perform the early data transmission is based on at least one of the following criteria 1) to 7). 1) Capability of the UE 100, that is, whether the UE 100 has capability to perform the early data transmission. 2) Priority (for example, QoS) of data transmitted or received by the UE 100. 3) A power state (for example, residual quantity of a battery) of the UE 100. 4) Whether to reduce data delay (for example, necessity of early TCP ACK transmission). 5) User preference (for example, depending on manual setting). 6) Instruction from a network (for example, based on a function restriction or an authentication result by MME or the like). 7) Instruction from the eNB (for example, based on whether the eNB has early data transmission/reception capability). Note that the "performing the early data transmission" may mean that the UE 100 intends to perform the early data transmission, whether to allow the early data transmission, or whether the early data transmission is possible.

The UE 100 may determine whether to perform the early data transmission separately from the uplink and the downlink. The UE 100 may select the resource in the first resource subgroup, when transmitting the uplink data by the early data transmission. The UE 100 may select the resource in the second resource subgroup, when receiving the downlink data by the early data transmission.

In step S103, the UE 100 transmits the Msg1 (random access preamble) to which the resource selected in step S102 is applied.

In step S104, the eNB 200 determines whether to perform the early data transmission based on the resource applied to the received random access preamble. For example, when the resource in the first resource group is applied to the random access preamble, the eNB 200 determines to perform the early data transmission for the UE 100 which is a transmission source. Further, the eNB 200 may determine whether to perform either the uplink early data transmission or the downlink early data transmission based on the resource subgroup. On the other hand, when the resource in the second resource group is applied to the random access preamble, the eNB 200 determines not to perform the early data transmission for the UE 100 which is the transmission source.

Note that in the operation pattern 1, the case of dividing the time/frequency resource and the case of dividing the signal sequence resource have been described, but the time/frequency resource and the signal sequence resource may be combined and divided. For example, the time/frequency resource may be divided into the first resource group and the second resource group, and the signal sequence resource may be divided into resource subgroups in the first resource group. Alternatively, the signal sequence resource may be divided into the first resource group and the second resource group, and the time/frequency resource may be divided into resource subgroups in the first resource group.

In addition, as described later, the uplink early data transmission may be used in a set with the downlink early data transmission. For example, the UE 100 transmits the uplink data in the Msg3 by the uplink early data transmission, and receives response data (TCP ACK or the like) corresponding to the data in the Msg4 by the downlink early data transmission. Therefore, the condition that enables the Msg1 to notify of the early data transmission indication includes the condition "UE 100 has the capability of both the uplink early data transmission and the downlink early data transmission". That is, the UE 100 that does not have the capability of at least one of the uplink early data transmission and the downlink early data transmission may be prohibited from notifying of the early data transmission indication by the Msg1.

Furthermore, a new PRACH resource pool (time/frequency resource) used to notify of the early data transmission indication may be preferably defined as a resource pool separate from the conventional PRACH resource pool (time/frequency resource). In this case, the eNB 200 is determined whether to set the new PRACH resource pool and the conventional PRACH resource pool so as not to overlap, or whether to set the new PRACH resource pool and the conventional PRACH resource pool so as to be at least partially overlap, and the eNB 200 may notify the UE 100 of each PRACH resource pool (for example, notified by the SIB).

(2) Operation Pattern 2

Figure 9:
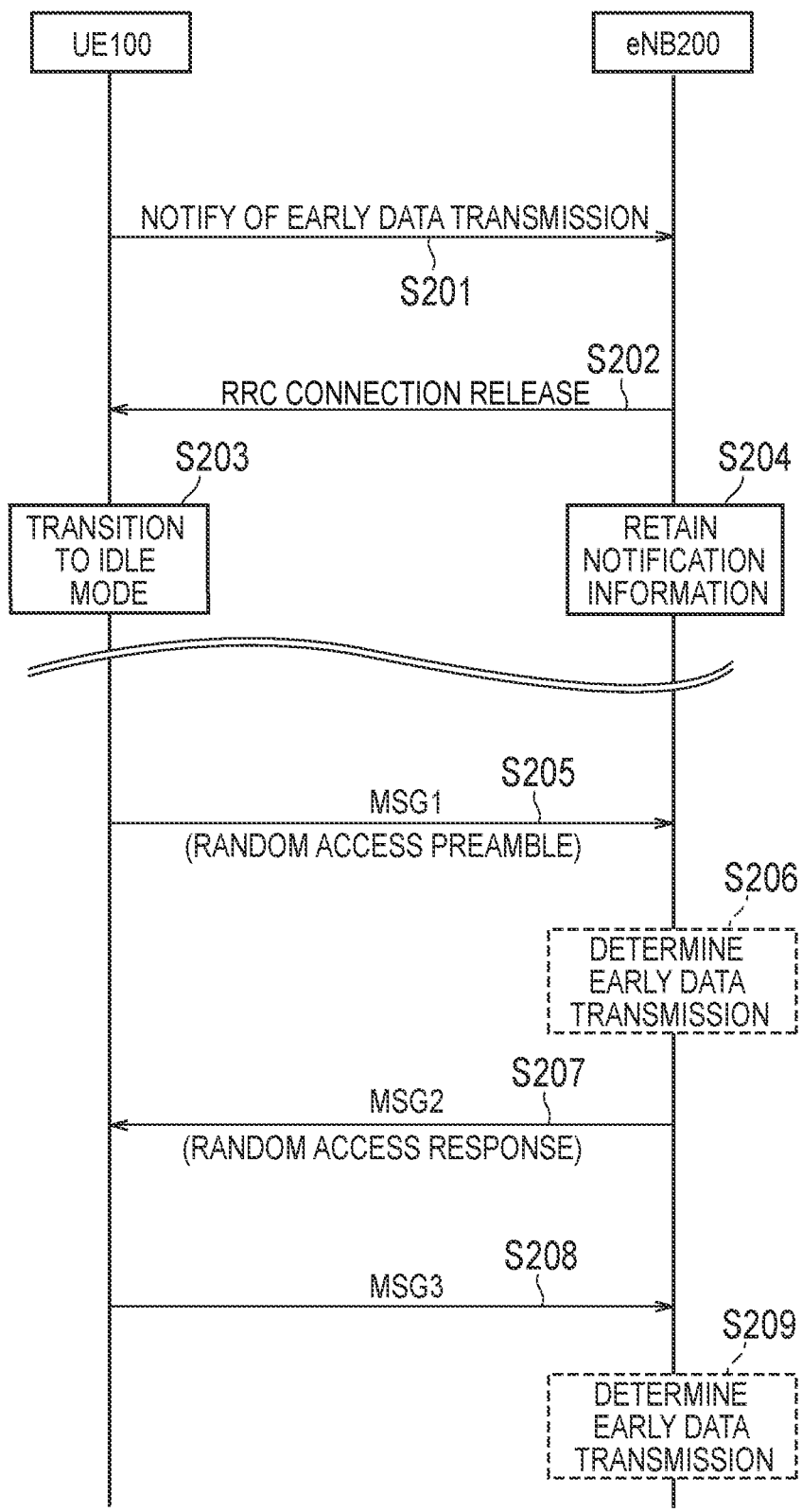
FIG. 9 is a diagram illustrating operation pattern 2 according to the first embodiment.

FIG. 9 is a diagram illustrating the operation pattern 2 according to the first embodiment. The difference from the operation in the above-mentioned "overview of random access procedure" will be mainly described. In addition, the description overlapping with the operation pattern 1 will be omitted. The operation pattern 2 may be applied to the uplink early data transmission or may be applied to the downlink early data transmission.

As illustrated in FIG. 9, in step S201, the UE 100 in the RRC connected mode transmits, to the eNB 200, the notification indicating that the early data transmission is performed. For example, the UE 100 notifies the eNB 200 that the early data transmission is performed when the next RRC connection is setup. The UE 100 stores the contents (notification information) notified to the eNB 200. The notification indicating that uplink early data transmission is performed and the notification indicating that downlink early data transmission is performed may be defined separately. The notification may include the capability information of the UE 100 (capability regarding the early data transmission). The eNB 200 stores the notification from the UE 100. The eNB 200 may transfer the notification to a higher device (for example, MME 300).

In step S202, the eNB 200 transmits an RRC connection release message to the UE 100. The RRC connection release message may include the information indicating that the UE 100 is set to the RRC suspend state. In addition, the RRC connection release message may include the information indicating that the UE 100 may perform (or needs to perform) the early data transmission. The RRC connection release message may include the information indicating that the UE 100 does not perform the early data transmission.

In step S203, the UE 100 releases the RRC connection in response to the RRC connection release message, and transitions from the RRC connected mode to the RRC idle mode. The UE 100 may be in the RRC suspend state. The UE 100 retains the notification information while the UE 100 is in the idle mode.

In step S204, the eNB 200 retains the notification information while the UE 100 is in the idle mode. In other words, the eNB 200 retains the information indicating that the early data transmission is performed when the next RRC connection is setup for the UE 100. In addition to the eNB 200 or instead of the eNB 200, the higher device (for example, the MME 300) of the eNB 200 may retain the notification information. The information held by the eNB 200 and/or the MME 300 may include the capability information of the UE 100 (capability regarding the early data transmission). The UE 100 and the eNB 200 may cancel (discard) the notification information when the UE 100 determines not to perform the early data transmission (when the conventional PRACH resource is used in the Msg1).

In step S205, the UE 100 transmits the Msg1 (random access preamble) to the eNB 200. Although details will be described later, the UE 100 may transmit the random access preamble by applying a dedicated preamble sequence (dedicated preamble) allocated to each UE from the eNB 200. The eNB 200 receives the random access preamble from the UE 100.

The eNB 200 may receive the paging message addressed to the UE 100 in the idle mode from the higher device (for example, the MME 300). The paging message may include a combination of an identifier of the destination UE and the notification information held by the higher device. The eNB 200 may use the information included in the paging message in order to determine whether to perform the early data transmission for the UE 100.

When the dedicated preamble sequence is applied, in step S206, the eNB 200 identifies the UE 100 based on the preamble sequence. The eNB 200 determines whether to perform the early data transmission based on the notification information held in step S204. Specifically, if the notification information corresponding to the identified UE 100 is held, the eNB 200 determines to perform the early data transmission. On the other hand, if the notification information corresponding to the identified UE 100 is not held, the eNB 200 determines not to perform the early data transmission.

In step S207, the eNB 200 transmits the Msg2 (random access response) to the UE 100.

In step S208, the UE 100 transmits the Msg3 to the eNB 200.

When the dedicated preamble sequence is not applied, in step S209, the eNB 200 identifies the UE 100 based on the Msg3. The eNB 200 determines whether to perform the early data transmission based on the notification information held in step S204.

(3) Operation Pattern 3

Figure 10:
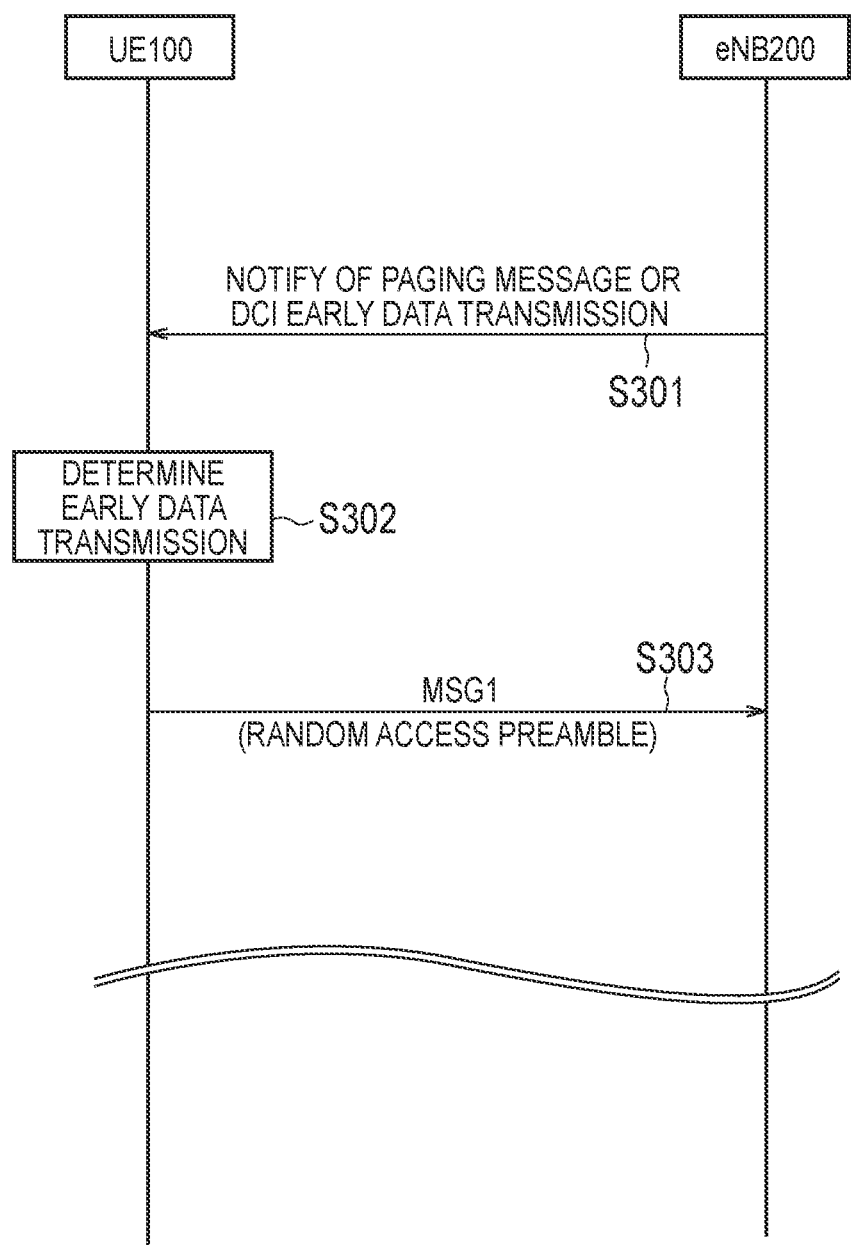
FIG. 10 is a diagram illustrating operation pattern 3 according to the first embodiment.

FIG. 10 is a diagram illustrating the operation pattern 3 according to the first embodiment. The difference from the operation in the above-mentioned "overview of random access procedure" will be mainly described. In addition, the description overlapping with the operation patterns 1 and 2 will be omitted. The operation pattern 3 is applied to the downlink early data transmission.

In the operation pattern 3, the UE 100 performing the random access procedure is in the RRC idle mode or the RRC connected mode. The UE 100 in the RRC idle mode performs a contention based random access procedure. On the other hand, the UE 100 in the RRC connected mode can perform a non-contention based random access procedure. In the non-contention based random access procedure, the dedicated preamble sequence is assigned from the eNB 200 to each UE by downlink control information (DCI) or individual RRC signaling (dedicated signaling). The non-contention based random access procedure is applied at the time of handover, uplink timing adjustment, or the like.

As illustrated in FIG. 10, in step S301, the eNB 200 transmits, to the UE 100, the notification indicating whether to perform the early data transmission prior to starting the random access procedure by at least one of the paging message, the DCI, and the PDSCH.

When the paging message is used, the contention based random access procedure may be applied. The eNB 200 transmits the paging message including a combination of the identifier of the destination UE and the information indicating whether to perform the early data transmission. Such a paging message may be generated by the MME 300 and transmitted from the MME 300 to the UE 100 via the eNB 200.

When the DCI or the PDSCH is used, the UE 100 may be in the RRC connected mode. When the DCI or the PDSCH is used, the non-contention based random access procedure may be applied. The eNB 200 includes the information indicating whether the early data transmission is performed in the DCI or the PDSCH addressed to the UE 100. In paging occasion which is timing when the UE 100 performing an intermittent reception (DRX) operation monitors the PDCCH, the eNB 200 may transmit, to the UE 100, the DCI including the information indicating whether to perform the early data transmission.

When the predetermined message used for the early data transmission is the Msg1 (random access preamble), the eNB 200 may notify the UE 100 of the PRACH resource for the early data transmission when notifying the UE 100 whether to perform the early data transmission. The notification is performed by at least one of the paging message, the DCI, and the PDSCH. The eNB 200 may broadcast several PRACH resources (and a list including an index of the PRACH resource) in advance by the SIB. The eNB 200 may notify of the index of the PRACH resource by at least one of the paging message, the DCI, and the PDSCH.

In step S302, the UE 100 determines whether to perform the early data transmission based on the notification from the eNB 200 in step S301. When notified of performing the early data transmission, the UE 100 may determine to perform the early data transmission. Alternatively, even when notified of performing the early data transmission, the UE 100 may determine not to perform the early data transmission. In this case, the UE 100 may notify the eNB 200 that the early data transmission is not performed, for example, by the Msg1 (random access preamble) or the Msg3 (for example, RRC connection request message) during the random access procedure.

When the random access procedure is started, the UE 100 transmits the Msg1 (random access preamble) to the eNB 200 in step S303. When performing the early data transmission, the eNB 200 transmits the downlink data to the UE 100 by, for example, the Msg2 (random access response) or the Msg4 (for example, RRC connection setup message) during the random access procedure.

Alternatively, the eNB 200 may notify the UE 100 that the downlink early data transmission is performed during the random access procedure. For example, the eNB 200 may transmit, by the Msg4, to the UE 100, the information indicating that the downlink data is transmitted using Msg2.

(4) Operation Pattern 4

Figure 11:
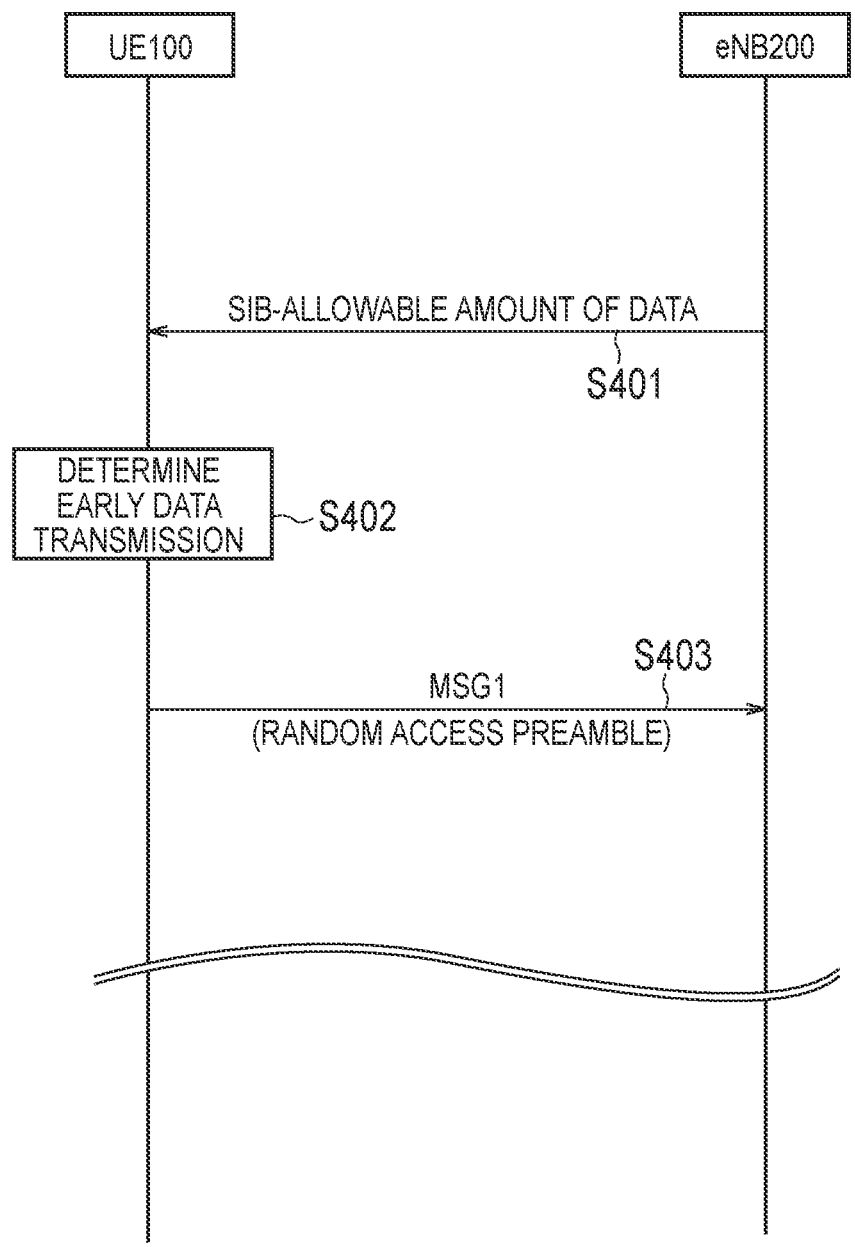
FIG. 11 is a diagram illustrating operation pattern 4 according to the first embodiment.

FIG. 11 is a diagram illustrating the operation pattern 4 according to the first embodiment. The difference from the operation in the above-mentioned "overview of random access procedure" will be mainly described. In addition, the description overlapping with the operation patterns 1 to 3 will be omitted. The operation pattern 4 is applied to the uplink early data transmission.

As illustrated in FIG. 11, in step S401, the eNB 200 transmits, to the UE 100, the information indicating the amount of data allowed to be transmitted (allowable amount of data) by the early data transmission prior to starting the random access procedure. The information indicating the allowable amount of data of the early data transmission may be a threshold indicating the allowable amount of data. The eNB 200 may broadcast the information indicating the allowable amount of data of the early data transmission by the SIB. The eNB 200 may transmit the information indicating the allowable amount of data of the early data transmission to each UE by a unicast message (for example, RRC connection release message). The UE 100 receives the information indicating the allowable amount of data of the early data transmission. The UE 100 may be in the RRC idle mode.

The allowable amount of data that the eNB 200 notifies the UE 100 may be only one or plural. When the allowable amount of data is plural, a list including a plurality of combinations of the allowable amount of data and its index may be configured. The eNB 200 may change the contents (the number of records) of the list based on a load status of a cell. The UE 100 may indicate, to the eNB 200, the amount of data to be transmitted by the early data transmission by notifying the eNB 200, by the Msg1, of an index corresponding to the amount of uplink data to be transmitted to the eNB 200 based on the list.

In step S402, the UE 100 determines whether to perform the early data transmission based on the allowable amount of data notified from the eNB 200 and the amount of data transmitted from the UE 100 to the eNB 200. The amount of data transmitted to the eNB 200 may be the amount of uplink data accumulated in an uplink buffer within the UE 100.

An entity that makes such a determination may be an access layer (AS) of the UE 100 or a higher layer of the UE 100. As described above, the access layer (AS) is a layer including a PHY layer, a MAC layer, an RLC layer, a PDCP layer, and an RRC layer. The access layer (AS) is a layer for performing radio communication with the eNB 200. The higher layer is a layer including a NAS layer, an application layer, and the like and is positioned higher than the access layer. The data (that is, uplink data) to be transmitted to the eNB 200 is generated in the higher layer.

When the determination entity is the access layer (AS) of UE 100, the higher layer of the UE 100 may notify the access layer (AS) of UE 100 of the amount of data to be transmitted to the eNB 200 by the uplink early data transmission. The amount of data transmitted to the eNB 200 may be a size of a data packet or a total amount of a plurality of data packets. The data packet may be a PDCP SDU (that is, an IP packet) or a NAS PDU including a NAS header. For example, the access layer (AS) of the UE 100 determines whether to perform early data transmission based on the allowable amount of data notified by the SIB from the eNB 200 and the size of the data packet notified from the higher layer.

On the other hand, when the determination entity is the higher layer of the UE 100, the access layer notifies the higher layer of the allowable amount of data notified from the eNB 200. The higher layer determines whether to perform the early data transmission based on the allowable amount of data notified from the access layer and the size of the data packet to be transmitted to the eNB 200.

The UE 100 may determine to perform the early data transmission when the amount of data to be transmitted to the eNB 200 is equal to or less than the allowable amount of data. In this case, when the uplink data transmission is completed by the early data transmission during the random access procedure, the UE 100 may end the random access procedure without transitioning to the RRC connected mode. Such an operation will be described in modified example 4 of the first embodiment.

The UE 100 may determine to perform the early data transmission when the amount of data to be transmitted to the eNB 200 exceeds the allowable amount of data. In this case, the UE 100 may transmit the uplink data by the early data transmission during the random access procedure, and may transmit the remaining uplink data to the eNB 200 after transitioning to the RRC connected mode.

When the random access procedure is started, the UE 100 transmits the Msg1 (random access preamble) to the eNB 200 in step S403. When performing the early data transmission, the UE 100 transmits the uplink data to the eNB 200 by, for example, the Msg1 (random access preamble) or the Msg3 (for example, RRC connection request message) during the random access procedure.

In the sequence of FIG. 11, when the amount of data (that is, uplink data) to be transmitted to the eNB 200 exceeds the allowable amount of data, an example has been described in which the UE 100 transmits the uplink data by the early data transmission, and transmits the remaining uplink data to the eNB 200 after transitioning to the RRC connected mode. However, even if the amount of uplink data is slightly larger than the allowable amount of data, since the UE 100 needs to transition to the RRC connected mode, it is inefficient, and it is not preferable in power consumption of the UE 100.

Therefore, when the amount of data to be transmitted to the eNB 200 is larger than the allowable amount of data notified by the broadcast information (SIB) from the eNB 200, the UE 100 may transmit the Msg3 plural times. Each of the transmissions of the Msg3 plural times involves the data transmission. For example, the UE 100 transmits the uplink data up to the allowable amount of data in a first Msg3 transmission, and transmits the remaining uplink data in a second Msg3 transmission. Thereby, since the uplink data transmission can be completed by the early data transmission, it is not necessary for the UE 100 to transition to the RRC connected mode.

Figure 12:
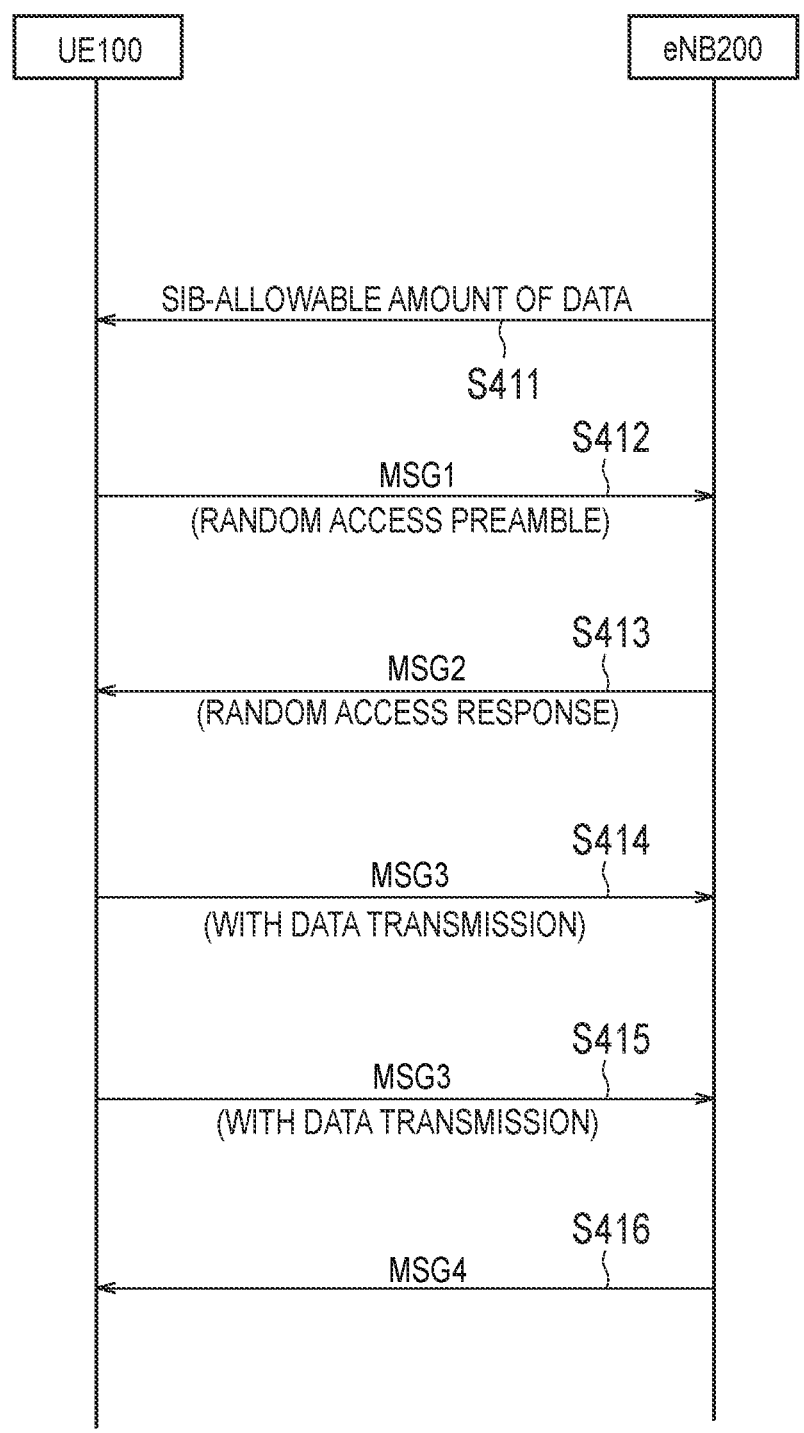
FIG. 12 is a diagram illustrating a modified example of a sequence of FIG. 11.

FIG. 12 is a diagram illustrating a modified example of a sequence of FIG. 11. Here, differences from the sequence of FIG. 11 will be mainly described.

As illustrated in FIG. 12, in step S411, the eNB 200 transmits, to the UE 100, the broadcast information (SIB) indicating the amount of data allowed to be transmitted (allowable amount of data) by the early data transmission. The UE 100 determines whether to perform the uplink early data transmission based on the allowable amount of data notified from the eNB 200 and the amount of data (uplink data) transmitted from the UE 100 to the eNB 200. Here, although the amount of uplink data is larger than the allowable amount of data, the UE 100 determines that the uplink data transmission can be completed by transmitting the Msg3 plural times, and determines to perform the uplink early data transmission.

When the random access procedure is started, the UE 100 transmits the Msg1 (random access preamble) to the eNB 200 in step S412. The UE 100 may notify the eNB 200 of the indication to transmit data larger than the allowable amount of data by the random access preamble. For example, the PRACH resource is divided in the same manner as the operation pattern 1, and the resource for representing an indication to transmit data larger than the allowable amount of data is defined in the PRACH resource. The UE 100 selects a resource for representing the indication to transmit data larger than the allowable amount of data, and transmits the random access preamble using the selected resource. The eNB 200 recognizes the resource used for the preamble transmission, and grasps that the UE 100 has the indication to transmit data larger than the allowable amount of data.

In step S413, the eNB 200 transmits the Msg2 (random access response) to the UE 100. The eNB 200 may transmit the information for transmitting the Msg3 plural times to the UE 100 by the Msg2. Such information may be configuration information and/or activation instructions of semi-persistent scheduling (SPS). For example, the eNB 200 transmits, to the UE 100, configuration information including an SPS cycle indicating an uplink transmission cycle. Further, the eNB 200 transmits an uplink grant indicating the uplink resource (time/frequency resource) allocated to the UE 100 by the Msg2. The configuration information of the SPS may be notified from the eNB 200 to the UE 100 in step S411. Alternatively, the configuration information of the SPS may be defined in the specification and set in the UE 100 in advance.

In step S414, the UE 100 transmits, to the eNB 200, the Msg3 with data using the time/frequency resource indicated by the uplink grant. Here, the UE 100 may transmit the uplink data to the eNB 200 up to the allowable amount of data notified from the eNB 200. The UE 100 includes the uplink data in the RRC message (for example, RRC connection request). Alternatively, the UE 100 does not include the uplink data in the RRC message, but multiplexes and transmits the uplink data (DTCH) and the RRC message (CCCH) in the MAC layer.

In step S415, the UE 100 performs the second Msg3 transmission when the time corresponding to the SPS cycle has elapsed from the timing of step S414. The UE 100 transmits, to the eNB 200, the Msg3 with data using the time/frequency resource indicated by the uplink grant. Here, the Msg3 transmitted here may include the uplink data without including the RRC message.

The UE 100 transmits, to the eNB 200, the Msg3 with data plural times according to the SPS setting until the uplink data transmission is completed. The UE 100 may transmit information (for example, an end marker) indicating the completion of the uplink data transmission in the last Msg3 transmission. The UE 100 may use "BSR=0" to indicate the completion of the uplink data transmission. Details of "BSR=0" will be described in modified example 8. The eNB 200 recognizes the last Msg3 transmission of the UE 100.

In step S416, the eNB 200 transmits the Msg4 to the UE 100. The eNB 200 may use the Msg4 to terminate the SPS transmission. For example, the eNB 200 may transmit, to the UE 100, a 1-bit indicator indicating the stop of the SPS transmission by the Msg4. The UE 100 stops the SPS transmission (and discards the SPS setting) in response to the reception of the Msg4. The UE 100 may terminate the random access procedure without transitioning to the RRC connected mode.

The eNB 200 may explicitly notify, by the Msg4, the UE 100 that the random access procedure is terminated without transitioning to the RRC connected mode. In this case, the Msg4 transmission may include transmission of an RRC connection release message or an RRC connection reject message.

Alternatively, the eNB 200 may explicitly notify the UE 100 of the transition to the RRC connected mode by the Msg4. In this case, the Msg4 transmission may include transmission of an RRC connection setup message or an RRC connection resume message.

In the sequence of FIG. 12, an example has been described in which the indication to transmit data larger than the allowable amount of data is notified to the eNB 200 by the random access preamble, and the eNB 200 instructs the UE 100 to perform the SPS transmission.

However, the eNB 200 may transmit, by the Msg2, to the UE 100, the uplink grant that enables the transmission of the larger amount of data than the allowable amount of data in response to the reception of the random access preamble. The eNB 200 may transmit the uplink grant to the UE 100 when there is a sufficient amount of uplink resources at the time of receiving the random access preamble. When receiving, from the eNB 200, the uplink grant that enables the transmission of the larger amount of data than the allowable amount of data, the UE 100 may complete the uplink data transmission with one-time Msg3 transmission.

Alternatively, the eNB 200 does not transmit the random access response (Msg2) to the random access preamble when there is no sufficient uplink resources at the time of receiving the random access preamble, or may notify the UE 100 of reject in the Msg4.

(Summary of First Embodiment)

The communication control method according to the first embodiment includes steps of: (A) transmitting, by a first radio communication device, to a second radio communication device, information on whether to perform early data transmission in which data is transmitted using a predetermined message during a random access procedure, and (B) determining, by the second radio communication device, whether to perform the early data transmission based on the received information after the second radio communication device receives the information. The first radio communication device is one of the UE 100 and the eNB 200, and the second radio communication device is the other of the UE 100 and the eNB 200. The step A is performed earlier than transmission timing of the predetermined message. According to such a communication control method, the second radio communication device can determine in advance whether to perform the early data transmission earlier than the transmission timing (that is, the timing available for the early data transmission) of the predetermined message based on the information received from the first radio communication device. For example, it is possible to match the recognition regarding whether to perform the early data transmission with the first radio communication device and the second radio communication device (UE 100 and eNB 200). Therefore, the early data transmission can be implemented.

Modified Example 1

Figure 13:
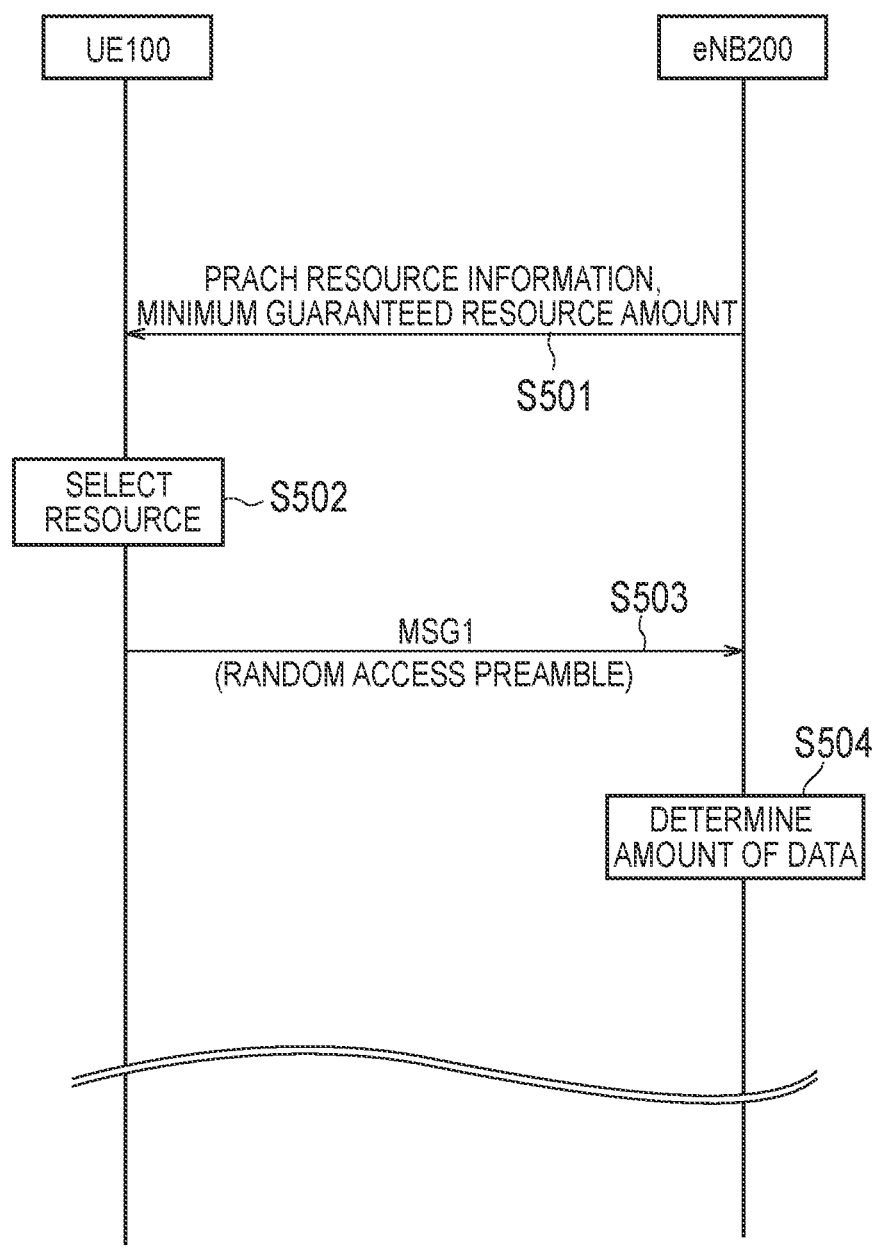
FIG. 13 is a diagram illustrating modified example 1 of the first embodiment.

FIG. 13 is a diagram illustrating modified example 1 of the first embodiment. In the modified example 1 of the first embodiment, a UE 100 notifies, by a random access preamble, an eNB 200 of the amount of data (uplink data) to be transmitted by early data transmission. Differences from the operation in the first embodiment will be mainly described.

As illustrated in FIG. 13, in step S501, the eNB 200 broadcasts, by a SIB, at least one of information indicating a correspondence between the amount of data and a PRACH resource (for example, preamble sequence) and information indicating a minimum guaranteed resource amount of the early data transmission. A paging message may be used instead of the SIB.

In step S502, the UE 100 may also select a resource to be applied to the random access preamble transmission based on the amount of data (uplink data) transmitted by the early data transmission. For example, the UE 100 selects a preamble sequence corresponding to the amount of data (uplink data) transmitted by the early data transmission based on the correspondence notified from the eNB 200.

The UE 100 may determine whether to notify the eNB 200 of the amount of data (uplink data) to be transmitted by the early data transmission based on the minimum guaranteed resource amount notified from the eNB 200. For example, when the minimum guaranteed resource amount is sufficient, the UE 100 may determine not to notify the eNB 200 of the amount of data to be transmitted by the early data transmission. When the minimum guaranteed resource amount is not sufficient, the UE 100 may determine to notify the eNB 200 of the amount of data to be transmitted by the early data transmission.

In step S503, the UE 100 transmits Msg1 (random access preamble) to the eNB 200. The UE 100 may transmit the random access preamble by applying a PRACH resource (for example, preamble sequence) corresponding to the amount of data transmitted by the early data transmission. Alternatively, the UE 100 may transmit the random access preamble by adding information indicating the amount of data to be transmitted by the early data transmission to the random access preamble.

In step S504, the eNB 200 determines the amount of uplink radio resources (for example, PUSCH resources) to be allocated to the UE 100 based on the amount of data notified by the random access preamble. The uplink radio resource may be a radio resource used for the Msg3 transmission. Information on an uplink radio resource that the eNB 200 allocates to the UE 100 is notified to the UE 100 by Msg2.

Note that an example has been described in which the eNB 200 notifies the UE 100 of the minimum guaranteed resource amount. However, the eNB 200 may configure, in the UE 100, whether the UE 100 should notify of the amount of uplink data using the random access preamble, instead of such notification. The setting may be performed by the SIB.

Alternatively, a notification of an indication to perform uplink early data transmission may have an implicit notification meaning of the amount of uplink data. For the eNB 200 to notify of the indication to perform the uplink early data transmission, it may be considered that a UL grant size is left to the eNB, the amount of data is equal to the UL grant size (which may be a maximum allowable UL grant size) reported, or the amount of data related to the early data transmission is required for the UL grant size reported.

In the operation pattern 1 of the first embodiment, an example has been described in which the indication to perform the early data transmission of the UE 100 is notified to the eNB 200 using the PRACH resource. Such notification may need to be performed for each CE level. In addition, in this modified example, the amount of uplink data is notified to the eNB 200 using the PRACH resource. When these operations are used together, it is necessary to increase the number of PRACH resource divisions. In addition, since one resource pool secured for the PRACH is finite, as the number of PRACH resource divisions increases, the size of each divided resource group decreases. As a result, even if the UE 100 randomly selects resources within each resource group, the probability that a plurality of UEs select the same resource, that is, the occurrence probability of the collision of resources increases.

Therefore, the UE 100 may perform the random access preamble transmission plural times earlier than reception timing of a random access response. In each of the transmissions of the random access preamble plural times, the UE 100 selects resources to be applied to the random access preamble transmission based on the information to be notified to the eNB 200. Thereby, a plurality of PRACH resource pools can be secured in a time direction, and the amount of available PRACH resources can be increased.

Figure 14:
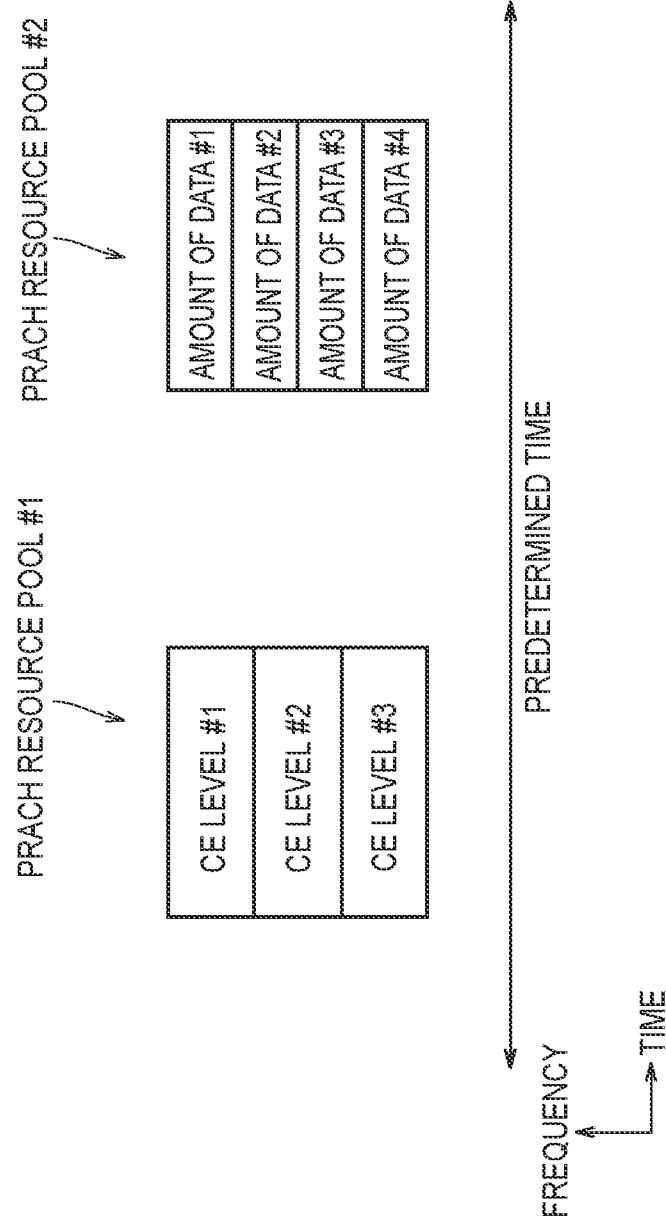
FIG. 14 is a diagram illustrating an example of a configuration of a PRACH resource according to the modified example 1 of the first embodiment.

FIG. 14 is a diagram illustrating an example of a PRACH resource configuration. In the example illustrated in FIG. 14, the UE 100 performs the preamble transmission twice within a predetermined time. The predetermined time may be one subframe time or one radio frame time. Two PRACH resource pools #1 and #2 corresponding to two-time preamble transmission are provided. The PRACH resource pool #1 and the PRACH resource pool #2 may be provided on the same frequency. Each of the PRACH resource pools is divided in a frequency direction and divided into a plurality of resource groups. Each of the PRACH resource pools may be divided in the time direction.

The UE 100 selects resources from the PRACH resource pool #1 in a first preamble transmission. The PRACH resource pool #1 is divided into three resource groups, and the three resource groups correspond to CE levels #1 to #3. For example, the UE 100 that has the indication to perform the uplink early data transmission specifies a resource group corresponding to its own CE level, randomly selects resources from the specified resource group, and transmits the random access preamble using the selected resources. The eNB 200 specifies a resource group corresponding to the random access preamble received from the UE 100, and understands the CE level of the UE 100.

The UE 100 selects resources from the PRACH resource pool #2 in a second preamble transmission. The PRACH resource pool #2 is divided into four resource groups, and the four resource groups correspond to the amount of uplink data #1 to #4. Each of the amount of data #1 to #4 is an index indicating a range of the amount of data. For example, the UE 100 that has the indication to perform the uplink early data transmission specifies a resource group corresponding to its amount of uplink data, randomly selects resources from the specified resource group, and transmits the random access preamble using the selected resources. The eNB 200 specifies a resource group corresponding to the random access preamble received from the UE 100, and understands the amount of uplink data of the UE 100.

The UE 100 may apply the same preamble sequence (signal sequence) in the first preamble transmission and the second preamble transmission. In this case, the eNB 200 associates the UE that has performed the first preamble transmission with the UE that has performed the second preamble transmission based on the preamble sequence. Alternatively, resources may be selected from a resource group according to a predetermined pattern (for example, a frequency hopping pattern) in the first preamble transmission and the second preamble transmission. In this case, the eNB 200 associates the UE that has performed the first preamble transmission with the UE that has performed the second preamble transmission based on the resource selection pattern.

When receiving, from the UE 100, the random access preamble transmitted by the second preamble transmission, the eNB 200 may transmit, to the UE 100, the random access response corresponding to the random access preamble transmitted by the first preamble transmission. That is, the eNB 200 does not transmit the random access response corresponding to the random access preamble transmitted by the second preamble transmission. Thereby, backward compatibility can be ensured. Alternatively, when receiving, from the UE 100, the random access preamble transmitted by the second preamble transmission, the eNB 200 may transmit, to the UE 100, the random access response corresponding to the random access preamble transmitted by the second preamble transmission. That is, the eNB 200 does not transmit the random access response corresponding to the random access preamble transmitted by the first preamble transmission.

The eNB 200 may notify the UE 100 of information on each PRACH resource pool by the SIB. The information on each PRACH resource pool includes at least one of a type of information associated with each PRACH resource pool and each resource group, information indicating the time/frequency range of resources constituting the PRACH resource pool, and information indicating the time/frequency range of each resource group in the PRACH resource pool. The eNB 200 may notify the UE 100 of such information as an individual information element (for example, RACH-config) for each PRACH resource pool. Each information element may include the type of corresponding information (CE level or the amount of uplink data), or the type of corresponding information may be represented by an information element name.

Note that in the example of FIG. 14, an example has been described in which the CE level and the amount of uplink data are notified to the eNB 200 by the preamble transmission, but the information (for example, UE category, timer values of modified example 14 described later) other than the CE level and the amount of uplink data may be notified to the eNB 200 by the preamble transmission. In addition, the number of times of preamble transmissions performed continuously is not limited to twice, and may be three times or more. For example, the UE 100 may notify the eNB 200 of the CE level by first random access preamble transmission, notify the eNB 200 of the indication to perform the early data transmission by second random access preamble transmission, and notify the eNB 200 of the amount of uplink data (that is, the amount of uplink grant desired by the UE 100) by third random access preamble transmission. Alternatively, the PRACH resource pool #1 for the first random access preamble transmission and the PRACH resource pool #2 for the second random access preamble transmission are divided, and the PRACH resource pool #2 is divided into two resource groups. Then, one resource group of the PRACH resource pool #2 may be secured for the notification of the indication to perform the early data transmission, and the other resource groups of the PRACH resource pool #2 may be secured for the notification of the amount of uplink data. In such a case, the eNB 200 may consider, as the UE having the indication to perform the early data transmission, the UE 100 that has notified the eNB 200 of the amount of uplink data using the resources in the resource group for the notification of the amount of uplink data. In addition, to notify of the indication to perform the early data transmission, it may be considered that the UL grant size is left to the eNB, the amount of data is equal to the UL grant size (which may be the maximum allowable UL grant size) reported, or the amount of data related to the early data transmission is required for the UL grant size reported.

In the example of FIG. 14, an example has been described in which the plurality of PRACH resource pools are provided in the time direction, but the plurality of PRACH resource pools may be provided in the frequency direction.

In addition, an example has been described in which the first preamble transmission and the second preamble transmission are associated with each other by applying the same preamble sequence (signal sequence) in the first preamble transmission and the second preamble transmission. However, the association is not limited to the case using the preamble sequence, and the association may be performed by time/frequency resources. For example, as illustrated in FIG. 14, each of the PRACH resource pool #1 for the first random access preamble transmission and the PRACH resource pool #2 for the second random access preamble transmission includes a plurality of resource groups, and each resource group is assumed to be defined in a rectangular shape. In such a case, one specific point of the four vertices of the rectangle is determined as a reference point. The UE 100 selects resources at a predetermined time/frequency position based on the reference point in the resource group for the first random access preamble transmission. The UE 100 selects resources at the same time/frequency position as the first time based on the reference point in the resource group for the second random access preamble transmission. In this way, the eNB 200 can perform the association of the first preamble transmission with the second preamble transmission by aligning a relative position of the time/frequency resources in each of the transmissions of the first and second random access preambles.

In addition, in the example of FIG. 14, an example has been described in which the PRACH resource pool is configured by the time/frequency resources, but the PRACH resource pool may be composed of the preamble sequence (signal sequence) resources.

Next, a case will be described in which the eNB 200 fails to receive a preamble at least once among the transmissions of the random access preamble plural times. Here, it is assumed that the UE 100 notifies the eNB 200 of the CE level by the first random access preamble transmission and notifies the eNB 200 of the indication (in particular, indication to perform the uplink early data transmission) to perform the early data transmission by the second random access preamble transmission. As illustrated in Table 1, there are cases 1 to 3 as a case where at least one of the first random access preamble transmission (first PRACH) and the second random access preamble transmission (second PRACH) fails to transmit.

TABLE 1

| Case | First PRACH | Second PRACH | Procedure |
| --- | --- | --- | --- |
| 1) | OK | OK | 1. eNB knows this UE intends EDT.<br>2. eNB sends Msg2 with larger size of legacy UL grant.<br>3. UE sends data on Msg3. [. . .] |
| 2) | OK | NG | 1. eNB just assumes this is legacy PRACH.<br>2. eNB sends Msg2 with legacy size of UL grant.<br>3. UE sends legacy Msg3 (as in legacy). [. . .] |
| 3) | NG | OK | 1. eNB consider the failure (i.e., the second PRACH is valid when only the first PRACH is successfully received).<br>2. No Msg2 (i.e., No RAR).<br>3. UE re-initiates PRACH transmission (as in legacy). |

The case 1 is a case where both the first random access preamble transmission and the second random access preamble transmission succeed. In the case 1, the eNB 200 understands the indication to perform, by the UE 100, the early data transmission and allocates, to the UE 100, a larger amount of uplink resource than the normal uplink grant (that is, the uplink grant that does not take into account the amount of data transmitted by the early data transmission) and notifies the allocated uplink resource by the Msg2. The UE 100 transmits data with the Msg3 by the early data transmission.

The case 2 is a case where the first random access preamble transmission succeeds and the second random access preamble transmission fails. In the case 2, the eNB 200 recognizes that the normal random access preamble is received, and notifies the UE 100 of the normal uplink grant by the Msg2. The UE 100 determines that an uplink resource that can be used for data transmission is not allocated, and transmits the Msg3 not including data to the eNB 200.

The case 3 is a case where the first random access preamble transmission fails and the second random access preamble transmission succeeds. In the case 3, since the eNB 200 has not received the first random access preamble, the eNB 200 does not transmit the corresponding Msg2 even if the second random access preamble is received. The UE 100 does not receive the Msg2 from the eNB 200, and therefore performs the random access procedure again from the beginning.

In the case 3, the eNB 200 may specify the UE 100 that has transmitted the random access preamble based on the second random access preamble, and may transmit the Msg2 to the specified UE 100. For example, the eNB 200 can specify the UE 100 based on the preamble sequence and/or a hopping pattern applied to the second random access preamble. However, since the eNB 200 has not received the first random access preamble, the eNB 200 cannot understand the CE level of the UE 100 based on the first random access preamble. In such a case, the eNB 200 assumes that the UE 100 is in normal coverage (that is, not in extended coverage), and does not perform repetition during the Msg2 transmission. Alternatively, the eNB 200 may estimate the CE level based on the second random access preamble. Specifically, when the repetition is applied during the second preamble transmission, the eNB 200 can count the number of times of repetitions of the preamble transmission that has been successfully received, and can estimate the CE level from the count value. The eNB 200 performs the repetition when transmitting the Msg2 based on the estimated CE level.

Note that the UE 100 that has notified the eNB 200 of the indication to perform the uplink early data transmission by preamble transmission regardless of whether to perform the random access preamble transmission plural times may have a restriction that the normal Msg3 (Msg3 without data) should be transmitted to the eNB 200 when the uplink resource that can be used for the data transmission is not allocated.

Alternatively, the UE 100 that has notified the eNB 200 of the indication to perform the uplink early data transmission by the preamble transmission may perform the random access procedure again when the uplink resource that can be used for the data transmission is not allocated. When resuming the random access procedure, the UE 100 performs the preamble transmission again and notifies the eNB 200 of the indication to perform the uplink early data transmission again by the preamble transmission. The UE 100 may perform the random access procedure again only when allowed from the eNB 200. That is, when the UE 100 is not allowed from the eNB 200, the UE 100 is prohibited from performing the random access procedure again. Information indicating such permission may be broadcast from the eNB 200 by the SIB, or may be configured from the MME to the UE 100.

Modified Example 2

Figure 15:
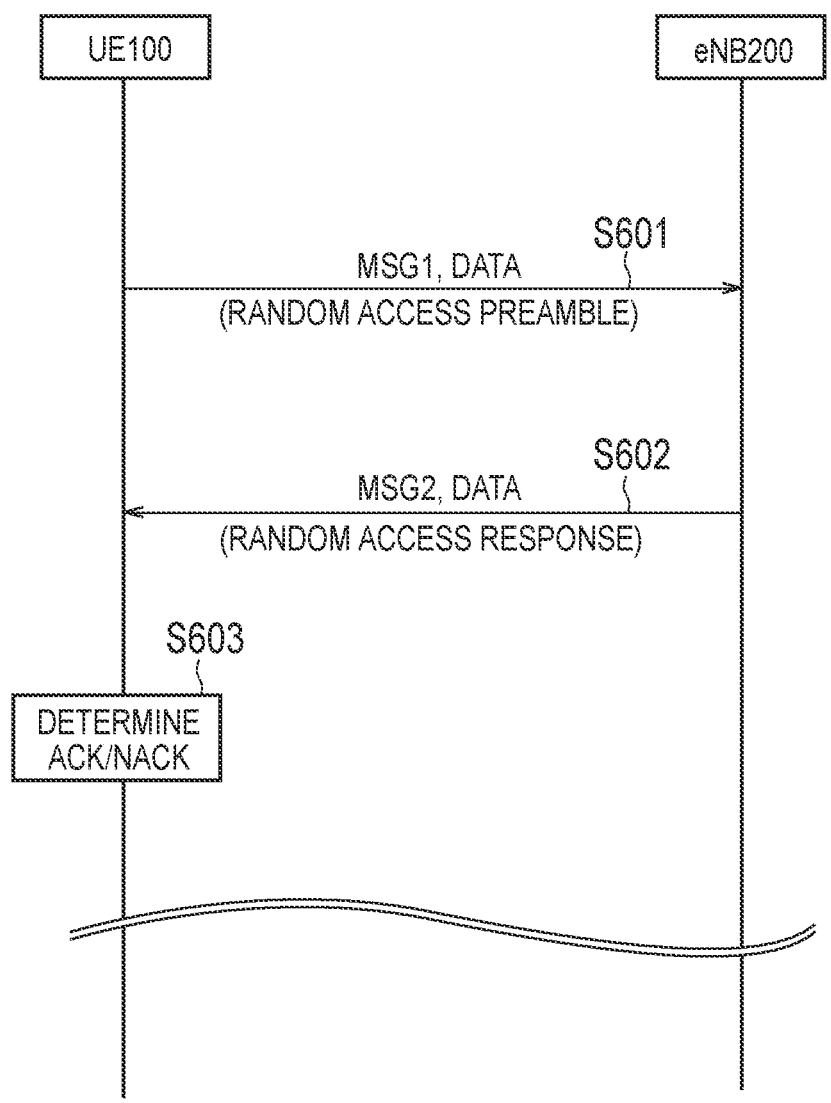
FIG. 15 is a diagram illustrating modified example 2 of the first embodiment.

FIG. 15 is a diagram illustrating modified example 2 of the first embodiment. Differences from the operation in the first embodiment will be mainly described.

As illustrated in FIG. 15, in step S601, a UE 100 transmits data to an eNB 200 together with Msg1 (random access preamble) by early data transmission. For example, the UE 100 transmits data using a new data channel following a random access preamble. However, a small data amount may be transmitted together with the random access preamble. The UE 100 retains data transmitted in step S601.

In step S602, when the eNB 200 receives the data transmitted together with the random access preamble, the eNB 200 returns at least a part of the received data to the UE 100 by Msg2 (random access response). The eNB 200 may return all of the received data to the UE 100.

In step S603, the UE 100 compares the data transmitted in step S601 with data returned from the eNB 200. As a result of the comparison, the UE 100 determines that transmission is successful (ACK) if the data transmitted in step S601 matches the data returned from the eNB 200, and determines that transmission fails (NACK) if the data transmitted in step S601 does not match the data returned from the eNB 200. If it is determined that the transmission fails (NACK), the UE 100 retransmits the data that failed to be transmitted at the time of the next uplink transmission (at the time of the PUSCH transmission). Further, the UE 100 may notify the eNB 200 of the determination result (ACK or NACK) by the Msg3. The UE 100 may perform the NACK notification to the eNB 200 only when the determination result is NACK.

Modified Example 3

A UE 100 according to the modified example 3 of the first embodiment transmits data to an eNB 200 by the early data transmission in an RRC idle mode. Thereafter, the UE 100 in the RRC idle mode monitors a physical channel hybrid ARQ indicator channel (PHICH) to receive, from the eNB 200, ACK or NACK corresponding to data transmitted by early data transmission.

In general, the UE 100 monitors the PHICH only in an RRC connected mode. However, it is assumed that the eNB 200 notifies of the ACK/NACK for the uplink early data transmission by the PHICH. Therefore, even if the UE 100 is in an RRC idle mode, the UE 100 monitors the PHICH to be able to understand whether the early data transmission is successful.

Modified Example 4

In modified example 4 of the first embodiment, a UE 100 or an eNB 200 determines whether data transmission is completed by early data transmission. When it is determined that the data transmission is completed by the early data transmission, the UE 100 terminates a random access procedure without transitioning from an RRC idle mode to an RRC connected mode. This enables efficient data transmission.

For example, in the case of uplink early data transmission, when UE 100 receives Msg4 (for example, RRC connection setup message) from the eNB 200, the UE 100 transmits a message (failure message) indicating failure or rejection to the eNB 200, so a random access procedure can be terminated. The message indicating failure or rejection may include information (for example, early data transmission completed) indicating the reason for failure or rejection.

In the case of downlink early data transmission, the eNB 200 notifies that the UE 100 that a random access procedure is terminated (that is, it is not necessary to complete) by Msg4 (for example, RRC connection setup message), and can terminate the random access procedure. Alternatively, the eNB 200 may transmit an RRC connection release message as the Msg4.

When the downlink early data is transmitted, the eNB 200 may notify that the downlink early data transmission is a downlink transmission of a small packet (small data amount) by transmitting a special paging message to the UE 100 before the random access procedure. Such a paging message may be generated by the MME 300 and transmitted from the MME 300 to the UE 100 via the eNB 200. The special paging message may include a combination of an identifier of the UE 100 and information indicating small packet transmission. When the UE 100 receives the special paging message, the UE 100 terminates the random access procedure without transitioning to the RRC connected mode after the data transmission is completed by the early data transmission.

Modified Example 5

In modified example 5 of the first embodiment, an eNB 200 transmits, to a UE 100, a preamble index indicating a preamble sequence to be applied to the random access preamble by a paging message. For example, the paging message may include a combination of an identifier of the UE 100 and a preamble index.

Prior to this operation, an MME 300 may perform a notification of "application of a non-contention based random access procedure" together with the identifier of the UE (UE ID) in an S1 paging message transmitted to the eNB 200 via an S1 interface. The MME 300 may perform a notification of "application of early data transmission" together with the UE ID in the S1 paging message. In addition, the eNB 200 notifies the MME 300 of (a plurality of) preamble indexes in advance, and the MME 300 notifies the eNB 200 of the selected one (if necessary) from the indexes with the S1 message.

The UE 100 (for example, UE in an RRC idle mode) receives the paging message from the eNB 200, and transmits, to the eNB 200, the random access preamble to which the preamble sequence indicated by the preamble index is applied. The eNB 200 can identify the UE 100 that is a random access preamble transmission source based on the preamble sequence applied to the random access preamble.

As a result, a non-contention based random access procedure can be performed in a situation where a contention based random access procedure is originally performed (for example, during initial connection). Therefore, contention resolution used for the contention based random access procedure cannot be required.

Modified Example 6

In modified example 6 of the first embodiment, a UE 100 or an eNB 200 transmits data by early data transmission. The data transmitted by the early data transmission is not applied with transmission of ACK or NACK corresponding to the data and is applied with repetition that repeatedly transmits the data by a predetermined number of times. As a result, reliability of data transmission can be improved even when the ACK or NACK is not used.

The UE 100 or the eNB 200 applies repetition to data transmitted by the early data transmission even when the UE 100 is not in enhanced coverage (that is, in normal coverage). In general, when the UE 100 is in the normal coverage, the repetition is not applied. On the other hand, in the modified example 6 of the first embodiment, regardless of whether the UE 100 is in the enhanced coverage, the transmission of the ACK or NACK is not applied to data transmitted by the early data transmission, and the repetition in which the data is repeatedly transmitted by a predetermined number of times.

For example, in the case of the uplink early data transmission, the eNB 200 does not transmit the ACK/NACK to the UE 100 even if uplink data is received by the early data transmission. However, the UE 100 performs the repetition of the same signal in a lower layer by the number of times defined in advance in the specification or the number of times set from the eNB 200.

In the case of downlink early data transmission, the UE 100 does not transmit the ACK/NACK to the eNB 200 even if downlink data is received by the early data transmission. However, the eNB 200 performs the repetition of the same signal in the lower layer by the number of times defined in advance in the specification or the number of times notified to the UE 100.

Modified Example 7

In modified examples 7 to 10 of the first embodiment, a scenario is assumed in which a predetermined message used for data transmission in early data transmission is Msg3. That is, the early data transmission in the modified examples 7 to 10 of the first embodiment is the uplink early data transmission. Note that as described above, Msg3 is a message transmitted from a UE 100 to an eNB 200, and is a message used to request that the UE 100 transitions from an idle mode to a connected mode. In the early data transmission, data (packet) transmitted by the Msg3 may be included in the Msg3. For example, the UE 100 transmits an RRC connection request message including a data PDU. Alternatively, the data (packet) transmitted by the Msg3 may be transmitted in combination (continuously) with the Msg3 as a message different from the Msg3. For example, the UE 100 may transmit one MAC PDU that includes a message including the data (packet) and the Msg3. The UE 100 may include the message including the data (packet) and the Msg3 in a separate MAC PDU and transmit the separate MAC PDU simultaneously or continuously.

In the description of modified examples 7 to 11 below, an example in which the Msg3 is an RRC connection request message will be described, but the Msg3 may be an RRC connection resume request message.

In the modified example 7, the above-described step A (that is, the step of transmitting information on whether to perform the early data transmission) includes a step of instructing the execution of the uplink early data transmission by a MAC random access response (MAC RAR) configuring the random access response (Msg2) transmitted from the eNB 200 to the UE 100.

A general random access response is configured as a MAC RAR, and has a timing advance command determined by the eNB 200 based on a random access preamble, allocation information (UL grant) in an uplink resource that the eNB 200 allocates to the UE 100 for the transmission of the RRC connection request message, and a temporary C-RNTI to which the eNB 200 allocates to the UE 100.

In the modified example 7, the eNB 200 that has received the random access preamble from the UE 100 determines whether the UE 100 executes the uplink early data transmission (that is, data transmission using the RRC connection request message) by the method according to the first embodiment or the modified examples thereof described above. When it is determined that the early data transmission is to be executed by the UE 100, the eNB 200 instructs the execution of the uplink early data transmission by the MAC RAR configuring the random access response. For example, when providing a new field in the MAC RAR, the eNB 200 includes a flag (permission bit) indicating that the data transmission using the RRC connection request message is executed in the new field. When the data transmission using the RRC connection request message is not executed, the eNB 200 does not include the flag indicating that the data transmission using the RRC connection request message is executed in the new field (or the flag is included as a zero value).

Alternatively, the eNB 200 may also notify the UE 100 whether to cause the UE 100 to perform the early data transmission by a MAC CE different from the MAC RAR configuring the random access response. The different MAC CE may be referred to as "early data transmission RAR", for example. In this case, the eNB 200 may include an identifier indicating the uplink and/or downlink early data transmission in the early data transmission RAR.

Note that as described in the modified example 1, the UE 100 notifies, by the random access preamble, the eNB 200 of the amount of data (uplink data) to be transmitted by the early data transmission. The eNB 200 determines the amount of uplink radio resource to be allocated to the UE 100 based on the amount of uplink data notified from the UE 100, and includes information indicating the determined uplink radio resource in the UL grant during the random access response (MAC RAR).

Modified Example 8

In the above-described modified example 4, when it is determined that the data transmission is completed by the early data transmission, the operation has been described in which the UE 100 terminates the random access procedure without transitioning from the RRC idle mode to the RRC connected mode. The modified example 8 relates to an operation example in the case of downlink early data transmission.

In the modified example 8, when data transmission is completed by an RRC connection request message, a UE 100 transmits the RRC connection request message including a flag indicating that the UE 100 does not need to transition to a connected mode (that is, it is not necessary to setup an RRC connection) from the UE 100 to an eNB 200. The flag is composed of 1 bit.

For example, when the amount of data to be transmitted to the eNB 200 is equal to or less than a maximum data amount that can be carried by the RRC connection request message, the UE 100 determines that the data transmission is completed by the RRC connection request message. In this case, when transmitting data using the RRC connection request message, the UE 100 includes a flag indicating that the UE 100 does not need to transition to the connected mode in the RRC connection request message. As a result, the RRC connection request message includes data transmitted by early data transmission and the flag indicating that the UE 100 does not need to transition to the connected mode. On the other hand, when the amount of data to be transmitted to the eNB 200 exceeds the maximum data amount that can be carried by the RRC connection request message, the UE 100 determines that the data transmission is not completed by the RRC connection request message. In this case, when transmitting data using the RRC connection request message, the UE 100 does not include the flag indicating that the UE 100 does not need to transition to the connected mode in the RRC connection request message (or, includes the flag as the zero value).

The eNB 200 receives, from the UE 100, the RRC connection request message including the data and the flag. Here, in the eNB 200, a data reception error (data decoding failure) included in the RRC connection request message may occur due to a radio state or a collision of the RRC connection request message.

When the eNB 200 has normally received the data included in the RRC connection request message, the eNB 200 indicates that the flag included in the RRC connection request message does not need to setup the RRC connection, so the Msg4 transmission to the UE 100 or an RRC connection release message is transmitted to the UE 100. On the other hand, when the reception error of the data included in the RRC connection request message occurs in the eNB 200, the eNB 200 continues the random access procedure to setup the RRC connection, for example, by transmitting the Msg4 to the UE 100. The UE 100 determines whether the data transmission by the RRC connection request message is successful based on a response status from the eNB 200 to the RRC connection request message.

Here, when the reception error of the data included in the RRC connection request message occurs in the eNB 200, the operation of the UE 100 will be described. When the UE 100 determines that the data transmission using the RRC connection request message has failed, the UE 100 executes any of the following operations 0) to 4).

0) Resume the random access procedure from the random access preamble (Msg1) transmission. Specifically, the random access procedure may be resumed from the selection of the preamble sequence. Then, the data may be retransmitted in the Msg3.

1) Retransmit the RRC connection request message with the data. In this case, the UE 100 includes the flag indicating that the UE 100 does not need to transition to the connected mode in the RRC connection request message.

2) Retransmit the RRC connection request message without the data. In this case, the UE 100 does not include the flag indicating that the UE 100 does not need to transition to the connected mode in the RRC connection request message. The UE 100 transmits (retransmits) the data after transitioning to the connected mode.

3) Transmit the data, which is the message transmitted from the UE 100 to the eNB 200, by the Msg5 used to notify of the completion of the transition to the connected mode. In this case, the UE 100 may transition to the connected mode. Alternatively, the UE 100 may transmit data to the eNB 200 instead of transmitting the Msg5. The eNB 200 may notify the UE 100 whether the reception of data from the UE 100 is successful by the Msg6.

4) Transition to the connected mode.

In the modified example 8, the UE 100 may transmit the RRC connection request message with the information indicating that the UE 100 does not need to transition to the connected mode instead of the RRC connection request message including the flag indicating that the UE 100 does not need to transition to the connected mode (that is, it is not necessary to setup the RRC connection). The UE 100 may transmit a MAC CE including the information indicating that the UE 100 does not need to transition to the connected mode. For example, the MAC CE is a buffer status report (BSR). The BSR is the MAC CE indicating the amount of data (that is, the amount of uplink transmission waiting data) that the UE 100 can use for uplink transmission.

Figure 16:
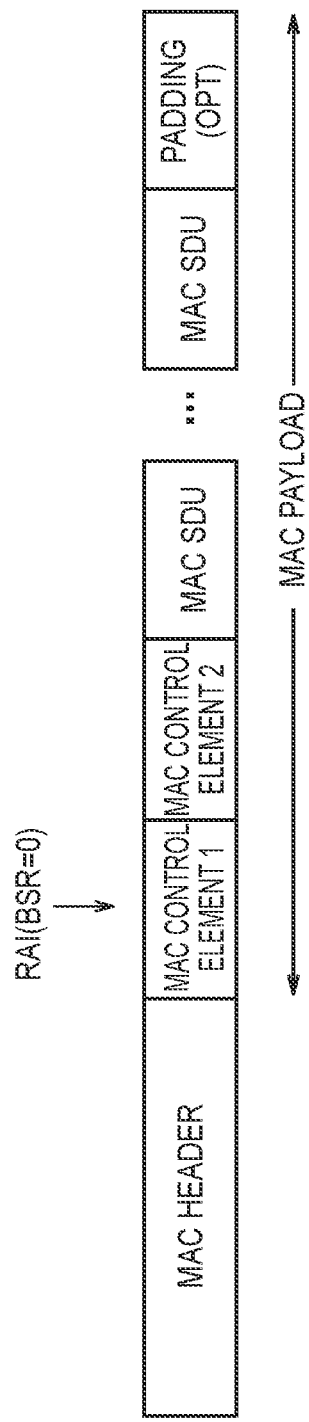
FIG. 16 is a diagram illustrating an example of a MAC PDU according to modified example 8 of the first embodiment.

FIG. 16 is a diagram illustrating an example of a MAC protocol data unit (MAC PDU) generated by a MAC layer. As illustrated in FIG. 16, the MAC PDU includes a MAC service data unit (MAC SDU) provided to a MAC layer from a higher layer than the MAC layer. RRC messages such as an RRC connection request message and an RRC connection resume request message are generated by the RRC layer and provided to the MAC layer as the MAC SDU. Uplink data transmitted by the early data transmission are provided to the MAC layer as the MAC SDU through the PDCP layer and the RLC layer. The uplink data may be provided to the MAC layer as the MAC SDU without passing through the PDCP layer and the RLC layer.

The MAC PDU includes a MAC header and a MAC control element (MAC CE) generated by the MAC layer in addition to the MAC SDU. The MAC PDU further includes padding for filling a free area of the MAC PDU. Although FIG. 16 illustrates an example in which the MAC PDU includes two MAC Ces, the number of MAC Ces may be three or more or one. The MAC CE constituting the BSR includes a buffer size field for storing a value (index) indicating the amount of data available for the uplink transmission. The UE 100 includes, in the buffer size field, the value indicating that the amount of data available for the uplink transmission is zero as the information indicating that the UE 100 does not need to transition to the connected mode. Such a BSR may be referred to as release assistance information (RAI).

In the early data transmission, when the data transmission is completed by the RRC connection request message (Msg3), the UE 100 may collects, by one MAC PDU, one or a plurality of MAC SDUs including the uplink data and the RRC connection request message and the MAC CE including the information (BSR=0) indicating that the UE 100 does not need to transition to the connected mode, and transmits the collected MAC SDUs and MAC CE to the eNB 200. Alternatively, the UE 100 may continuously transmit, by a separate MAC PDU, to the eNB 200, one or a plurality of MAC SDUs including the uplink data and the RRC connection request message, and the MAC CE including the information (BSR=0) indicating that the UE 100 does not need to transition to the connected mode. The eNB 200 determines that the UE 100 does not need to transition to the connected mode based on "BSR=0" accompanying the RRC connection request message.

Modified Example 9

In modified examples 9 to 12 of the first embodiment, a scenario is assumed in which a predetermined message used for data transmission in early data transmission is Msg4. That is, the early data transmission in the modified examples 9 to 11 of the first embodiment is downlink early data transmission. Note that as described above, the Msg4 is a message transmitted from an eNB 200 to a UE 100, and is a message used for transitioning the UE 100 from an idle mode to a connected mode.

In the description of modified examples 9 to 12 below, an example in which the Msg4 is an RRC connection setup message will be described, but the Msg4 may be an RRC connection resume message.

In the modified example 9, the UE 100 in the idle mode starts a random access procedure. While the UE 100 is in the idle mode, the eNB 200 may not retain context information of the UE 100 (including information related to capability of the UE 100). In this case, the eNB 200 does not understand whether the UE 100 has the capability to handle downlink early data transmission, and is hard to determine whether to perform the downlink early data transmission.

Therefore, in the modified example 9, the UE 100 notifies the eNB 200 whether to correspond to (support) the downlink early data transmission by using either the random access preamble (Msg1) or the RRC connection request message. For example, the UE 100 having the capability to perform the downlink early data transmission transmits, to the eNB 200, information (identifier) indicating that the UE 100 has the capability to perform the downlink early data transmission by either the random access preamble (Msg1) or the RRC connection request message. In the case of using the random access preamble (Msg1), the method of operation pattern 1 of the above-described first embodiment can be used. Based on the notification from the UE 100, the eNB 200 determines whether the UE 100 corresponds to the downlink early data transmission. Here, the "UE 100 corresponds to (supports) the downlink early data transmission" and the "UE 100 has the capability to perform downlink early data transmission" may mean that the UE 100 has the capability (function) to "receive" data transmitted from the eNB 200 by the downlink early data transmission.

Note that the UE 100 may notify the eNB 200 of the capability of the downlink early data transmission by the random access preamble only when a paging message (see the operation pattern 3 according to the above-described first embodiment) to perform the downlink early data transmission is received from the eNB 200. The paging message may include information explicitly indicating that the downlink early data transmission is performed. The paging message may include information (for example, information on a PRACH resource used for the random access preamble transmission indicating that the UE 100 has the capability of the downlink early data transmission) implicitly indicating that the downlink early data transmission is performed.

In addition, the UE 100 may notify the eNB 200 of the capability of the downlink early data transmission by the RRC connection request message only when Msg2 (see the modified example 7 described above) indicating the downlink early data transmission is received from the eNB 200. The Msg2 may include the information explicitly indicating that the downlink early data transmission is performed. The Msg2 may include the information implicitly indicating that the downlink early data transmission is performed.

Modified Example 10

In modified example 9, an example has been described in which a UE 100 notifies an eNB 200 whether the UE 100 corresponds to (supports) downlink early data transmission. However, a mobility management device (MME300) provided in a core network (EPC20) may notify the eNB 200 whether the UE 100 has capability to perform the downlink early data transmission. Prior to this operation, the UE 100 notifies the MME 300 of information indicating that the UE 100 has the capability to perform the downlink early data transmission, and the MME 300 may retain a UE context including the information for a certain period (for example, while the UE 100 is in an EMM registered state).

The MME 300 may notify the eNB 200 of the capability by a paging message (S1 paging message), or may notify the eNB 200 by an INITIAL CONTEXT SETUP message. When the MME 300 transmits data to the UE 100 by NAS signaling, the MME 300 may notify the eNB 200 of the capability by NAS signaling or an S1 message.

Modified Example 11

In the above-described modified example 4, when it is determined that the data transmission is completed by the early data transmission, the operation has been described in which the UE 100 terminates the random access procedure without transitioning from the RRC idle mode to the RRC connected mode. The modified example 8 relates to an operation example in the case of downlink early data transmission.

In modified example 11, an eNB 200 determines either a first message or a second message as a message (predetermined message) used for the data transmission based on the amount of data transmitted to a UE 100 by downlink early data transmission. The first message is an RRC connection setup message used to transition the UE 100 from an idle mode to a connected mode. The second message is a message used to keep UE 100 in the idle mode. Although an example of using an RRC connection release message as the second message will be described, the second message may be a new message.

For example, when the amount of data to be transmitted to the UE 100 is equal to or less than a maximum data amount that can be carried by the RRC connection release message, the eNB 200 determines that the data transmission is completed by the RRC connection release message. In this case, the eNB 200 transmits the RRC connection release message including data to the UE 100 instead of transmitting an RRC connection setup message. As a result, the random access procedure can be stopped halfway and the UE 100 can be prevented from transitioning to the connected mode. On the other hand, when the amount of data to be transmitted to the UE 100 exceeds a maximum data amount that can be carried by the RRC connection release message, the eNB 200 determines that the data transmission is not completed by the RRC connection release message. In this case, the eNB 200 transmits an RRC connection setup message including data to the UE 100. This allows the UE 100 to continue the random access procedure.

Alternatively, instead of changing the message, the UE 100 may be notified of the termination of the data transmission by the RRC connection setup message. For example, when the amount of data to be transmitted to the UE 100 is equal to or less than the maximum data amount that can be carried by the RRC connection setup message, the eNB 200 determines that the data transmission is completed by the RRC connection setup message. In this case, the eNB 200 transmits, to the UE 100, the RRC connection setup message including data and information indicating the termination of the data transmission (a so-called end marker). As a result, the random access procedure can be stopped halfway and the UE 100 can be prevented from transitioning to the connected mode. On the other hand, when the amount of data to be transmitted to the UE 100 exceeds the maximum data amount that can be carried by the RRC connection setup message, the eNB 200 determines that the data transmission is not completed by the RRC connection setup message. In this case, the eNB 200 transmits, to the UE 100, the RRC connection setup message that includes data and does not include the end marker. This allows the UE 100 to continue the random access procedure.

Modified Example 12

In the above-described modified example 8, when the UE 100 determines that the data transmission by the RRC connection request message (Msg3) has failed, an example has been described in which the RRC connection request message with the data is retransmitted.

This retransmission operation can also be applied to the downlink early data transmission. In the modified example 9, the eNB 200 transmits the RRC connection setup message (Msg4) with data to the UE 100 by the early data transmission, and then determines whether the data transmission by the RRC connection setup message is successful. The eNB 200 may make the determination based on, for example, HARQ ACK or HARQ NACK in a MAC layer. When the eNB 200 determines that the data transmission using the Msg4 has failed, the eNB 200 retransmits the Msg4 with data. When the downlink early data transmission is set and the Msg4 reception fails, the UE 100 determines that the data is also retransmitted in the Msg4 retransmission. The UE 100 (for example, a higher layer (RRC layer or the like) than the MAC layer of the UE 100) waits so that both the RRC message (RRC connection reconfiguration) reception and the data reception configuring the Msg4 can be performed.

Modified Example 13

A modified example 13 is an example related to both uplink early data transmission and downlink early data transmission.

In the modified example 13, an UE 100 and/or an eNB 200 determines that the early data transmission is not performed in one of the uplink and the downlink for a random access procedure in which the early data transmission is performed in the other of the uplink and the downlink is performed. Thereby, in one random access procedure performed by one UE 100, only one of uplink early data transmission and downlink early data transmission can be performed.

If both the uplink early data transmission and the downlink early data transmission can be implemented in one random access procedure, there is a concern that control regarding the early data transmission becomes complicated. In addition, the following problems may occur. For example, after transmitting data by the RRC connection request message (Msg3), the UE 100 should wait for response data (for example, TCP ACK) corresponding to the data to be transmitted by an RRC connection setup message (Msg4). Since such response data is affected by a delay in the network, it is not preferable that the UE 100 continues to wait for the response data to be transmitted by the RRC connection setup message (Msg4). Therefore, in one random access procedure, such a problem can be avoided by enabling only one of the uplink early data transmission and the downlink early data transmission.

In the modified example 13, when the UE 100 performs the data transmission by the RRC connection request message (Msg3), the UE 100 determines not to perform the data reception by the RRC connection setup message (Msg4). In other words, for the random access procedure in which the uplink early data transmission using the Msg3 is performed, the UE 100 determines not to perform downlink early data transmission using the Msg4. For example, it is assumed that the UE 100 is notified by a paging message that the downlink early data transmission using the Msg4 is performed (see the operation pattern 3 of the first embodiment), or is notified by a random access response that the downlink early data transmission using the Msg4 is performed (see Modified Example 7). Even in this case, when the UE 100 performs the data transmission by the RRC connection request message (Msg3), the UE 100 may determine not to perform the data reception by the RRC connection setup message (Msg4). Further, when the eNB 200 receives data by the RRC connection request message (Msg3), the eNB 200 may determine not to perform the data transmission by the RRC connection setup message (Msg4).

In the modified example 13, when the UE 100 performs the data reception by the RRC connection setup message (Msg4), the UE 100 determines not to perform the data transmission by the RRC connection request message (Msg3). In other words, for the random access procedure in which the downlink early data transmission using the Msg4 is performed, the UE 100 determines not to perform the uplink early data transmission using the Msg3. For example, it is assumed that the UE 100 is notified by the paging message that the downlink early data transmission using the Msg4 is performed (see the operation pattern 3 of the first embodiment), or is notified by the random access response (Msg2) that the downlink early data transmission using the Msg4 is performed (see Modified Example 7). In such a case, even if the UE 100 has uplink transmission data, the UE 100 determines to perform the downlink early data transmission using the Msg4, and determines not to perform the uplink transmission data using the Msg3.

In the modified example 13, a scenario is considered in which the UE 100 having the capability to perform the early data transmission transmits, to the eNB 200, a notification (identifier) indicating that the UE 100 has the capability to perform the early data transmission by one of the random access preamble (Msg1) and the RRC connection request message (Msg3) (see modified example 9).

In such a scenario, when the information indicating that the downlink early data transmission is performed is transmitted from the eNB 200 to the UE 100 by the paging message or the Msg2, if the eNB 200 receives, from the UE 100, the notification indicating that the UE 100 has the capability to perform the early data transmission, the eNB 200 interprets the notification as indicating the capability to perform the downlink early data transmission. When receiving, from the eNB 200, the information indicating that the downlink early data transmission is performed, the UE 100 having the capability and/or indication to perform the downlink early data transmission notifies the eNB 200 of the capability and/or indication to perform the downlink early data transmission by transmitting, to the eNB 200, the notification indicating that the UE 100 has the capability to perform the early data transmission.

On the other hand, when the information indicating that the downlink early data transmission is performed is not transmitted from the eNB 200 to the UE 100 by the paging message or the Msg2, if the eNB 200 receives, from the UE 100, the notification indicating that the UE 100 has the capability to perform the early data transmission, the eNB 200 interprets the notification as indicating the capability and/or indication to perform the uplink early data transmission. When not receiving, from the eNB 200, the information indicating that the downlink early data transmission is performed, the UE 100 having the capability and/or indication to perform the uplink early data transmission notifies the eNB 200 of the capability and/or indication to perform the uplink early data transmission by transmitting, to the eNB 200, the notification indicating that the UE 100 has the capability to perform the early data transmission.

In this way, the meaning of the notification is made different depending on whether the information indicating that the downlink early data transmission is performed is transmitted. Thereby, one type of notification (for example, one information element) can play two roles.

Modified Example 14

Unlike the modified example 13, in a modified example 14, a scenario is assumed in which both uplink early data transmission and downlink early data transmission can be implemented in one random access procedure.

In a general random access procedure, when a UE 100 transmits Msg3 without data, the UE 100 activates a first timer, which defines a waiting time to wait for reception of Msg4 transmitted from an eNB 200, at the time of transmitting the Msg3 without data. Such a first timer may be referred to as a contention resolution timer. The first timer is set in the UE 100 from the eNB 200 by a SIB. When the first timer expires without receiving the Msg4, the UE 100 stops processing of receiving the Msg4 (for example, monitoring of PDCCH) and resumes a random access procedure from Msg1 transmission.

However, as described above, after data by the RRC connection request message (Msg3) are transmitted, when response data (for example, TCP ACK) corresponding to the data is transmitted by the RRC connection setup message (Msg4), there is a possibility that the first timer does not have enough waiting time. Therefore, in the modified example 14, a second timer for the early data transmission is introduced separately from the first timer. The UE 100 in which both the first timer and the second timer are set selects the first timer when the Msg3 transmission does not involve data transmission, and the second timer when the Msg3 transmission involves data transmission.

In the modified example 14, when the UE 100 transmits the Msg3 with data by the early data transmission, the UE 100 activates the second timer which defines a waiting time to wait for the reception of the Msg4 transmitted with data from the eNB 200. A length of the waiting time corresponding to the second timer is different from a length of the waiting time corresponding to the first timer. For example, the waiting time set in the second timer can be made longer than the waiting time set in the first timer. For example, the maximum waiting time that can be set in the second timer is longer than the maximum waiting time that can be set in the first timer. The second timer is set in the UE 100 from the eNB 200 by a SIB. Alternatively, since context information is held in a network (and UE 100) for the UE 100 in an RRC suspend state, the second timer is set in the UE 100 by the individual RRC message while the UE 100 is in a connected mode, the setting of the second timer is held in the network while the UE 100 is in the connected mode, and the held setting may be used for the random access procedure. When the second timer expires without receiving the Msg4 with data, the UE 100 stops processing of receiving the Msg4 (for example, monitoring of PDCCH) and resumes a random access procedure from Msg1 transmission.

Alternatively, assuming that the early data transmission is applied to eMTC UE and NB-IoT UE, power saving of the UE 100 can be prioritized. Therefore, the waiting time set in the second timer can be made shorter than the waiting time set in the first timer. Thereby, the processing of receiving the Msg4 can be terminated early.

Note that each of the first timer and the second timer may be a timer managed in the RRC layer or a timer managed in the MAC layer. The first timer managed in the RRC layer may be referred to as "T300". The first timer managed in the MAC layer may be referred to as "contention resolution timer".

The timer value of the second timer (that is, the waiting time of the Msg4) is not limited to the case where the timer value is determined by the eNB 200 to be set in the UE 100, but may be determined by the UE 100. A round trip time, which is the time from when the UE 100 transmits the uplink data until the higher layer ACK (for example, TCP ACK) returns to the UE 100, can be estimated in the higher layer of the UE 100. Therefore, the UE 100 can determine a more appropriate timer value by determining the timer value of the second timer. The UE 100 may determine the timer value to be set in the second timer and notify the eNB 200 of the determined timer value. The notification of the timer value is performed by the Msg3. The notification of the timer value may be performed by the Msg1 (preamble transmission).

Figure 17:
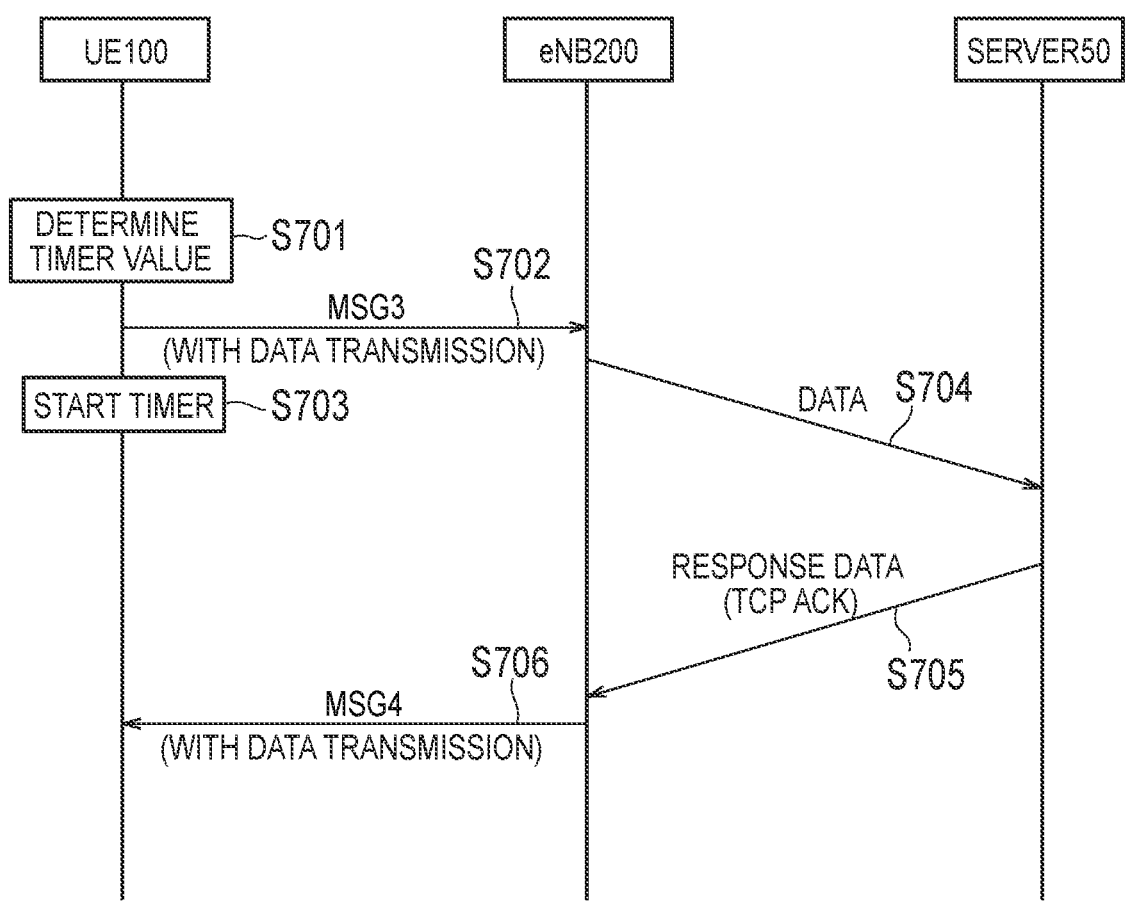
FIG. 17 is a diagram illustrating an example of an operation of modified example 14 of the first embodiment.

FIG. 17 is a diagram illustrating an example of an operation of the modified example 14. In FIG. 17, a server 50 is provided in a higher network (for example, the Internet) than a core network (EPC). In addition, in FIG. 17, a network entity (for example, S-GW) between the eNB 200 and the server 50 is not illustrated.

As illustrated in FIG. 17, in step S701, the UE 100 determines the timer value to be set in the second timer. UE 100 may determine the timer value of the second timer based on the estimated value of the round trip time.

In step S702, the UE 100 transmits the Msg3 with data to the eNB 200 by the uplink early data transmission. The UE 100 notifies the eNB 200 of the determined timer value by the Msg3. The eNB 200 can understand the Msg4 waiting time in the UE 100 by such notification.

The UE 100 may notify, by Msg1 (preamble transmission), the eNB 200 that the second timer is used. Then, the UE 100 may use the second timer and notify the eNB 200 of the timer value by the Msg3 only when the use permission of the second timer is notified from the eNB 200 by the Msg2.

The eNB 200 may broadcast (for example, transmit by SIB) timer value candidates (a list including indexes for each range of the timer values). In this case, the UE 100 may notify eNB 200 of the index of the timer value by the Msg3.

The eNB 200 may broadcast (for example, transmission by SIB) a default timer value of the second timer. In this case, the UE 100 basically uses a default timer value. The UE 100 may autonomously determine the timer value only when it is desired to overwrite the default timer value, and notify the eNB 200 of the determined timer value by the Msg3. A value of the "T300" may be a default timer value, and a value of the "contention resolution timer" may be a default timer value. Furthermore, when the UE 100 determines the timer value of the second timer, there may be a restriction that the UE 100 should determine a timer value that is equal to or greater than the default timer value.

The eNB 200 may broadcast (for example, transmission by SIB) a maximum value of the timer value that can be set by the UE 100. The UE 100 determines a timer value equal to or less than the maximum value broadcast from the eNB 200 and notifies the eNB 200 of the determined timer value. However, when the UE 100 determines the maximum value broadcast from the eNB 200 as the timer value, the UE 100 may not notify the eNB 200 of the determined timer value. When the timer value is not notified from the UE 100, the eNB 200 may consider that the UE 100 has determined the maximum value. Note that the UE 100 may determine a timer value equal to or less than the default maximum value using the default maximum value defined in advance when the maximum value is not designated by the broadcast from the eNB 200.

The eNB 200 may broadcast (for example, transmission by SIB) a minimum value of the timer value that can be set by the UE 100. The UE 100 determines a timer value equal to or greater than the minimum value broadcast from the eNB 200 and notifies the eNB 200 of the determined timer value. However, when the UE 100 determines the minimum value broadcast from the eNB 200 as the timer value, the UE 100 may not notify the eNB 200 of the determined timer value. When the timer value is not notified from the UE 100, the eNB 200 may consider that the UE 100 has determined the minimum value. Note that the UE 100 may determine a timer value equal to or greater than the default minimum value using the default minimum value defined in advance when the minimum value is not designated by the broadcast from the eNB 200.

In step S703, the UE 100 activates (initiates) the second timer in which the determined timer value is set when the Msg3 is transmitted.

In step S704, the eNB 200 transfers, to the server 50, data received from the UE 100 by the Msg3.

In step S705, the server 50 transmits the response data (TCP ACK) to the eNB 200.

In step S706, the eNB 200 transmits, to the UE 100, the Msg4 with the response data (TCP ACK) by the downlink early data transmission.

In the sequence of FIG. 17, it is assumed that the Msg3 transmission is successful. However, it is also assumed that the Msg3 transmission fails, the HARQ NACK (retransmission request) is transmitted from the eNB 200 to the UE 100, and the UE 100 performs the Msg3 retransmission by the HARQ. The UE 100 may continue the operation of the second timer without resuming (reactivating) the second timer when performing the Msg3 retransmission by the HARQ after activating the second timer. Thereby, it is possible to avoid a mismatch between the TCP ACK waiting time set by the higher layer based on the round trip time and the Msg4 waiting time set by the access layer. Alternatively, after activating the second timer, the UE 100 may resume (reactivate) the second timer when performing the Msg3 retransmission by the HARQ.

In the operation of the above modified example 14, it is assumed that the first timer is "T300" or "contention resolution timer", and the second timer is a new timer for the early data transmission. That is, it is assumed that the first timer for the random access procedure with the early data transmission and the second timer for the random access procedure without the early data transmission are defined as separate timers.

Here, the "T300" is a timer that defines the maximum waiting time when the UE 100 transmits the Msg3 and then receives the Msg4 (specifically, an RRC message) in the random access procedure (or RRC connection establishment procedure), and is managed in the RRC layer. The "contention resolution timer" is a timer that defines the maximum waiting time when the UE 100 transmits the Msg3 and then receives the Msg4 (specifically, MAC CE) in the random access procedure, and is managed in the MAC layer.

However, instead of introducing such a new timer (second timer), two types of timer values are defined as timer values for setting the first timer ("T300" or "contention resolution timer"), so it is possible to implement an operation similar to the operation of the above-described modified example 14. Thereby, compared with the case where the new timer is introduced, the influence of the system specification change can be reduced. Also, instead of setting the two timers (first timer and second timer), only one timer (first timer) needs to be set, so the processing load on UE 100 is also reduced.

In the following modified example 14, the operation when two types of timer values are defined as timer values for setting the first timer will be described. Here, the "T300" is exemplified as the first timer, but the first timer may be the "contention resolution timer".

In such a case, the eNB 200 transmits, to the UE 100, the first timer value for the random access procedure without the early data transmission and the second timer value for the random access procedure with the early data transmission. The second timer value is a value greater than the first timer value. Alternatively, the second timer value is a value smaller than the first timer value.

The eNB 200 transmits the first timer value and the second timer value by broadcast. For example, the eNB 200 transmits, by the SIB, the "T300" (first timer value) that is the existing information element in the SIB and "T300-EDT" that is a new information element in the SIB. The eNB 200 may include the first timer value and the second timer value in the same SIB, or may include the first timer value and the second timer value in different SIBs.

In response to determining that the early data transmission is performed, the UE 100 selects the second timer value of the first timer value and the second timer value and sets the selected second timer value in the first timer. The UE100 starts the timer (first timer) which sets the second timer value when transmitting uplink data by the early data transmission. Specifically, transmitting the uplink data by the early data transmission means that the UE 100 transmits uplink user data at the time of transmitting the Msg3.

Figure 18:
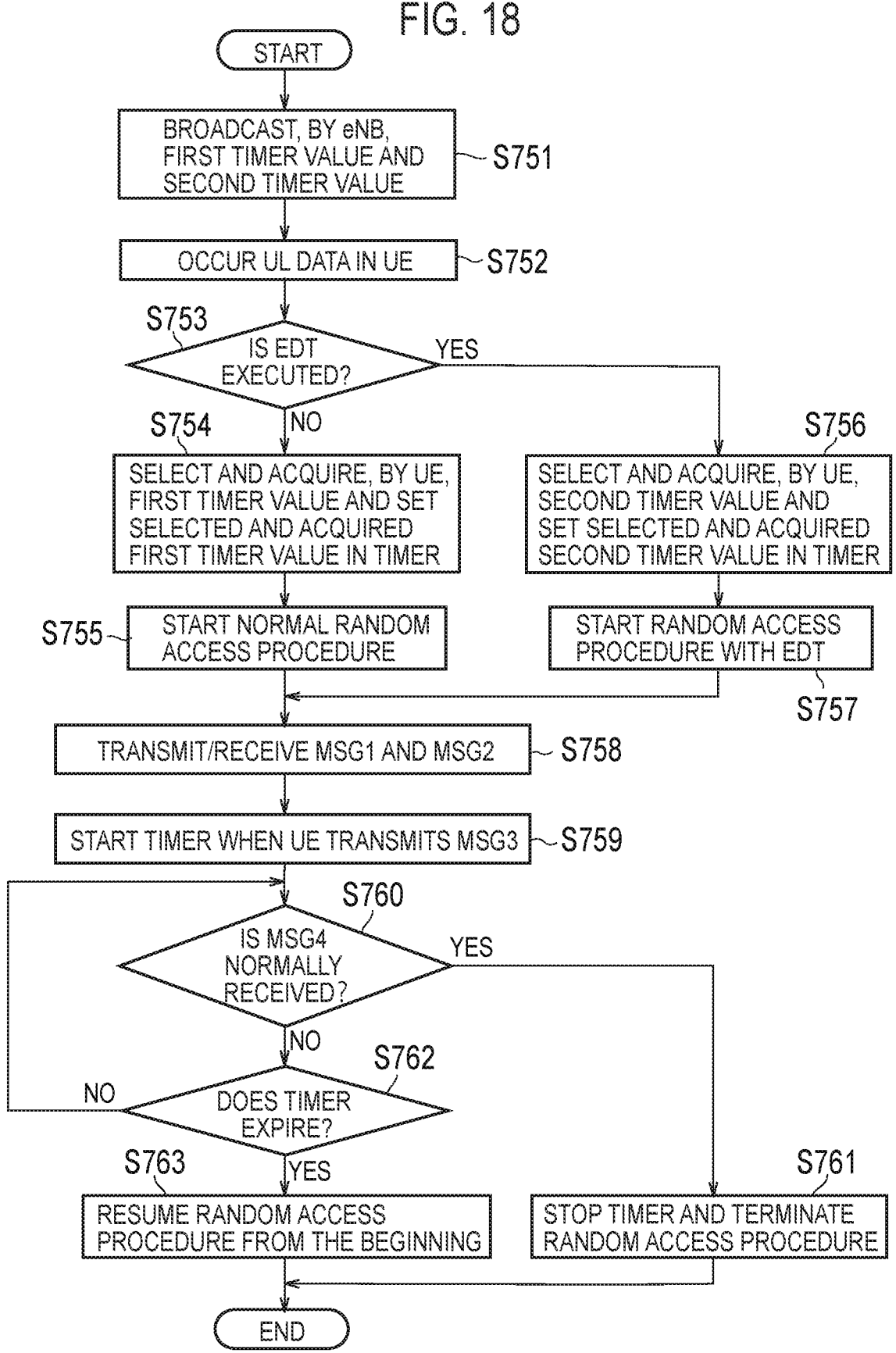
FIG. 18 is a diagram illustrating another example of the operation of the modified example 14 of the first embodiment.

FIG. 18 is a diagram illustrating an operation when two types of timer values are defined.

As illustrated in FIG. 18, the eNB 200 transmits the first timer value and the second timer value by broadcast in step S751. The eNB 200 transmits the first timer value and the second timer value by a predetermined period.

In step S752, the UE 100 in the RRC idle mode detects that the uplink data to be transmitted to the network are generated, and determines that it is necessary to start the random access procedure.

In step S753, the UE 100 determines whether to perform the early data transmission (EDT). For example, when the amount of uplink data to be transmitted is equal to or less than the maximum amount of uplink data (transport block size) set by the broadcast from the eNB 200, the UE 100 determines to perform the EDT.

When it is determined that the normal random access procedure is performed without performing the early data transmission (step S753: NO), in step S754, the UE 100 selects the first timer value and sets the first timer value in the timer (first timer). In step S755, the UE 100 starts the normal random access procedure.

On the other hand, when the UE 100 determines to perform the early data transmission (step S753: YES), in step S756, the UE 100 selects the second timer value and sets the second timer value in the timer (first timer). In step S757, the UE 100 starts the random access procedure with the early data transmission.

When the random access procedure is started, in step S758, the UE 100 and the eNB 200 transmits and receive the Msg1 and the Msg2. The UE 100 and the eNB 200 may vary the contents of the Msg1 and the Msg2 depending on whether the early data transmission is involved.

In step S759, the UE 100 transmits the Msg3 to the eNB 200. When performing the early data transmission, the UE 100 transmits the uplink data to the eNB 200 along with the Msg3 transmission. The UE 100 starts a timer (first timer) at the time of transmitting the Msg3.

In step S760, the UE 100 determines whether the Msg4 has been normally received from the eNB 200. When the Msg4 is normally received from the eNB 200 (step S760: YES), in step S761, the UE 100 stops the timer (first timer) and terminates the random access procedure or transmits the RRC connection complete message and then terminates the random access procedure. When the UE 100 performs the normal random access procedure, the UE 100 transitions to the RRC connected mode. On the other hand, when performing the early data transmission, the UE 100 maintains the RRC idle mode without transitioning to the RRC connected mode. Note that the fact that the UE 100 normally receives the Msg4 from the eNB 200 may mean that the UE 100 decodes the Msg4 addressed to the UE 100 received from the eNB 200 and can acquire the contents of the Msg4.

On the other hand, when the timer (first timer) has expired without normally receiving the Msg4 from the eNB 200 (step S760: NO, step S762: YES), in step S763, the UE 100 resumes the random access procedure from the beginning or terminates the random access procedure.

Note that in the flow of FIG. 18, the UE 100 determines whether to perform the early data transmission before starting the random access procedure (step S753). However, the UE 100 transmits early data transmission (EDT) indication by the Msg1 or transmits the EDT indication using the physical random access channel (PRACH) establishment for the early data transmission (EDT), and may determine that the UE 100 performs (is performing) the early data transmission when the UE 100 performs the uplink early data transmission (UL EDT) by the Msg3 (transmits the user data along with the Msg3), in the case where the early data transmission (EDT) is allowed to be performed by the Msg2, the case where the EDT grant including the resource regarding the early data transmission is received by the Msg2, the case where the DCI for the early data transmission (EDT) is received, or the case where the UL grant including the uplink resource enough to implement the early data transmission (EDT) is received. In such a case, the UE 100 sets the timer value in the timer (first timer) after receiving the Msg2 without setting the timer value in the timer (first timer) until the Msg2 is received.

Note that the UE 100 may determine to perform the early data transmission in any of the above cases. That is, in the above case, the UE 100 determines that the early data transmission is performed (being performed) in one of the case where the UE 100 transmits the Msg1, the case where the UE 100 receives the Msg2, or the case where the UE 100 transmits the Msg3.

Modified Example 15

In the above-described modified example 14, an example has been described in which the ACK of the higher layer is transmitted from the eNB 200 to the UE 100 by the Msg4. In this case, after transmitting the Msg3, UE 100 should continue to monitor the PDCCH for each subframe until the UE 100 receives the Msg4 (or until the second timer has expired). In particular, when the ACK of the higher layer is delayed, there is a concern that the power consumption increases since the UE 100 continuously monitors the PDCCH.

In a modified example 15, an eNB 200 transmits Msg4 to a UE 100 without waiting for an arrival of ACK of a higher layer, so the UE 100 can stop continuously monitoring PDCCH. In addition, the eNB 200 notifies, by the Msg4, the UE 100 that data (ACK of a higher layer) is scheduled to be transmitted to the UE 100 after transmitting the Msg4. The Msg4 transmission may include transmission of information indicating that the UE 100 is maintained in an RRC idle mode. Thereby, the UE100 can wait for reception of downlink data while maintaining the RRC idle mode. That is, when receiving the Msg4, the UE 100 waits for downlink data (ACK of the higher layer) without transitioning to an RRC connected mode. While waiting for the downlink data, the UE 100 may intermittently monitor the PDCCH in discontinuous subframes by discontinues reception (DRX).

Figure 19:
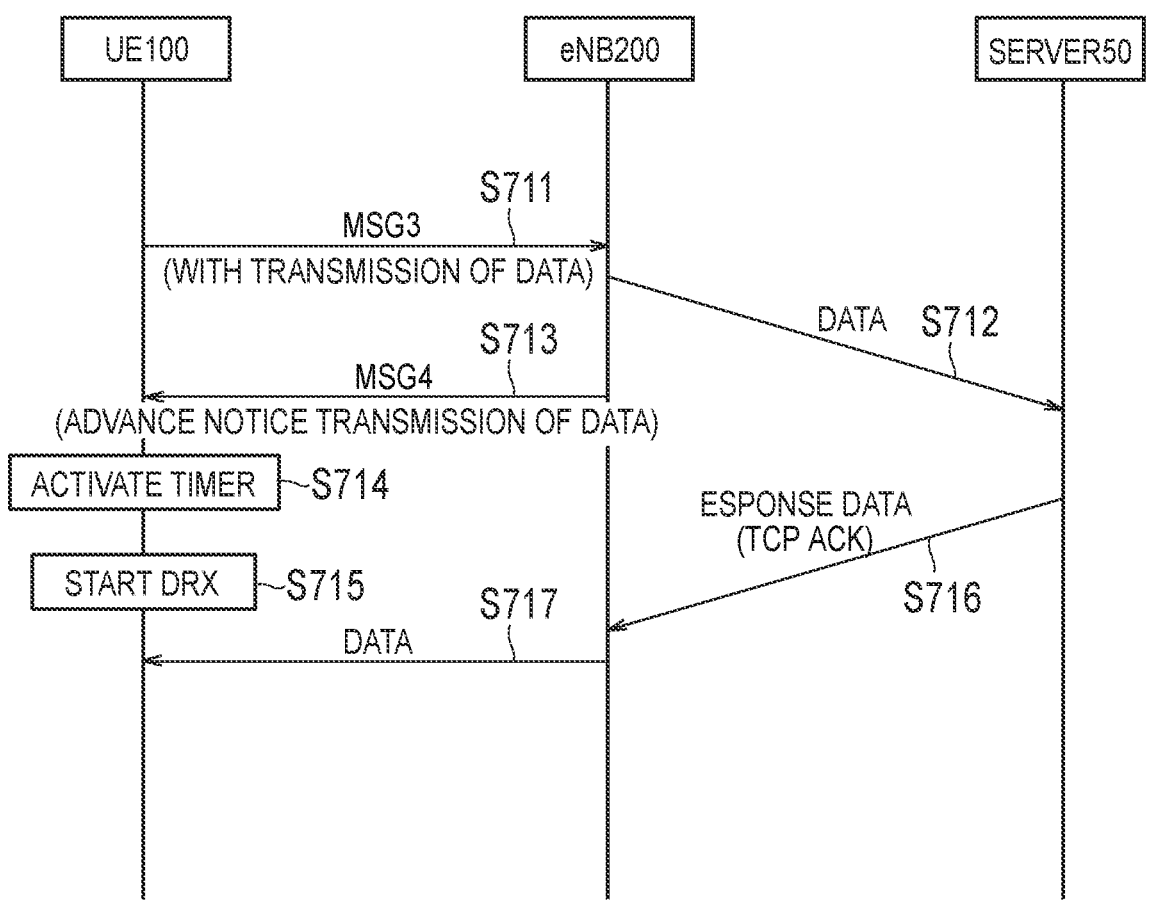
FIG. 19 is a diagram illustrating an example of an operation of modified example 15 of the first embodiment.

FIG. 19 is a diagram illustrating an example of an operation of the modified example 15. In FIG. 19, a server 50 is provided in a higher network (for example, the Internet) than a core network (EPC). In addition, in FIG. 19, a network entity (for example, S-GW) between the eNB 200 and the server 50 is not illustrated.

As illustrated in FIG. 19, in step S711, the UE 100 transmits the Msg3 with data to the eNB 200 by the uplink early data transmission.

In step S712, the eNB 200 transfers, to the server 50, data received from the UE 100 by the Msg3.

In step S713, the eNB 200 transmits the Msg4 to the UE 100. The eNB 200 transmits, by the Msg4, to the UE 100, information indicating that the UE 100 is to be maintained in the RRC idle mode and a notice indicating that downlink data transmission (that is, downlink early data transmission) is scheduled to be performed after the Msg4 transmission. The eNB 200 determines whether to perform the downlink early data transmission, for example, by any one of the following methods 1) to 3).

1) The eNB 200 learns a past traffic pattern, and the like and determines whether to perform the downlink early data transmission based on the learned result.

2) The downlink early data transmission indication is notified from an MME to the eNB 200, and the eNB 200 determines whether to perform the downlink early data transmission based on the notification from the MME.

3) The Msg3 notifies, by the UE 100, the eNB 200 that the downlink early data transmission (whether there is the ACK of the higher layer) is likely to be generated, and the eNB 200 determines whether to perform the downlink early data transmission based on the notification from the UE 100.

The notice transmitted from the eNB 200 to the UE 100 by the Msg4 may include information indicating expected timing (for example, after 10 seconds) when the downlink early data transmission is generated. The notice may be included in a MAC CE or may be included in an RRC message.

In step S714, the UE 100 that has received the Msg4 may activate a timer that defines a reception waiting time of downlink data. A timer value (threshold) of the timer may be set from the eNB 200 to the UE 100 by the SIB, the Msg4, or the Msg2. When the timer expires without receiving the downlink data, the UE 100 may terminate the waiting for the downlink data.

In step S715, the UE 100 starts DRX and intermittently monitors PDCCH. Configuration information of the DRX may be notified from the eNB 200 to the UE 100 by the SIB or the Msg4. The DRX operation may be an operation according to the DRX in the RRC connected mode or an operation according to the DRX in the RRC idle mode.

A case where the operation conforms to the DRX in the RRC connected mode will be described. A DRX cycle set from the eNB 200 to the UE 100 in the DRX started in step S715 is preferably longer than a DRX cycle that can be set in the DRX in the RRC connected mode. At present, a maximum value of the DRX cycle in the RRC connected mode is a time (that is, 10.24 seconds) corresponding to 1024 radio frames. As a method for setting a DRX cycle to be longer than 10.24 seconds, one of the following methods a) and b) can be used by applying extended DRX (eDRX) mechanism. In the eDRX, a hyperframe is introduced. The hyperframe is a time unit having a time length of 1024 radio frames. The current hyperframe number (H-SFN) is broadcast from the eNB 200 by the SIB.

a) The UE 100 determines, as a received H-SFN, an H-SFN that satisfies "H-SFN mod m=0". The eNB 200 sets a value of "m" in the UE 100 by the calculation formula. The UE 100 performs the DRX operation in the conventional RRC connected mode within the determined reception H-SFN. Specifically, the UE 100 wakes up in the set DRX cycle and monitors PDCCH in the wake-up state. The UE 100 can maintain a sleep state (that is, a state in which the PDCCH is not monitored) in the H-SFN that does not satisfy "H-SFN mod m=0".

b) The UE 100 uses two consecutive hyperframes as one set, and can correspond to a DRX cycle having a length of 1024 radio frames or more. One hyperframe is composed of 1024 radio frames having radio frame numbers (SFN) from 0 to 1023. The UE 100 counts the SFN from 0 to 1023 in first hyperframes (for example, even-numbered hyperframes) that configure one set, and then counts a first radio frame in second hyperframes (for example, odd-numbered hyperframes) that configure the one set as SFN=1024 and counts a second radio frame of the second hyperframes as SFN=1025. In this way, the UE 100 continues to count by allowing the second hyperframes to take over the SFN count values in the first hyperframes. Thereby, the UE 100 can perform the DRX operation using the DRX cycle having the time longer than the time of 1024 radio frames (that is, 10.24 seconds).

Next, a case where the operation conforms to the DRX in the RRC idle mode will be described. To determine the DRX cycle in the conventional RRC idle mode, the DRX cycle and international mobile subscriber identity (IMSI) of the UE 100 are used. The IMSI is used to distribute paging occasions (that is, timing of PDCCH monitoring) among a plurality of Ues. However, during the random access procedure, it is assumed that the eNB 200 has not yet acquired the IMSI of the UE 100. On the other hand, since the Msg3 includes SAE temporary mobile subscriber identity (S-TMSI) or resume ID, the eNB 200 can acquire the S-TMSI or the resume ID of the UE 100 during the random access procedure. Therefore, the eNB 200 and the UE 100 determine the paging occasion using the S-TMSI or the resume ID instead of the IMSI.

In step S716, the server 50 transmits the response data (TCP ACK) to the eNB 200.

In step S717, the eNB 200 transmits, to the UE 100, the response data (TCP ACK) by the downlink early data transmission. The UE 100 receives the downlink data.

Note that when receiving the TCP NACK as the downlink data, the UE 100 may start the random access procedure and perform the uplink early data transmission.

In the operation of FIG. 19, from transmitting the Msg3 with data (step S711) to receiving the notice of the downlink data transmission (step S713), the UE 100 operates a "T300" timer that is managed in an RRC layer and/or a "contention resolution timer" that is managed in a MAC layer and continuously monitors the PDCCH. Then, the UE 100 activates a timer in response to the notice (step S713) of the downlink data reception (step S714), and performs the DRX operation while the timer is operating (step S715).

Even when the notice of the data transmission is not introduced, it is possible to switch the reception operation using the two-stage timer.

Such an operation includes steps of: executing the early data transmission in which the UE 100 transmits the RRC message (Msg3) to the eNB 200 and transmits user data during the random access procedure; activating, by the UE 100, the first timer in response to the execution of the early data transmission; executing a first reception operation in which the UE 100 continuously monitors a downlink control channel (PDCCH) while the first timer is operating; activating, by the UE 100, the second timer in response to the fact that the first timer expires; and executing, by the UE 100, a second reception operation different from the first reception operation while the second timer is operating. The second reception operation is a reception operation of less frequently monitoring the downlink control channel than the first reception operation. For example, the second reception operation is an intermittent reception (DRX) operation which intermittently monitors the downlink control channel (PDCCH).

Here, the first timer may be the "T300" timer managed in the RRC layer or the "contention resolution timer" managed in the MAC layer. Normally, when the "T300" timer or the "contention resolution timer" expires without receiving the response (for example, Msg4) from the eNB 200, the UE 100 determines that the random access procedure has failed (contention resolution failure and the like) to resume the random access procedure. However, when performing the early data transmission, the UE 100 continues the random access procedure without determining that the random access procedure has failed even if the first timer ("T300" timer or "contention resolution timer") expires.

Alternatively, the first timer may be a new timer different from the "T300" timer and the "contention resolution timer". When performing the early data transmission, the UE 100 activates such a new timer without activating the "T300" timer and the "contention resolution timer" (see modified example 14).

On the other hand, when the notice of the downlink data transmission is introduced, the eNB 200 receives the RRC message and the user data from the UE 100, and then transmits, to the UE 100, the notice (predetermined message) of the downlink data transmission (step S713). The UE 100 stops the first timer and stops the first reception operation, in response to receiving a predetermined message while the first timer is operating. The UE 100 activates the second timer in response to stopping the first timer (stopping the first reception operation).

Note that the contention resolution of the MAC layer in the Msg4 may be used as the predetermined message. A flag (1-bit identifier) indicating the notice of the data transmission may be added to the contention resolution. The eNB 200 transmits, to the UE 100, the RRC connection setup message of the RRC layer in Msg4 together with the downlink data at the time of transmitting the downlink data (step S717).

Modified Example 16

A modified example 16 is a modified example related to the modified example 14 and the modified example 15. Differences between the modified example 14 and the modified example 15 will be mainly described in the modified example 16.

In the modified example 16, a UE 100 performs uplink early data transmission using Msg3. The UE 100 activates a timer which determines a waiting time to wait for reception of a response transmitted from an eNB 200 in response to an execution of early data transmission. The "timer" may be the first timer or the second timer according to the modified example 14, or may be the timer according to the modified example 15. The "response transmitted from the eNB 200" may be Msg4 transmitted with data from the eNB 200 or the Msg4 transmitted without data from the eNB 200 (see the modified example 14), and may be data transmitted after the Msg4 (notice) transmission from the eNB 200 (see the modified example 15).

Then, the UE 100 removes monitoring of PDCCH until PDCCH monitoring timing determined based on termination timing of the waiting time corresponding to the timer. For example, the UE 100 monitors the PDCCH only in a subframe when the timer expires. Thereby, since a receiving device of UE 100 can be turned off while the timer is operating, the power consumption of the UE 100 can be reduced.

The UE 100 may monitor the PDCCH only in a subframe (that is, a subframe next to the subframe when the timer expires) immediately after the timer expires or a subframe after a specified time elapses since the timer has expired, instead of the subframe of the time when the timer expires. Alternatively, the UE 100 may monitor the PDCCH only in a subframe (that is, a subframe before one subframe at the time when the timer expires) immediately before the timer expires or a subframe before a specified time of a subframe in which the timer expires, instead of the subframe of the time when the timer expires.

Alternatively, the UE 100 may monitor the PDCCH only at a plurality of timings (a plurality of subframes) determined based on the time when the timer expires. For example, the UE 100 may monitor the PDCCH only in a subframe at the time when the timer expires and a subframe immediately after the timer expires or a subframe after a specified time elapses since the timer has expired. For example, the UE 100 may monitor the PDCCH only in a subframe at the time when the timer expires and a subframe immediately before the timer expires or a subframe before a specified time elapses since the timer has expired.

Note that the eNB 200 understands the timer value set in the UE 100 and can estimate the PDCCH monitoring timing in the UE 100. When the eNB 200 transmits a response (for example, Msg4 with data) to the UE 100 at the PDCCH monitoring timing, the UE 100 can receive the response at the PDCCH monitoring timing.

The UE 100 may execute the operation according to the modified example 16 only when at least one of the following conditions is satisfied. The conditions may be applied only when the conventional timer (T300, contention resolution timer) is used.

Condition 1: Notification of early data transmission indication (EDT Indication) in Msg1

Condition 2: Reception of uplink grant (size larger than general uplink grant) for early data transmission in Msg2

Condition 3: Implementation of early data transmission (data transmission) in Msg3

Modified Example 17

In the above-described first embodiment, an example has been described in which the eNB 200 sets, in the UE 100, the maximum value of the amount of data that can be transmitted by the UE 100 in the uplink early data transmission to the UE 100. As a result, the UE 100 determines whether all of its own uplink data can be transmitted by the uplink early data transmission, and if it is determined that all the uplink data can be transmitted, the UE 100 can start the early data transmission, and if it is determined that all the uplink data cannot be transmitted, the UE 100 cannot start the early data transmission.

As described above, when the downlink early data transmission using the Msg4 follows the uplink early data transmission using the Msg3, the early data transmission may be applied only when the data transmission/reception can be completed by only one set of the uplink (Msg3) and the downlink (Msg4). Therefore, the UE 100 may also determine whether all of its own downlink data can be received by the downlink early data transmission, and may start the early data transmission only when it is determined that all the downlink data can be received.

In the modified example 17, an example will be mainly described in which the eNB 200 sets, in the UE 100, the maximum value of the amount of data that can be received by the UE 100 in the downlink early data transmission. In addition, in the modified example 17, it is assumed that the uplink early data transmission is performed using the Msg3 and the downlink early data transmission is performed using the Msg4.

In a modified example 17, an eNB 200 transmits, to a UE 100, information regarding conditions on the amount of data in early data transmission by a broadcast message (SIB). For example, the eNB 200 transmits information indicating a maximum value (maximum transport block size) of the amount of downlink data that can be transmitted by the eNB 200 in the early data transmission as the information regarding the conditions on the amount of data. Note that the eNB 200 can receive the broadcast message by transmitting a broadcast message (SIB) including the information regarding the conditions on the amount of data even in the UE 100 in an RRC idle mode.

The UE 100 receives the information regarding the conditions on the amount of data from the eNB 200. In addition, the UE 100 estimates the amount of downlink user data to be received from eNB 200 in the early data transmission. For example, the UE 100 estimates the amount of downlink user data to be received from the eNB 200 based on a type of applications and the like that the UE 100 executes. Specifically, the UE 100 estimates the amount of downlink user data based on a protocol configuration of an application that can use the early data transmission. For example, in the case of an application using a TCP layer, the UE 100 estimates the amount of ACK data of the TCP as the amount of downlink user data. In addition, when there is a data reception completion response from a server in an application layer, the amount of response data is added to the amount of downlink user data. The estimation may be performed in the application layer, and the amount of downlink user data may be notified from the application layer to a NAS layer and/or an AS layer. Alternatively, when the estimation is performed in the NAS layer and/or AS layer, a history of past application layer behavior is held, so the amount of downlink user data can be estimated from the past behavior included in the history.

The UE 100 starts the early data transmission when the estimated amount of downlink user data satisfies the conditions on the amount of data. For example, the UE 100 starts the early data transmission when the estimated amount of downlink user data is equal to or less than the maximum amount of downlink data set from the eNB 200. On the other hand, when the estimated amount of downlink user data exceeds the maximum amount of downlink data transmitted and set from the eNB 200, the UE 100 starts a normal random access procedure without starting the early data transmission.

For example, the eNB 200 may transmit information indicating a minimum value (minimum transport block size) of the amount of downlink data that can be transmitted by the eNB 200 in the early data transmission as the information regarding the conditions on the amount of data. For example, the UE 100 starts the early data transmission when the estimated amount of downlink user data is equal to or greater than the minimum amount of downlink data set from the eNB 200. On the other hand, when the estimated amount of downlink user data exceeds the minimum amount of downlink data set from the eNB 200, the UE 100 starts a normal random access procedure without starting the early data transmission. Details will be described in the second embodiment, but if the amount of data is small, a padding bit increases and efficiency decreases, so the eNB 200 allocates the necessary minimum resources to the UE 100 after transitioning to the RRC connected mode, thereby suppressing the padding bit from increasing. In addition, if the transition to the RRC connected mode is made, for example, advanced processing such as multiplexing data of a plurality of Ues into one resource or a transport block, or processing of transmitting data together with other signaling in a single UE is also possible.

Alternatively, when the estimated amount of downlink user data is less than the minimum amount of downlink data set from the eNB 200, the UE 100 may maintain the RRC idle mode without starting the random access procedure.

Figure 20:
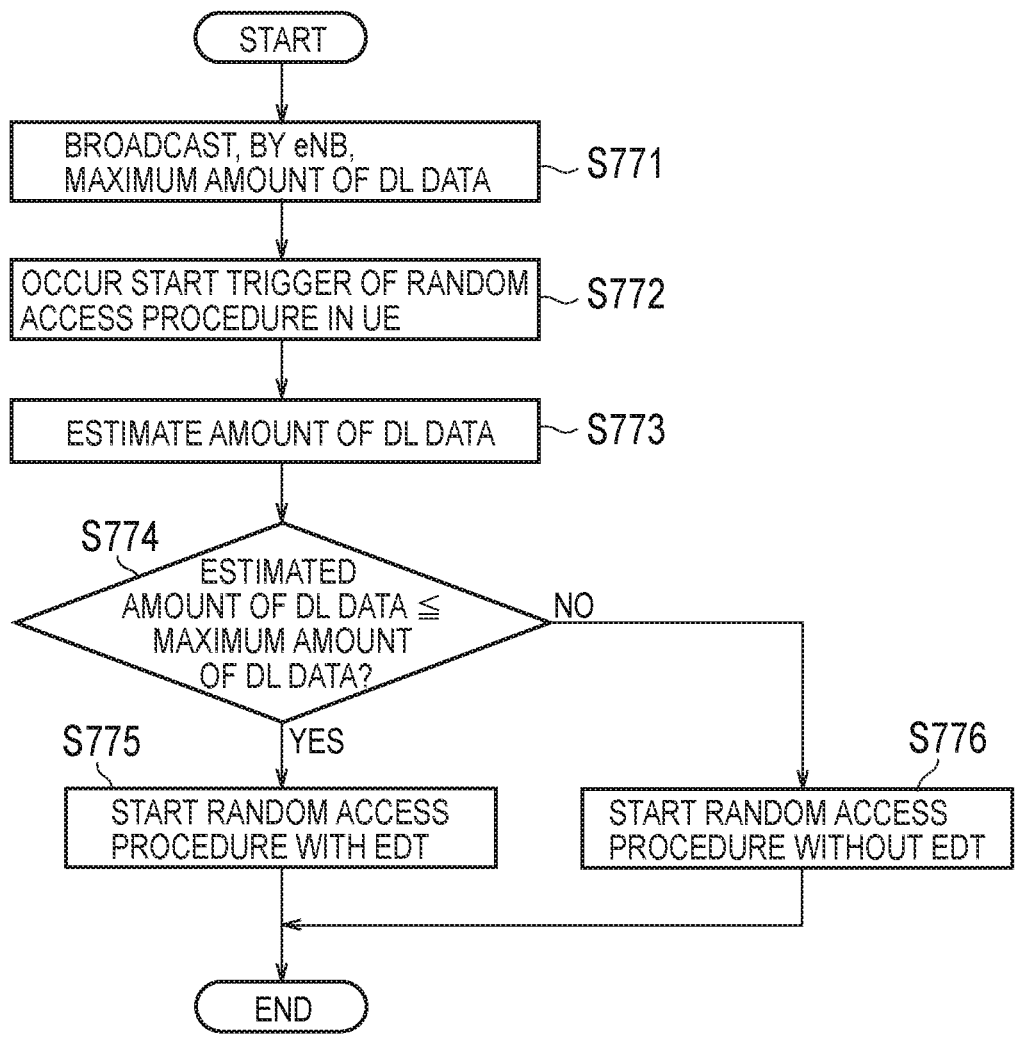
FIG. 20 is a diagram illustrating an example of an operation of modified example 17 of the first embodiment.

FIG. 20 is a diagram illustrating an example of an operation of the modified example 17.

As illustrated in FIG. 20, in step S771, the eNB 200 transmits, by broadcast, the information on the maximum amount of downlink data indicating the maximum amount of downlink data in the early data transmission. The UE 100 in the RRC idle mode receives the information on the maximum amount of downlink data from the eNB 200.

The eNB 200 may further transmit, by the broadcast, the information on the maximum amount of uplink data indicating the maximum amount of uplink data in the early data transmission. The UE 100 in the RRC idle mode receives the information on the maximum amount of uplink data from the eNB 200.

In step S772, the UE 100 detects a start trigger of the random access procedure. The start trigger is, for example, generating the uplink data to be transmitted in the UE 100, receiving a paging message by the UE 100, or the like.

In step S773, the UE 100 estimates the amount of downlink user data to be received from eNB 200 in the early data transmission. Specifically, the UE 100 estimates the amount of downlink user data transmitted to the UE 100 during the Msg4 transmission from the eNB 200.

In step S774, the UE 100 determines whether the estimated amount of downlink user data is equal to or less than the maximum amount of downlink data set from the eNB 200. When the estimated amount of downlink user data is equal to or less than the maximum amount of downlink data (step S774: YES), in step S775, the UE 100 starts the random access procedure with the early data transmission. On the other hand, when the estimated amount of downlink user data exceeds the maximum amount of downlink data (step S774: NO), in step S776, the UE 100 starts the random access procedure without the early data transmission.

Note that in step S774, the UE 100 may also determine whether the amount of uplink user data to be transmitted is equal to or less than the maximum amount of uplink data set from the eNB 200. The UE 100 starts the random access procedure with the early data transmission when the estimated amount of downlink user data is equal to or less than the maximum amount of downlink data and the estimated amount of uplink user data is equal to or less than the maximum amount of uplink data. Otherwise, the UE 100 starts a normal random access procedure without the early data transmission.

Note that when it is defined that the maximum amount of uplink data and the maximum amount of downlink data in the early data transmission are the same, the eNB 200 may not notify the UE 100 of the maximum amount of downlink data. In such a case, the UE 100 may determine that the early data transmission is possible when the estimated amount of downlink data is equal to or less than the maximum amount of uplink data set from the eNB 200.

In FIG. 20, an example has been described in which the eNB 200 transmits, by broadcast, the information on the maximum amount of downlink data indicating the maximum amount of downlink data in the early data transmission. However, the eNB 200 may transmit, by unicast, the information on the maximum amount of downlink data. When transmitting such a unicast message, the eNB 200 can set the conditions on the amount of data for each UE.

For example, the eNB 200 transmits, to the UE 100, an RRC connection release message including the information on the maximum amount of downlink data when the UE 100 is in the RRC connected mode. The UE 100 transitions to the RRC idle mode in response to the reception of the RRC connection release message, and stores the information on the maximum amount of downlink data. Here, the eNB 200 may cause the UE 100 to transition to a suspend state that is a sub state of the RRC idle mode. In the suspend state, the context information of the UE 100 is maintained in the eNB 200.

The UE 100 starts the random access procedure in the RRC idle mode. When the UE 100 is in the suspend state, the eNB 200 refers to the context information of the UE 100 during the random access procedure, and recognizes that the maximum amount of downlink data is set in the UE 100. On the other hand, when the UE 100 is not in the suspend state, since the eNB 200 does not have the context information of the UE 100, the maximum amount of downlink data is set and/or the set maximum amount of downlink data is notified from the UE 100 to the eNB 200 during the random access procedure (for example, when the Msg3 is transmitted).

Modified Example 18

As described above, when the eNB 200 sets, in the UE 100, the maximum data amount (maximum transport block size) in the early data transmission, it is difficult for the eNB 200 to determine the optimum maximum data amount. Specifically, the amount of data (transport block size) transmitted and received by the UE 100 by the early data transmission varies depending on the type or situation of applications executed by the UE 100. If the setting of the maximum data amount in the early data transmission is excessive, useless resources may be generated. On the other hand, if the setting of the maximum data amount in the early data transmission is too small, the UE 100 that intends to transmit and receive data exceeding the maximum transport block size cannot use the early data transmission, so the effect of reducing the power consumption and delay by the early data transmission is impaired.

In a modified example 18, a UE 100 determines the amount of user data to be transmitted and received in early data transmission. For example, the UE 100 determines the amount of uplink data that the UE 100 intends to transmit by uplink early data transmission. In addition to or instead of such determination, the UE 100 may determine the amount of downlink data that the UE 100 intends to receive by the downlink early data transmission. Then, when the UE 100 is in the RRC connected mode, the UE 100 transmits, to the eNB 200, the information indicating the maximum data amount (maximum transport block size) recommended by the UE 100 based on the determined amount of user data. The recommended maximum data amount may be the recommended maximum amount of uplink data or the recommended maximum amount of downlink data.

The notification of the maximum data amount may be performed only by the UE 100 having the capability to perform the early data transmission. In such a case, the eNB 200 may preserve, in UE context, the notification from the UE 100 as UE capability information.

The eNB 200 collects, from a large number of Ues 100, the information on the recommended maximum data amount for the early data transmission, and performs statistical processing on the collected information, thereby determining an optimum maximum data amount in the early data transmission. For example, the eNB 200 collects the information on the recommended maximum data amount for the uplink early data transmission, and determines the optimum maximum data amount for the uplink early data transmission based on the collected information. The eNB 200 may collect the information on the recommended maximum data amount for the downlink early data transmission, and determine the optimum maximum data amount for the downlink early data transmission based on the collected information. After determining the optimum maximum data amount, the eNB 200 sets the determined maximum data amount in the UE 100. For example, the eNB 200 sets the maximum data amount in the UE 100 in the cell of the eNB 200 by broadcasting information indicating the determined maximum data amount.

Figure 21:
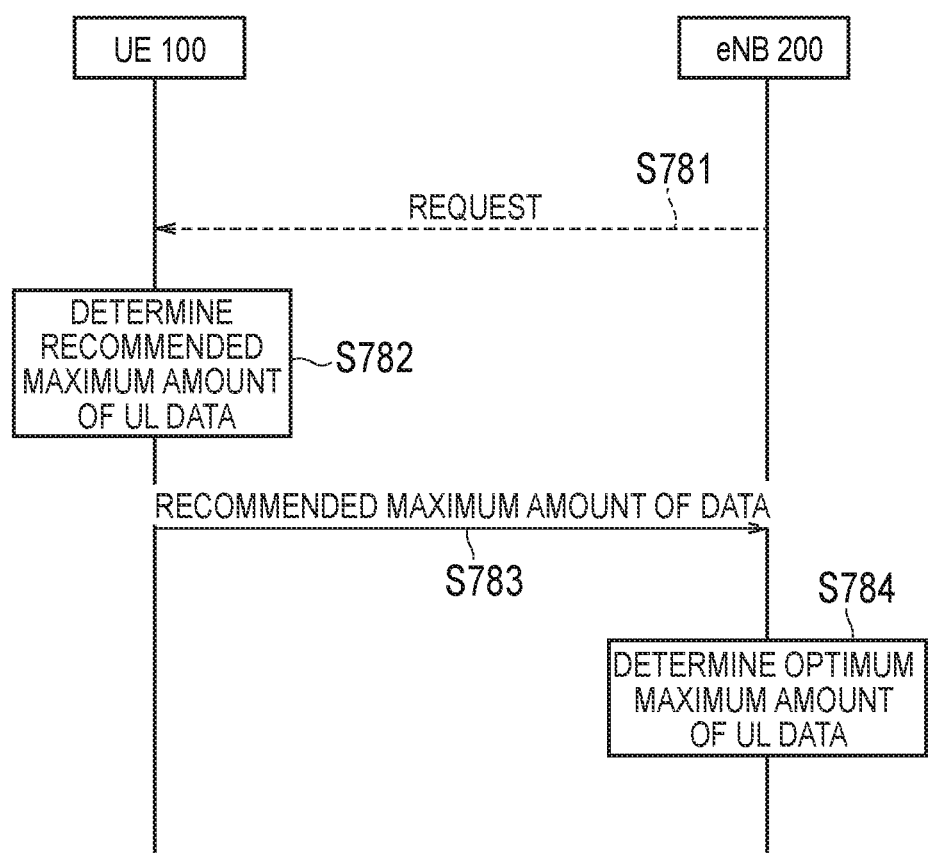
FIG. 21 is a diagram illustrating an example of an operation of modified example 18 of the first embodiment.

FIG. 21 is a diagram illustrating an example of an operation of the modified example 18. Here, an example will be described in which the recommended maximum amount of uplink data in the early data transmission using Msg3 is notified from the UE 100 to the eNB 200. Note that in the following example, the recommended maximum amount of uplink data has been described as an example, but the recommended maximum amount of downlink data can be applied instead.

As illustrated in FIG. 21, in step S781, the eNB 200 transmits, to the UE 100, information that requests or sets the transmission of the notification of the recommended maximum amount of uplink data in the early data transmission. The eNB 200 may include the information in Msg4 (RRC connection setup message), measurement configuration that is a unicast message, a UE information request message, and/or a minimization of drive test (MDT) setting message in the random access procedure. Alternatively, the eNB 200 may notify the UE 100 of the information that allows or requests the notification by a broadcast message. However, step S781 is not essential and can be omitted.

In step S782, the UE 100 determines the recommended maximum amount of uplink data in the early data transmission. For example, the UE 100 stores the amount of uplink data when performing the random access procedure according to the generation of the uplink data, and determines the stored amount of uplink data as the recommended maximum amount of uplink data.

In step S783, the UE 100 transmits, to the eNB 200, the information indicating the determined recommended maximum amount of uplink data. The UE 100 may include such information in the measurement report, or may include the information in Msg5 (RRC connection setup complete or RRC connection resume complete) or a UE information response message of the random access procedure. Note that the RRC connection setup complete and the RRC connection resume complete may be positioned with messages transmitted from the UE 100 to the eNB 200 immediately after the random access procedure.

In addition, when the amount of uplink data generated in the UE 100 in the RRC idle mode exceeds the maximum amount of uplink data set by the eNB 200, the UE 100 may start a normal random access procedure without the early data transmission and store the amount of uplink data. The UE 100 may notify the eNB 200 of the stored amount of uplink data as the recommended maximum amount of uplink data after transitioning to the RRC connected mode by the normal random access procedure.

In step S784, the eNB 200 determines the optimum maximum amount of uplink data based on the recommended maximum amount of uplink data notified from the UE 100. After determining the optimum maximum amount of uplink data, the eNB 200 sets the maximum amount of uplink data in the UE 100 in the cell of the eNB 200 by broadcasting the determined maximum amount of uplink data.

Alternatively, the eNB 200 is not limited to the case where the maximum data amount (maximum amount of uplink data) is set in the UE 100 by the broadcast, but may set the maximum data amount in the UE 100 by the unicast (for example, RRC connection release). In such a case, the eNB 200 determines the optimum maximum data amount for the UE 100 based on the recommended maximum data amount notified from the UE 100, and sets the determined maximum data amount in the UE 100 by the unicast.

Note that in this modified example, the eNB 200 describes the example which determines the maximum amount of uplink data set in the UE 100 based on the recommended maximum amount of uplink data notified from the UE 100. However, although details will be described in the second embodiment, a plurality of blind decoding thresholds may be set in the UE 100 within the range of the maximum amount of uplink data. Specifically, the UE 100 specifies a minimum blind decoding threshold that is greater than the amount of user data transmitted by the UE 100, and fills a shortage with respect to the specified blind decoding threshold with padding data. Therefore, in order to reduce the padding data, the eNB 200 may determine the blind decoding threshold to be set in the UE 100 based on the recommended maximum amount of uplink data notified from the UE 100.

Second Embodiment

Differences between a second embodiment and a first embodiment will be mainly described. In the second embodiment, it is assumed that uplink early data transmission is performed using Msg3 during a random access procedure. A UE 100 performs user data transmission in addition to transmitting an RRC message (RRC connection request message or RRC connection resume request message) to an eNB 200 during a random access procedure.

The eNB 200 transmits, to the UE 100, Msg2 (random access response) including an uplink grant to allocate an uplink radio resource to the UE 100 during the random access procedure. When the UE 100 transmits, to the eNB 200, user data associated with an RRC message (Msg3), an allocated data size (that is, transport block size) corresponding to the uplink radio resource allocated to the UE 100 preferably matches a total size of an RRC message and the user data. Note that the transport block size is determined by the amount of uplink radio resources (for example, the number of resource blocks) allocated by the uplink grant and MCS. The eNB 200 performs decoding processing on the assumption of the transport block size allocated to the UE 100.

However, the transport block size allocated to the UE 100 does not necessarily match the total size of the RRC message and the user data. When the transport block size allocated to the UE 100 is larger than the total size of the RRC message and the user data, the UE 100 needs to transmit padding data within extra allocated uplink radio resources so that the eNB 200 can appropriately perform the decoding processing. Here, when there are a lot of extra allocated uplink radio resources, there is a problem in that the UE 100 needs to transmit a lot of padding data and power consumption of UE 100 increases in order to transmit the padding data. The second embodiment is an embodiment for solving such a problem.

(1) Operation Pattern 1

In operation pattern 1 of the second embodiment, the eNB 200 transmits, to the UE 100, an uplink grant that allocates a periodic uplink radio resource during the random access procedure. Such resource allocation may be referred to as semi-persistent scheduling (SPS). However, the conventional SPS is not applied during the random access procedure.

In the SPS according to the operation pattern 1 of the second embodiment, configuration information (for example, uplink transmission cycle) of the SPS is included in the SIB transmitted to the UE 100 by the eNB 200. Further, in the operation pattern 1, the uplink grant transmitted to the UE 100 by the Msg2 includes information on uplink radio resources (resource blocks) allocated to the UE 100, and activates the SPS. That is, the uplink grant allocates the periodic uplink radio resource to the UE 100.

In response to reception of the uplink grant, the UE 100 performs uplink transmission plural times using the periodic uplink radio resource during the random access procedure. Specifically, the UE 100 performs the uplink transmission using the uplink radio resource allocated by the uplink grant in the uplink transmission cycle according to the configuration information of the SPS.

In this way, the UE 100 can perform the uplink transmission plural times, thereby making the amount of uplink radio resources used for one-time uplink transmission small. In addition, the UE 100 can transmit the RRC message and the user data at different timings (different subframes). For example, in performing the uplink transmissions plural times, the UE 100 transmits at least the RRC message in a first uplink transmission and transmits at least a part of the user data in a second uplink transmission. Therefore, the UE 100 does not need to transmit a lot of padding data.

In addition, in the operation pattern 1 of the second embodiment, the eNB 200 transmits, to the UE 100, information for setting the maximum number of times of uplink transmissions using the periodic uplink radio resource. As a result, the eNB 200 can properly understand the number of times to perform the decoding processing on the uplink data. The eNB 200 may transmit information for setting the maximum number of times of transmissions by SIB or may transmit the information by the uplink grant (Msg2). The UE 100 performs the uplink transmission plural times within a range that does not exceed the set maximum number of times of transmissions.

Figure 22:
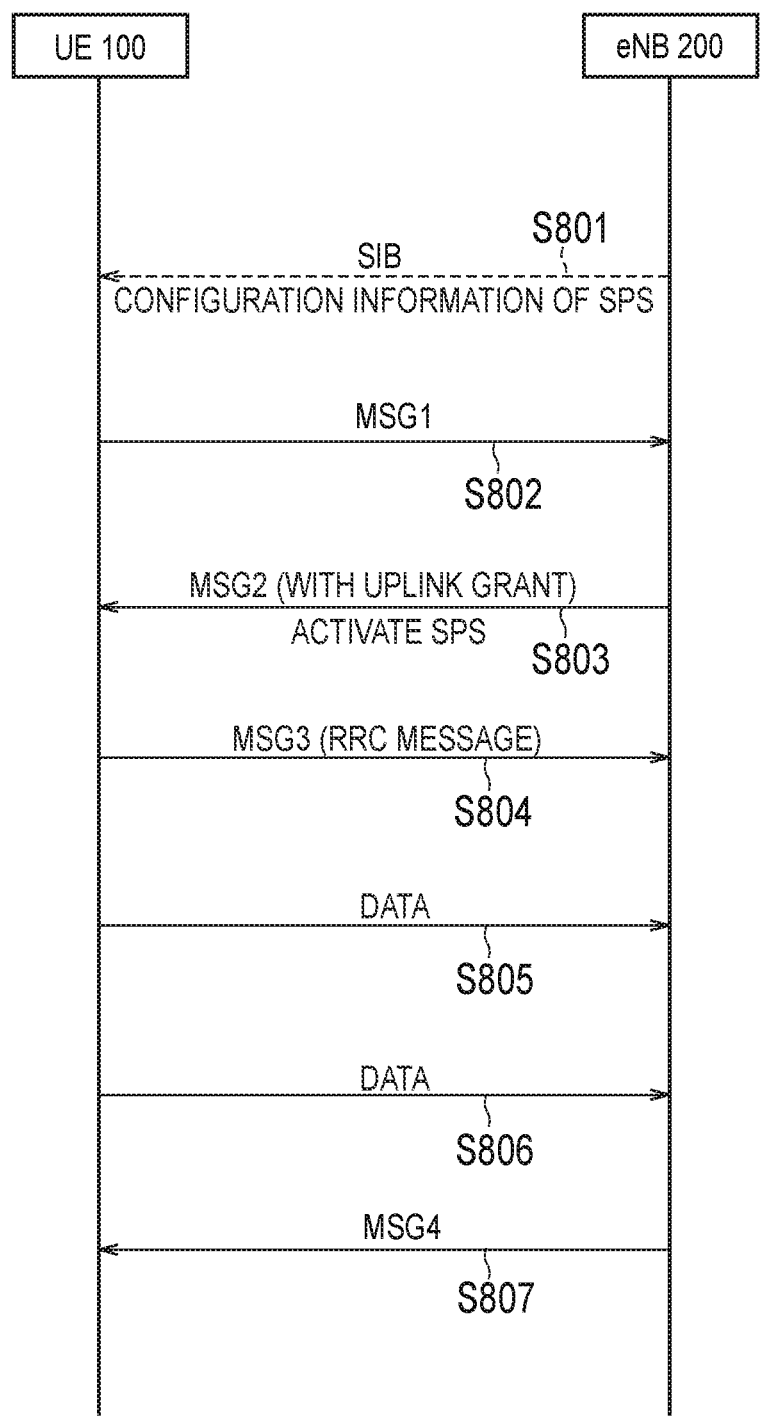
FIG. 22 is a diagram illustrating an example of operation pattern 1 of the second embodiment.

FIG. 22 is a diagram illustrating an example of the operation pattern 1 of the second embodiment. In an initial state, the UE 100 is in an RRC idle mode.

As illustrated in FIG. 22, in step S801, the eNB 200 transmits the configuration information of the SPS by the SIB. The UE 100 receives and stores the configuration information of the SPS. The eNB 200 may transmit the information for setting the maximum number of times of transmissions by the SIB. Here, the description will be made assuming that the maximum number of times of transmissions is three times.

In step S802, the UE 100 transmits a random access preamble (Msg1) to the eNB 200.

In step S803, the eNB 200 transmits, to the UE 100, a random access response (Msg2) including the uplink grant that activates the SPS. The uplink grant includes information on the uplink radio resource (resource block) to be used for one-time uplink transmission. Here, the one-time resource allocation size (transport block size) may match the size of the RRC message. The eNB 200 may transmit the information for setting the maximum number of times (three times) of transmissions by the Msg2.

In step S804 (first uplink transmission), the UE 100 transmits an RRC message (Msg3) to the eNB 200 using the allocated uplink radio resource (resource block) in response to the reception of the uplink grant.

In step S805 (second uplink transmission), the UE 100 transmits a part of the user data to the eNB 200 using the allocated uplink radio resource (resource block) in subframes according to the SPS transmission cycle.

In step S806 (third uplink transmission), the UE 100 transmits the remaining user data to the eNB 200 using the allocated uplink radio resource (resource block) in subframes according to the SPS transmission cycle. Here, since the number of times of uplink transmissions reaches the maximum number of times of transmissions, the UE 100 deactivates the SPS. Further, the UE 100 may discard the configuration information of the SPS.

In addition, when the user data transmission is completed before reaching the maximum number of times of transmissions (for example, when all user data is transmitted in step S805), the UE 100 may not perform the uplink transmission in subframes (timing in step S806) according to the SPS transmission cycle. Alternatively, the UE 100 may transmit, to the eNB 200, information indicating the termination of the data transmission at the time of the last uplink transmission (timing in step S806). Such information (end marker) may also be transmitted by the MAC CE.

In step S807, the eNB 200 transmits the Msg4 to the UE 100. The eNB 200 may notify, by the Msg4, the UE 100 which uplink transmission is successfully received and/or which uplink transmission fails to receive among the plurality number of times of uplink transmissions. For example, the eNB 200 notifies that the reception is OK only on the first time, or notifies that the reception is OK after the second time.

Note that in this operation pattern, an example has been described in which the UE 100 transmits the user data after transmitting the RRC message (MAC PDU including an RRC connection request), but the UE 100 may first transmit the user data and transmit the RRC message after the data transmission is terminated. In such a case, the eNB 200 can recognize that the user data transmission has been terminated by receiving this RRC message.

(2) Operation Pattern 2

In operation pattern 2 of the second embodiment, the eNB 200 transmits, by the Msg2, to the UE 100, the uplink grant that allocates the uplink radio resource during the random access procedure.

In response to the reception of the uplink grant, the UE 100 performs repetition of the RRC message (Msg3) using the uplink radio resource during the random access procedure. Thereby, it is possible to increase the probability that the eNB 200 succeeds in the receiving processing (decoding processing) of the RRC message by providing redundancy to the RRC message. The UE 100 may perform the repetition of the user data in addition to the repetition of the RRC message using the uplink radio resource allocated by the uplink grant. Thereby, the redundancy can be provided to the user data.

In the decoding processing, the eNB 200 performs software composition of the repeated RRC message and software composition of the repeated user data. As described above, in the operation pattern 2 of the second embodiment, the uplink radio resource allocated by the uplink grant can be effectively used by performing redundant transmission instead of the transmission of the padding data.

HARQ Redundancy Version

The UE 100 may transmit the RRC message having different HARQ redundancy versions (that is, redundant configurations) in the repetition of the RRC message. In addition, the UE 100 may transmit the user data having a different HARQ redundancy version in the repetition of the user data. Thereby, the decoding success rate in eNB 200 can further be increased.

For example, the UE 100 stores a plurality of RRC messages (or a plurality of user data) in different MAC PDUs, and transmits a set of a plurality of MAC PDUs having different HARQ redundancy versions. The MAC PDU includes a MAC header, a MAC CE, and a MAC SDU (see FIG. 16). The RRC message (or user data) corresponds to the MAC SDU.

Note that as a first example of the redundant transmission, only the MAC SDU may be made redundant, and a plurality of MAC SDUs may be stored in one MAC PDU and transmitted. In such a case, a gain by the redundancy can be obtained by the following method while only one redundancy version is provided. Specifically, the UE 100 generates a bit string from a bit length (TBS size 1) corresponding to the size of the RRC message and the user data when generating the bit string before the rate matching. In the rate matching processing, the UE 100 extracts the bit length corresponding to the resource/MCS allocated by the eNB 200 when extracting the bit string to be transmitted from a circular buffer. As a result, although there is only one redundancy version, the gain by the redundancy can be obtained as compared with the case where the same part of the circular buffer is repeated. When the eNB 200 defines round robin decoding (blind decoding), the TBS size 1 (eNB 200) determines TBS size 1 (unknown by the eNB 200) at predetermined ratios such as ¾ of TBS size 2, ½ of TBS size 2, and ¼ of TBS size 2 according to the bit length (TBS size 2, known by the eNB 200) corresponding to the resource and MCS allocated by the eNB 200, thereby implementing the blind decoding.

As a second example of the redundant transmission, the MAC header may also be redundant and a plurality of MAC PDUs having different HARQ redundancy versions may be transmitted.

Transmission Power

When the repetition (redundant transmission) is performed, the UE 100 may reduce the transmission power as compared with the case where the repetition is not performed. Thereby, the power consumption of the UE 100 can be reduced.

The UE 100 adjusts the transmission power according to the number of times of repetitions. The UE 100 may decrease the transmission power as the number of times of repetitions increases. For example, when transmitting three MAC PDUs redundantly, the UE 100 may set the transmission power to be one-third as compared to transmitting one MAC PDU. Note that even if the transmission power is reduced, the transmission power can be compensated by the software composition gain in the eNB 200.

Specific Example 1 of Software Composition

When the UE 100 performs the repetition, the UE 100 may notify the eNB 200 that the repetition is performed (and/or the number of times of repetitions). Thereby, the eNB 200 can perform appropriate software composition.

As a specific example of such notification, the UE 100 may perform notification using a pattern of an uplink demodulation reference signal (DMRS) in the Msg3. The pattern of the DMRS may be a DMRS signal sequence or a resource arrangement pattern (for example, an arrangement pattern of resource elements) of the DMRS.

The UE 100 changes the pattern of the DMRS depending on whether the repetition is not performed. The UE 100 may change the pattern of the DMRS according to the number of times of repetitions.

Specific Example 2 of Software Composition

Instead of transmitting the notification of the repetition, the eNB 200 may attempt the reception processing (decoding processing) as many as the number of candidates of the number of times of repetitions. Here, candidates for the number of times of repetitions include zero (that is, no repetition is performed).

In this way, the eNB 200 decodes the repeated RRC message (and repeated user data) using the round robin decoding by the blind decoding. Thereby, even if there is no notification of repetition, the eNB 200 can perform appropriate software composition.

Figure 23A:
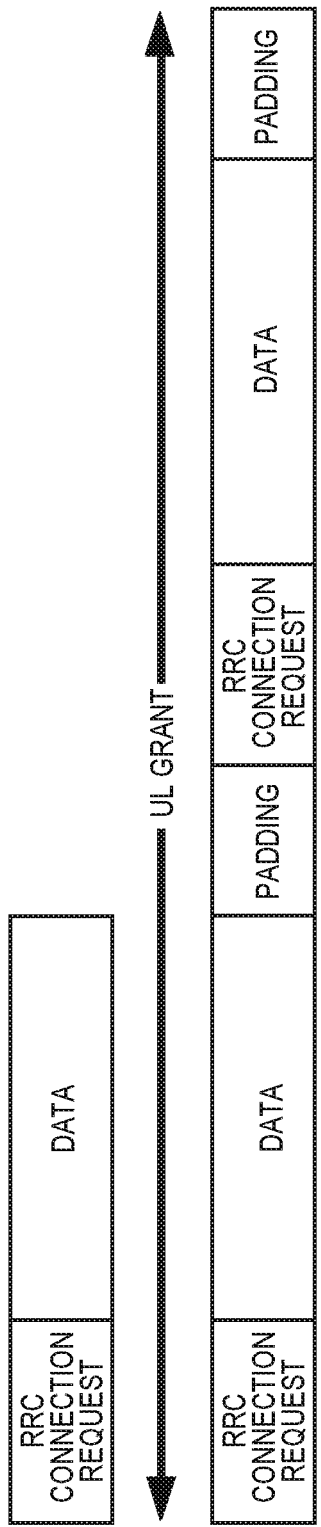
FIGS. 23A and 23B are diagrams illustrating an example of operation pattern 2 of the second embodiment.
Figure 23B:
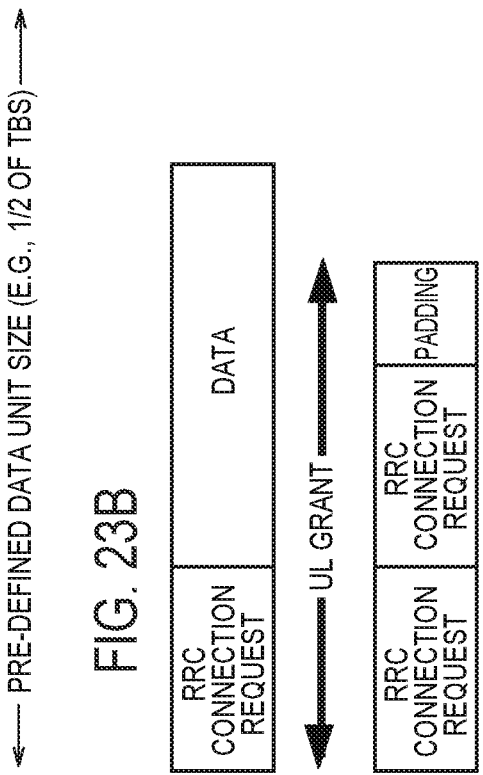

In order for the eNB 200 to decode the repeated RRC message (and repeated user data) by the blind decoding, the following method is applied. FIG. 23A and FIG. 23B are diagrams illustrating an example of a repetition method according to operation pattern 2 of the second embodiment.

When the total size of the RRC message (RRC connection request) and the user data (Data) is larger than the allocated data size, the UE 100 performs the repetition according to a predetermined repetition pattern as illustrated in FIG. 23A. The eNB 200 performs the blind decoding according to the predetermined repetition pattern.

In the example of FIG. 23A, the data size allocated by the uplink grant (UL grant) is larger than twice the total size of the RRC message (RRC connection request) and the user data (Data). In such a case, a size of half of the allocated data size is set as one unit, and the repetition is performed for each unit. In addition, the padding data is arranged for a part that does not satisfy the size of half of the allocated data size. The eNB 200 sets a size of half of the allocated data size as one unit, and performs the repetition for each unit.

Alternatively, when the total size of the RRC message (RRC connection request) and the user data (Data) is larger than the allocated data size, the UE 100 may repeat only the RRC message. Since the data size of the RRC message is already known, the eNB 200 performs the blind decoding on the assumption that only the RRC message is repeated.

On the other hand, when the total size of the RRC message (RRC connection request) and the user data (Data) is smaller than the allocated data size, the UE 100 performs the repetition according to a predetermined repetition pattern as illustrated in FIG. 23B. For example, when the allocated data size is twice or more the data size of the RRC message, the UE 100 performs the repetition of the RRC message. The UE 100 arranges the padding data for the remaining part. The eNB 200 performs the blind decoding on the assumption that only the RRC message is repeated.

When the total size of the RRC message (RRC connection request) and the user data (Data) is smaller than the allocated data size, the eNB 200 may attempt to perform decoding on three patterns of a case where only the RRC message is repeated, a case where only the RRC message is transmitted, and a case where the user data is transmitted together with the RRC message.

Note that the UE 100 may notify the eNB 200 of information indicating what repetition pattern is applied using a MAC header, a MAC CE, or the like accompanying the RRC message.

(3) Operation Pattern 3

In operation pattern 3 of the second embodiment, the eNB 200 broadcasts, for example, by the SIB, information indicating a plurality of resource pools that can be used for the user data transmission in the early data transmission. The plurality of resource pools are different from each other in the amount of available radio resources (that is, available transport block size).

When the UE 100 performs the early data transmission in response to the reception of the uplink grant from the eNB 200, the UE 100 transmits the user data using a resource pool selected from the plurality of resource pools. Therefore, since it becomes possible to select a resource pool corresponding to the amount (size) of user data that the UE 100 intends to transmit, the padding data to be transmitted can be removed or reduced. Note that the eNB 200 attempts to receive (decode) the user data in each resource pool, and receives (decodes) the user data in any resource pool.

The UE 100 may collectively transmit the user data and the RRC message using the selected resource pool. Alternatively, the UE 100 may transmit the RRC message using the uplink radio resource allocated by the uplink grant, and then may also transmit the user data using the selected resource pool.

The UE 100 may select a resource pool used for the user data transmission from the plurality of resource pools based on the amount of user data. For example, the UE 100 compares the amount (data size) of user data to be transmitted to the eNB 200 with the transport block size corresponding to each resource pool, and selects the optimum resource pool.

The UE 100 may select a resource pool in consideration of the priority of the user data. For example, when it is possible to select the uplink radio resource (resource block) used for transmission within the selected resource pool, the larger the resource pool, the lower the possibility of interference due to the collision of resources between the Ues 100. Therefore, the UE 100 may select a larger resource pool in the case of a high priority. Alternatively, the eNB 200 may notify of available priority information for each resource pool. Note that in the UE 100, the priority may be specified in a higher layer (for example, an application layer) and notified from the higher layer to an AS (for example, an RRC layer or a MAC layer). The priority may be set in advance in the UE 100 by the application server, or may be set in the UE 100 after authentication by the MME or the like. Further, the resource pool may be provided for each CE level.

Figure 24:
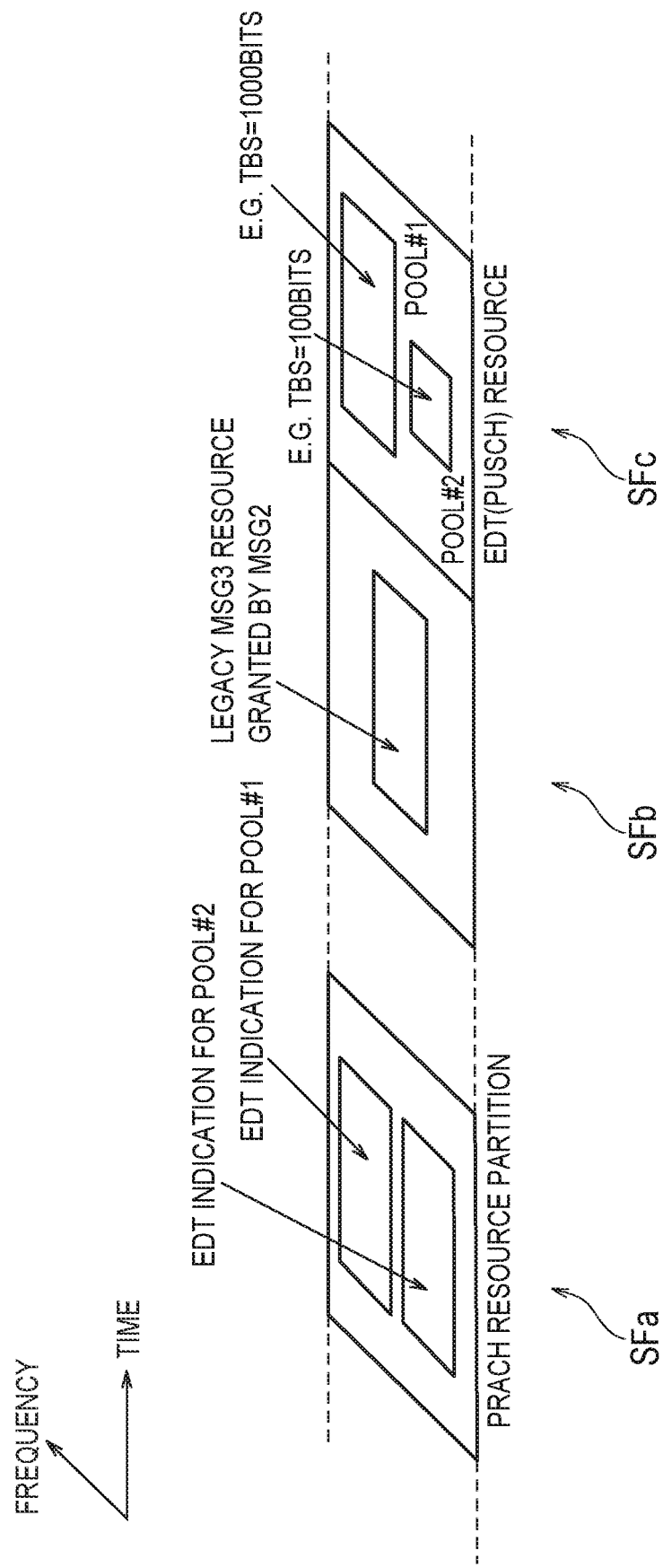
FIG. 24 is a diagram illustrating an example of operation pattern 3 of the second embodiment.

FIG. 24 is a diagram illustrating an example of the operation pattern 3 of the second embodiment. In FIG. 24, one partition in the time direction corresponds to one subframe, and the time direction corresponds to an uplink frequency band.

First, the UE 100 understands a resource pool for the user data and a resource pool for the random access preamble (Msg1) by receiving the SIB. Then, as illustrated in FIG. 24, the UE 100 selects one resource pool from a plurality of resource pools for a random access preamble in subframe Sfa, and transmits the random access preamble using the selected resource pool. In the example of FIG. 24, resource pool #1 for the random access preamble is associated with resource pool #1 for the user data (for example, a size of 1000 bits), and resource pool #2 for the random access preamble is associated with resource pool #2 (for example, a size of 100 bits) for the user data. However, there is only one resource pool for the random access preamble, and the resource pool for the random access preamble and the resource pool for the user data may not be associated with each other.

Next, the eNB 200 receives the random access preamble in any resource pool, and transmits the random access response (Msg2) to the UE 100 when allowing the use of the resource pool. The Msg2 includes a temporary identifier (temporary C-RNTI) that the eNB 200 allocates to the UE 100. If the UE 100 receives the Msg2, it assumes that the early data transmission is allowed. Then, the UE 100 transmits the RRC message (Msg3) to the eNB 200 using the uplink radio resource allocated by the uplink grant in the random access response in subframe SFb. The UE 100 transmits the temporary identifier (temporary C-RNTI) included in the RRC message.

Next, the UE 100 transmits the user data to the eNB 200 using the selected resource pool in subframe SFc. The UE 100 transmits the temporary identifier (temporary C-RNTI) included in the user data.

(4) Operation Pattern 4

In operation pattern 4 of the second embodiment, the eNB 200 transmits, to the UE 100, the uplink grant that allocates the uplink radio resource during the random access procedure. When the allocated data size corresponding to the uplink grant is larger than the total size of the RRC message and the user data, the UE 100 determines whether to transmit the early data transmission using the uplink radio resource or only the RRC message using the uplink radio resource. The UE 100 makes such a determination based on the amount of padding data necessary for performing the early data transmission. The eNB 200 attempts the receiving processing (decoding processing) on both the case where the UE 100 transmits only the RRC message and the case where the UE 100 performs the early data transmission.

When transmitting only the RRC message, since the eNB 200 can understand the data size of the RRC message, it is not necessary to transmit the padding data by the UE 100. On the other hand, when performing the early data transmission, that is, when transmitting the user data together with the RRC message, the eNB 200 does not understand the amount of user data. For this reason, the transmission of the padding data by the UE 100 may be required in order to perform the transmission with the allocated data size.

For example, the UE 100 determines the amount of padding data necessary for performing the early data transmission based on the allocated data size. When the determined amount of padding data is greater than the threshold, the UE 100 considers that the power consumption due to the transmission of the padding data is large, and transmits only the RRC message without performing the early data transmission. Thereby, the increase in the power consumption of UE 100 resulting from transmission of the padding data can be avoided.

OTHER EMBODIMENTS

Combinations of the second embodiment with the first embodiment and its modified examples may be implemented, or combinations of two or more modified examples may be implemented in the modified examples 1 to 15 of the first embodiment. In addition, in the modified examples 1 to 15 of the first embodiment, the operations according to the modified examples may be performed alone without assuming the operation according to the first embodiment.

In the above-described embodiment and its modified example, a control plane (CP) solution and a user plane (UP) solution were not particularly distinguished, but the operations according to the embodiment and its modified examples may be applied to both the CP solution and the UP solution. In the CP solution, in the early data transmission, data is included in the RRC message. In the UP solution, in the early data transmission, data is not included in the RRC message, and data (DTCH) and an RRC message (CCCH) in the MAC layer are multiplied and transmitted.

In the UP solution, the RRC message corresponding to the Msg3 is an RRC connection resume request message, and the RRC message corresponding to the Msg4 is the RRC connection resume message. Normally, when receiving the RRC connection resume, the UE 100 establishes (re-establishes) the PDCP entity. However, when performing the early data transmission, it is considered that the UE 100 has already established (re-established) the PDCP entity in order to perform the data transmission before receiving the RRC connection resume. Therefore, after establishing (re-establishing) the PDCP entity for performing the early data transmission, the UE 100 can receive, from the eNB 200, an instruction to transition from the idle mode to the connected mode (RRC connection resume). In this case, the UE 100 may skip the establishment (re-establishment) of the PDCP entity and maintain the established PDCP entity.

In the above-described embodiment, an example using the radio terminal (eMTC UE and NB-IoT UE) targeting the MTC or the IoT has been described. However, the present disclosure is not limited to the eMTC UE and the NB-IoT UE. The operation according to the embodiments described above may be applied to the general UE.

In the embodiment, the RRC idle mode, the suspend mode, and the connected mode are mainly described as examples, but the present embodiment is not limited thereto. The present embodiment may be applied to RRC light connection or INACTIVE state. The RRC light connection is one state of the RRC connected mode, and is a special state to which a part of the procedure of the RRC idle mode is applied. The INACTIVE is assumed to be introduced in the fifth generation mobile communication system, and is the RRC state different from the RRC connected mode and the RRC idle mode. The "RRC idle mode" in the above-described embodiment may be read as "INACTIVE mode".

In the embodiment, the UE in the enhanced coverage has been described as an example, but the present embodiment is not limited thereto. The operation according to the embodiments described above may be applied to the UE in the normal coverage. Specifically, it is not necessary to perform the CE level determination based on the RSRP measurement in the RACH procedure.

In the above-described embodiment, the LTE system is exemplified as the mobile communication system. However, the present disclosure is not limited to the LTE system. The operation according to the above-described embodiment may be applied to the mobile communication systems (for example, $5^{th}$ generation mobile communication system) other than the LTE system.

A program for causing a computer to execute each processing performed by the UE 100 and the eNB 200 may be provided. In addition, the program may be recorded on a computer-readable medium. If a computer-readable medium is used, a program can be installed in the computer. Here, the computer-readable medium on which the program is recorded may be a non-transitory recording medium. The non-transitory recording medium is not particularly limited, but may be a recording medium such as a CD-ROM or a DVD-ROM. A chip set including a memory that stores a program for executing each processing performed by the UE 100 and the eNB 200 and a processor that executes the program stored in the memory may be provided.

APPENDIX 1

(1. Introduction)

The new work item on Even further enhanced MTC for LTE (eFeMTC) was approved in RAN #75 and the WID identifies the several objectives that RAN2 should consider as the leading WG. The objective is to specify the following improvements for machine-type communications for BL/CE UEs. [ . . . ]

Improved latency:

[ . . . ]

Support early data transmission [RAN2 lead, RAN1, RAN3]

Evaluate power consumption/latency gain and specify necessary support for DL/UL data transmission on a dedicated resource during the Random Access procedure (after PRACH transmission and before the RRC connection setup is completed) at least in the RRC Suspend/Resume case.

In this appendix, the considerations for these improvements are discussed.

(2. Discussion)

(2.1 Improved Latency—Early Data Transmission)

Although the WID clearly states: "Evaluate power consumption/latency gain and specify necessary support for DL/UL data transmission on a dedicated resource during the Random Access procedure (after PRACH transmission and before the RRC connection setup is completed) at least in the RRC Suspend/Resume case.", the enhanced latency performance with early data transmission may lead to additional power consumption considering the various MTC device implementations. In case additional power consumption becomes necessary in some MTC implementations, the UE should be allowed to choose the legacy RACH procedure, i.e., non-early data transmission mode, to avoid the burden for legacy use cases.

Proposal 1: The solutions for early data transmission should minimize the additional power consumption; e.g., the UE should be allowed to choose the legacy RACH procedure, i.e., "non-early data transmission mode".

The WID also mentions the early data transmission should be performed after Msg1 and before Msg5, i.e., the candidates for the enhancements are Msg2, Msg3 and Msg4. On the other hand, it could be expected that the some control signaling may be allowed to be sent even before Msg2 and after Msg4.

Proposal 2: It should not be required for the control signaling associated with the early data transmission to be sent over Msg 2, Msg 3 or Msg 4.

It's not identified in the WID whether the data for early transmission is assumed as a small packet, a large size data and/or both. If only the small data is assumed, for example, it may be better for the UE to transition to RRC IDLE as soon as the data transmission is completed, e.g., even within the RACH procedure. Anyhow, it could be considered that the solution will be different depending on the data size for early transmission. So, RAN2 should first discuss and determine the assumption for data size.

Proposal 3: RAN2 should discuss the data size assumed for early transmission, i.e., a small packet, a large packet or both.

The WID does not clearly mentioned whether the early data transmission can be initiated only in the contention-based RACH procedure, the contention-free RACH procedure or both. The assumptions for the solution are different between the two procedures, e.g., if the PDCCH order can be assumed or not. So, RAN2 should clarify which RACH procedure is the assumption for early data transmission.

Proposal 4: RAN2 should discuss whether the early data transmission is applicable to the contention-based RACH procedure, the contention-free RACH procedure or both.

Figure 25:
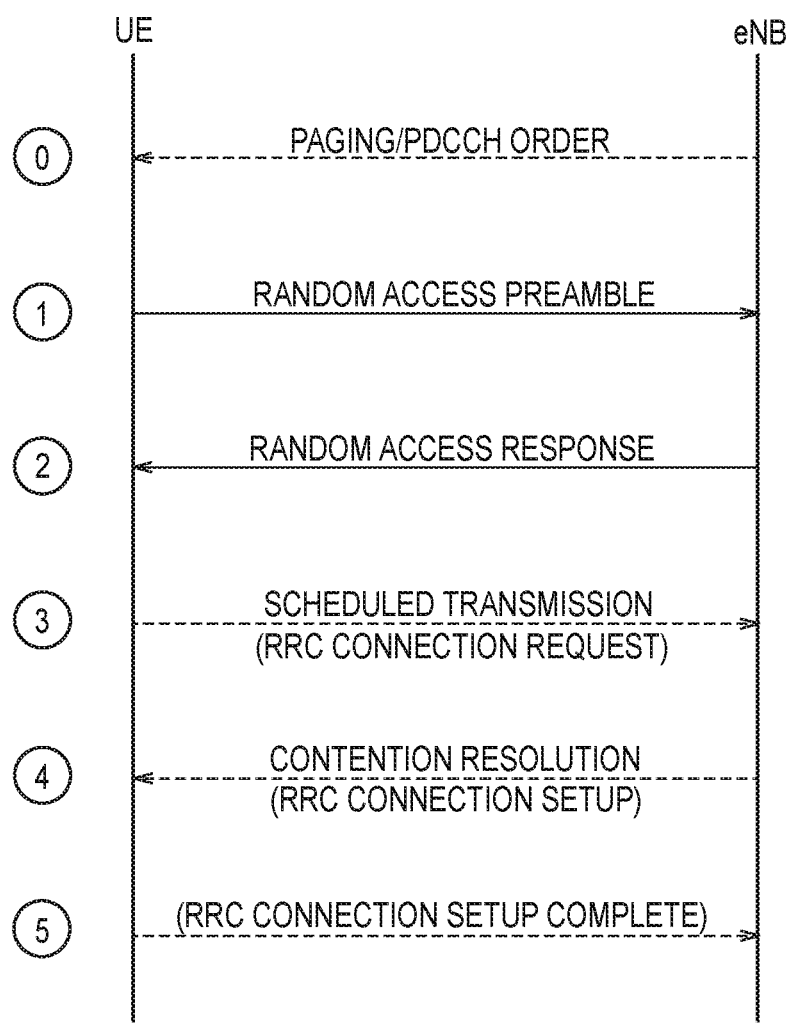
FIG. 25 is a diagram related to a supplementary note.

FIG. 25 shows a general RACH procedure (Contention-based/-free).

(2.2. Improved Power Consumption—Relaxed Monitoring for Cell Reselection)

The WID explains the mechanism to "Enable relaxed UE monitoring for cell (re)selection e.g. by (re)configuration". Regardless of necessity of (re)configuration, stationary UEs should be allowed to perform relaxed monitoring since cell reselections are rare occurrences. When the (re) configuration is necessary as intended in the WID, some UE assistance information may be necessary, e.g., a number of cell reselections reporting, a stationary UE indication etc., since the network may not know whether the IDLE mode UE performs cell reselection or not.

Proposal 5: It should be configurable whether stationary UEs are allowed to operate under relaxed monitoring for cell reselection.

APPENDIX 2

(1. Introduction)

RAN2#99 started the discussion on Even further enhanced MTC for LTE (eFeMTC) and the agreements on the functionality of early data transmission was achieved as follows.

Agreements

We intend to support early UL data transmission in Msg3 for control plane and user plane CIoT EPS optimization.

We intend to support early DL data transmission in Msg4 for control plane and user plane CIoT EPS optimization.

Agreements

Early data transmission feature is considered when AS security was not established for only transmitting data using CP.

Early data transmission feature is considered when AS security was established for transmitting data using CP and/or UP.

In this appendix, the details of the enhancements necessary for the early data transmission are discussed.

(2. Discussion)

In the following section, for simplicity, the early UL data transmission and the early DL data transmission are separately discussed and the existing random access procedure are taken as the baseline.

(2.1. Early UL Data Transmission)

(2.1.1. Clarifications in the Email Discussion)

SIB provides a specific preamble to be used in Msg1 if the UE intends to perform the early UL data transmission in Msg3. In other words, the early UL data transmission is not allowed if SIB does not contain such an indication with a specific preamble.

Msg1 includes the UE's intention with the specific preamble whether the early UL data transmission is in this random access procedure.

Msg2 indicates whether the UE's intention is accepted, in addition to the existing random access response.

Msg3 includes the data and an extended RRC Connection (Resume) Request to inform the eNB whether the data transmission is completed within this random access procedure, i.e., whether or not the UE needs to transition to RRC Connected.

Msg4 may be either RRC Connection Setup/Resume or RRC Connection Release, i.e., the network responds with Msg4 that confirms reception of Msg3 completes contention resolution and includes NAS PDU (if necessary).

From the eNB's perspective, at the minimum it's necessary for the SIB to indicate whether the early UL data transmission is allowed or not, i.e., the SIB Indication similar to up-CIoT-EPS-Optimization etc [3]. Then the UE may include the specific preamble in Msg1 to indicate to the eNB its intention to use early UL data transmission. However, even if the UE includes the specific preamble in Msg1, the eNB should still have the option to decide whether to accept the early UL data transmission, since there may be other reasons the eNB needs to reject the early UL data transmission e.g., overload. This may be conveyed to the UE via Msg2. So, there should be a two-step permission before the early UL data transmission is accepted.

Proposal 1 RAN2 should agree that the UE should transmit in Msg1 a specific preamble that is provided in SIB to inform the eNB of its intention to perform early data transmission in Msg3, while the eNB may indicate in Msg2 whether the early data transmission is acceptable or not.

Since one of main objectives of the early data transmission is to reduce UE's power consumption, the UE should be released to IDLE as soon as the data transmission is completed. The Release Assistance Indication (RAI) [3][4] may be reusable for this purpose. On the other hand, if a data packet to be sent is small and it can be sent in full within the limited size of Msg3, it is assumed the UE will not need to transition to RRC Connected. If the UE is allowed to request such a connection-less data transmission, the request needs to be conveyed to the eNB with one of the following options.

Option 1a: Set spare1 in Establishment Cause of RRC Connection Request and/or Resume Cause of RRC Connection Resume Request.

Option 1b: Spare IE is in RRC Connection Request and/or RRC Connection Resume Request.

Option 1c: Specify RAI (i.e., BSR=0) in Msg3.

A new RRC message, e.g., RRC Connection-less Request.

Options 1a-1c have less specification impact than Option 1d. In terms of signaling overhead, Options 1a and 1b are the same but better than Option 1c. With regard to the technical implication, Option 1b is more flexible than Option 1a since the early UL data transmission is in general not associated with Establishment/Resume Causes, especially considering potential needs in future releases. So, Option 1b is preferable.

Proposal 2: RAN2 should agree to include 1-bit indication in RRC Connection (Resume) Request, in order to inform the eNB whether the UL data transmission is completed within Msg3.

(2.1.2. Retransmission Scheme)

The WID mentions that the early data transmission is performed on a dedicated resource.

It should be further considered whether RAN2's current agreement for early UL data transmission is really supported with dedicated resource. RAN2 agreed "early UL data transmission in Msg3", wherein the Msg3 resource is allocated by dedicated UL grant in Msg2. The current Msg3 conveys either RRC Connection Request or RRC Connection Resume Request, over CCCH logical channel, which are eventually mapped to PUSCH through UL-SCH, but the contention of physical resource between UEs is not resolved yet, in case the early UL data transmission is supported only for UEs in IDLE, i.e., with contention-based random access procedure.

Observation 1: At Msg3, the contention is not resolved in the contention-based RACH procedure.

At Msg3, more UL interferences from multiple UEs can be expected since the contention has not been resolved. In other words, the reception error of early UL data in Msg3 may occur. In case the early UL data transmission is not successfully received, it's still unclear what the UE should do, i.e., how to retransmit the UL data that was not successfully received by the eNB.

Proposal 3: RAN2 should discuss how the UE should retransmit the early UL data if it was not successfully received by the eNB.

If Proposal 3 is agreeable, the four options for retransmission scheme may be considered.

Option 2a: The UE restarts the random access procedure from Msg1, i.e., the previous procedure is cancelled.

Option 2b: The UE may retransmit Msg3 with the failed data, i.e., "early UL data retransmission in Msg3".

Option 2c: The UE may retransmit the failed data in Msg5, i.e., when only the data fails.

Option 2d: The UE is allowed to retransmit the failed data only after in RRC Connected.

Option 2a is aligned with the current specification, i.e., flushing Msg3 buffer and restarting from Random Access Resource Selection. Even with Option 2a, it's unclear whether to apply the legacy backoff time or a new backoff time for early UL data retransmission, and whether or not the number of retransmission is limited. Option 2b can follow Option 2a, i.e., the UE include the failed data at the next Msg3 timing. Option 2c is maybe a rare case since it is unlikely the data wasn't received while the RRC Connection (Resume) Request was successfully received, assuming the same MCS is applied. Option 2d is the consistent with the current specification, except the retransmission of failed data is allowed.

Proposal 4: RAN2 should agree that if the early UL data transmission fails, the UE should restart the random access procedure (as it is today) and be allowed to retransmit the data in the next Msg3.

In any case, the UE should keep the data for early transmission until confirmation of successful reception, even if Msg3 buffer is flushed.

(2.2. DL Early Data Transmission)

(2.2.1. Consideration in the Email Discussion)

The email discussion jointly discussed on both the early DL data transmission and the early UL data transmission, so the DL aspects might not be considered in detail. In the following section, such details are discussed.

(2.2.2. UE's Support of Early DL Data Transmission)

RAN2 agreed "to support early DL data transmission in Msg4", wherein the UE needs to receive the data at Msg4 in addition to RRC Connection Setup/Resume/Release. However, it's questionable that the eNB always knows whether the UE is capable of the early DL data reception, especially for the UE that is completed released and not just suspended. Considering a unified solution for both CIoT EPS CP/UP optimizations, the UE may inform the NW, i.e., the eNB or the MME, whether it can receive the early DL data.

Proposal 5: RAN2 should agree that the UE should inform the NW whether it supports early DL data reception.

From the eNB's perspective, there are two options for conveying UE's capability to the NW, i.e., the MME or the UE. If the MME informs the eNB, it's obvious that some 51 messages need to be enhanced, e.g., PAGING or INITIAL CONTEXT SETUP REQUEST, wherein RAN2 has to consult with RAN3. On the other hand, if the UE informs the eNB, a couple of options may be considered as follows.

Option 3a: A new IE is added for the early DL data reception in UE Capability.

Option 3b: An indication is sent in Msg1 or Msg3, if the UE supports the early DL data reception.

Option 3a is straightforward method to provide UE's capability to the eNB, but the eNB needs to keep the context even if the UE is no longer in Connected or Suspended, since it's transferred after Msg4. Option 3b is a kind of "handshake", so the UE needs to know whether the early DL data reception is intended, before it starts, i.e., in Paging or Msg2.

Proposal 6: RAN2 should discuss how the eNB is informed whether the UE supports the early DL data reception, i.e., by the UE or the MME.

Regardless of Proposal 6, the UE has to know whether it's necessary to setup the early DL data reception before it happens.

Proposal 7: RAN2 should agree that the UE should be informed in Paging or Msg2 whether the early DL data reception is necessary.

(2.2.3. Retransmission Scheme)

It is assumed that the early DL data transmission is performed on a dedicated/non-contention resource, i.e., Msg4. However, the reception error will happen even with such a resource, so the UE behavior should be clarified. Once the early DL data transmission is indicated in Paging or Msg2, i.e., Proposal 7, it's simple for the UE to monitor the data to be sent on Msg4. Similar to Proposal 4, there also needs to be a means for retransmission of DL data in case the DL data was not received by the UE.

Proposal 8: RAN2 should agree that the early DL data retransmission is performed on Msg4, if Msg4 is failed to be received.

(2.2.4. Simultaneous Early UL/DL Data Transmissions)

It's still unclear whether early data transmissions should be supported for both UL and DL simultaneously within a single random access procedure. In general, an UL data transmission may need an upper layer acknowledgement over the following DL and vice versa, e.g., the TCP ACK. It would seem possible that the UE decides to transmit UL data transmission in Msg3 followed by the acknowledgement as DL data reception in Msg4 within one random access procedure. Note that it's obvious the DL data transmission in Msg4 cannot be followed by Msg3 in the same procedure. The upper layer acknowledgement as UL data transmission must be sent in the next Msg3, which will occur in the next random access procedure, or the UE could also transition to RRC Connected, but that would negate the purpose of sending the early DL data.

However, it's unclear how much latency such an upper layer acknowledgement needs. If the upper layer round trip is done within a random access procedure and the upper layer acknowledgement is delayed, the UE may continue monitoring Msg4 for a long time after Msg3 transmission, whereby It will cause UE's unnecessary power consumption. So, it's reasonable that either early UL data transmission or early DL data transmission is supported within one random access procedure.

Proposal 9: RAN2 should agree that one random access procedure supports only one early data transmission, i.e., either the early UL data transmission or the early DL data transmission.

APPENDIX 3

(1. Introduction)

RAN2#99bis achieved a significant progress on the Early Data Transmission (EDT) feature with many agreements as follows.

Agreements

PRACH partitioning is used to indicate UE's intention to use early data transmission in Msg3. Backward compatibility shall be preserved. Further consideration is needed: details on the PRACH pool, e.g., preamble/time/frequency/carrier domain of PRACH partitioning.

For CP during the UL EDT procedure, if the UE receives a grant in which data does not fit, the UE does not send the data in Msg3. For UP solution further consideration is needed if the EDT grant can be used for UL data if the grant is smaller than the UL data size.

Further consideration is needed if there is a need to introduce an authorization mechanism.

Maximum possible grant size for Msg3 is broadcast per CE. Further consideration is needed if the UE indicates the grant size it needs for Msg3 via PRACH partitioning.

Send an LS to RAN1 with the agreements we have from this meeting and indicate that we assume that the legacy TBS table for PUSCH transmission is used for EDT.

Msg4 decides whether the UE goes to RRC connected mode or RRC idle mode. The content of Msg4 for EDT is Further consideration needed.

The intention to use EDT is for data, i.e. not for NAS signaling.

Send an LS to RAN3/SA2/CT1 whether any of the following parameters which are included in Msg5 in legacy procedure should be included in Msg3 for EDT: selectedPLMN-Identity, registeredMME, gummeiType, attachWithoutPDN-Connectivity, up-CIoT-EPS-Optimisation, cp-CIoT-EPS-Optimisation, dcn-ID.

RAN2 assumes that S-TMSI for CP, and resumeID and shortResumeMAC-I for UP solutions are sufficient to identify UE at the MME and eNB respectively. We will provide this assumption in an LS. to RAN3, SA2, SA3, CT1.

For CP solution, NAS PDU for data is encapsulated in the RRC message sent in Msg3 and transmitted as CCCH SDU.

For UP solution SRB0 is used to transmit the RRC message in Msg3.

For UP solution, CCCH (RRC message) and DTCH (UP data) are multiplexed in MAC in Msg3.

For UP, AS security is resumed before transmitting Msg3, and data transmitted in Msg3 is protected by AS security.

For CP solution, NAS PDU data in the DL can be optionally encapsulated in the RRC message sent in Msg4 and transmitted as CCCH SDU.

For UP solution, DL data can be optionally multiplexed in MAC, i.e. DCCH (RRC message(s)) and DTCH (UP data) in Msg4.

Further consideration is needed: For UP solution: case for pinned connection, i.e. CCCH (RRC Connection Resume Req)+DCCH (NAS PDU via pinned connection)

In this appendix, the remaining issues to complete the basic functionality of EDT are discussed.

(2. Discussion)

(2.1. Use Cases)

During the discussion, it seems the common understanding that the EDT procedure is initiated by UL EDT for e.g., a sensor data on higher layer and it ends by DL EDT for e.g., a corresponding higher layer ACK, i.e., a higher layer round-trip is done within an EDT procedure.

Figure 26:
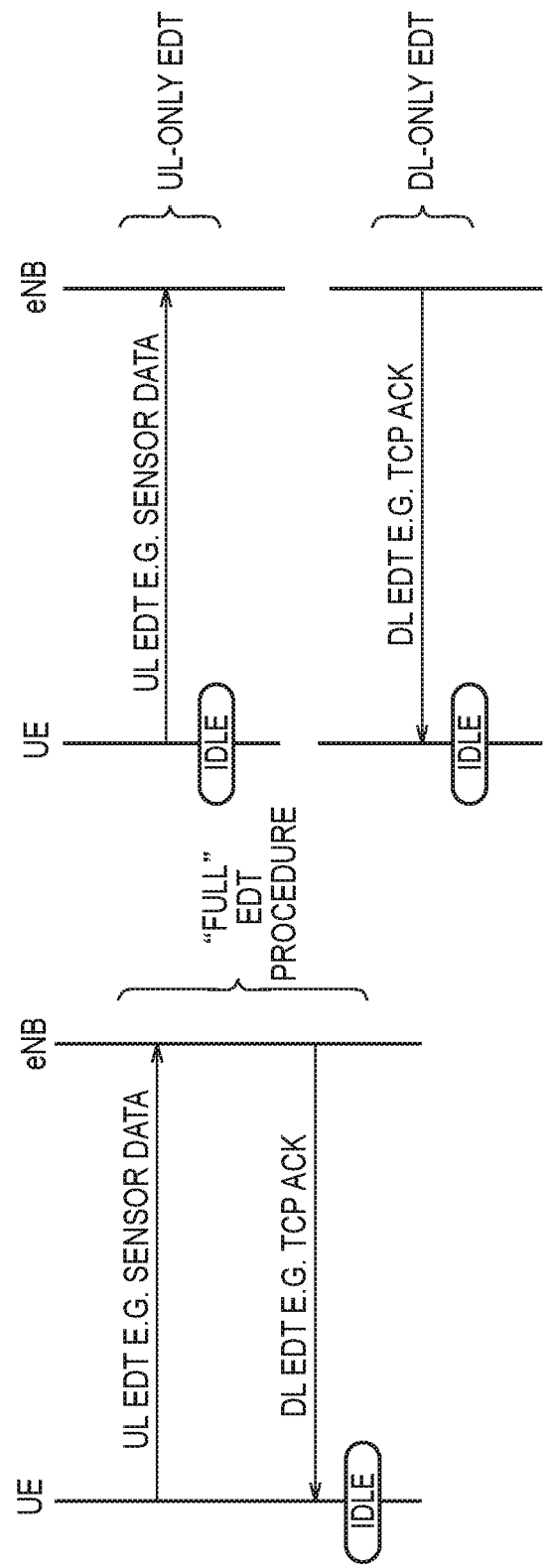
FIG. 26 is a diagram related to a supplementary note.

On the other hand, the UL-only EDT procedure and/or the DL-only EDT procedure are also useful in some cases; for example: (refer to FIG. 26 for more comparisons. FIG. 26 shows EDT procedure)

UDP type of data transmission, i.e., no ACK on higher layer.

Longer delay in higher layer round trip, i.e., higher layer ACK needs a certain time before response.

Command from an application server to a device, i.e., communication is triggered by DL.

It could be already considered that the UL-only EDT procedure is supported as RAN2 agreed that "For CP solution, NAS PDU data in the DL can be optionally encapsulated in the RRC message sent in Msg4 and transmitted as CCCH SDU" and "For UP solution, DL data can be optionally multiplexed in MAC, i.e. DCCH (RRC message(s)) and DTCH (UP data) in Msg4", i.e., the UE may receive Msg4 without data.

Observation 1: The UL-only EDT procedure is supported in the current agreements.

On the other hand, the support of DL-only EDT procedure is still unclear in the current agreements, since the availability of DL EDT transmission could not be known until reception of Msg4 from the UE's perspective and the capability of DL EDT reception could not be informed without UL EDT from the eNB's perspective, so far, if the assumed UL EDT-capable UEs also supports DL EDT. Therefore, further discussions should address some enhancements e.g., a notification in the paging, if the DL-only EDT procedure is supported.

Note: It's assumed that the UE being capable of UL EDT function is also capable of DL EDT function.

Proposal 1: RAN2 should discuss whether the DL-only EDT procedure is supported or not.

(2.2. Details of EDT Indication)

It was agreed in RAN2#99bis that "PRACH partitioning is used to indicate UE's intention to use early data transmission in Msg3. Backward compatibility shall be preserved. Further consideration is needed, details on the PRACH pool, e.g., preamble/time/frequency/carrier domain of PRACH partitioning." and "Maximum possible grant size for Msg3 is broadcast per CE. It is FFS if the UE indicates the grant size it needs for Msg3 via PRACH partitioning."

The email discussion discussed Further consideration is needed, i.e., the additional information on Msg1 and the PRACH partitioning details. Regarding the additional information on Msg1, it seems the majority's view that the EDT Indication is configured per CE but the UE Category is not necessary; No consensus on the grant size indication, which may be a future extension.

Proposal 2: RAN2 should agree that the EDT Indication on Msg1 is configured per CE, and the grant size indication on Msg1 should be considered as a future extension.

For the details of PRACH partitioning, the two directions for solution were suggested, i.e., the soft-partitioning (or the non-dedicated PRACH resource) and the hard-partitioning (or the dedicated PRACH resource). The issue is whether further PRACH fragmentation is acceptable, since it may cause PRACH performance degradation, especially in case of limited resources in some deployment scenario of NB-IoT.

Even though there are some advantages to sharing PRACH resources with soft-partitioning in e.g., non-optimized NW, the number of partitioning is no different from that of hard-partitioning. For example with the hard-partitioning, assuming 3 legacy CE levels, 3 EDT Indication for the 3 CE levels, it needs 6 partitions in a PRACH resource. For the soft-partitioning, it also needs 6 PRACH spaces (3 CE levels×2 different preambles). It means there is no physical tread-off, i.e., the difference is the design how to separate the UEs.

Note: With the hard-partitioning, the shared PRACH resource could be possible if the eNB configures the legacy PRACH resource and the EDT Indication PRACH resources with an overlapped resource.

Therefore, in our view, the PRACH performance is eventually similar in a well-optimized NW regardless of partitioning methods (e.g., soft or hard), and regardless of whether dedicated or non-dedicated resource.

Observation 2: PRACH performance will be eventually similar among the solutions that were suggested in the email discussion.

Figure 27:
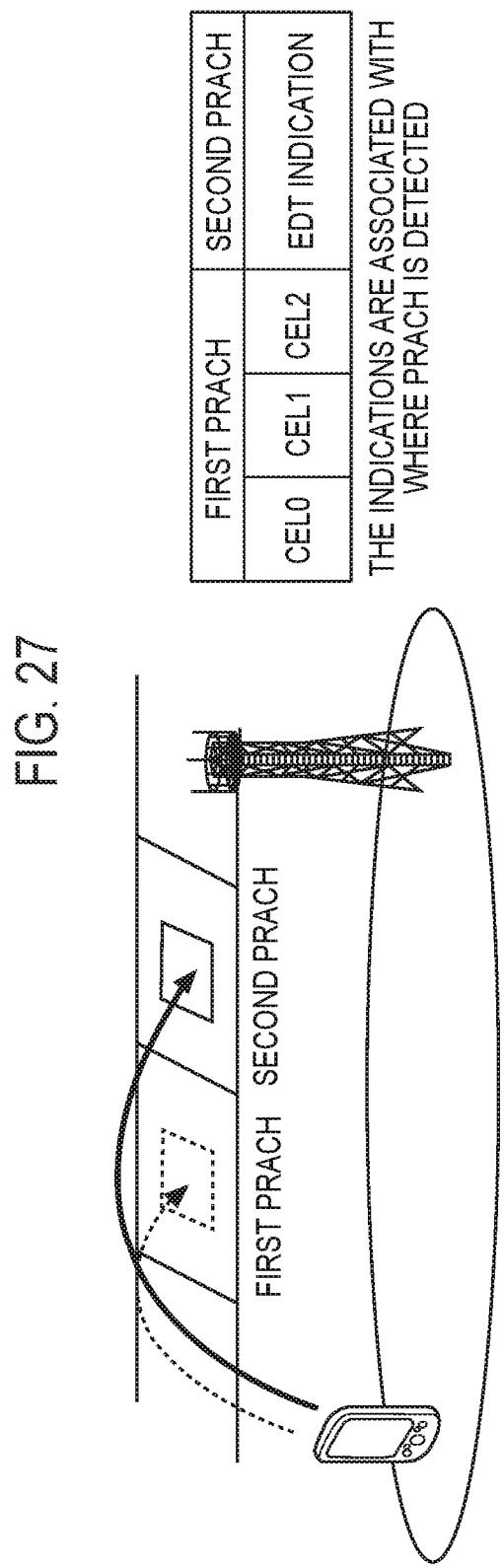
FIG. 27 is a diagram related to a supplementary note.

As an alternative solution not previously discussed in email, it should also be considered if multiple PRACH transmissions from an UE can be defined to differentiate between legacy PRACH and UL-EDT PRACH. For example, the UE sends the first PRACH for legacy purpose (i.e., CE level determination) and still sends the second PRACH for EDT Indication (i.e., only the UE requesting EDT sends the second one). The eNB may perform the blind-decoding over the two PRACH spaces for each PRACH shot (refer to FIG. 27. FIG. 27 shows EDT indication according to a plurality of PRACH transmissions). The two PRACHs can be sent over the same subframe. With this approach, only 4 PRACH resources could be necessary (3 CE levels for the first PRACH and 1 EDT Indication for the second one) and it's backward compatible since the legacy UE only sends the first PRACH as it is today. However, the drawback of this solution is obviously the UE needs the additional PRACH transmission, whereby it causes additional power consumption, but it may be similar to the power consumption due to PRACH performance degradation (e.g., collision).

Proposal 3: RAN2 should consider if the multiple PRACH transmissions with one additional PRACH space could be useful for the EDT Indication.

Proposal 4: If Proposal 2 and Proposal 3 are agreeable, RAN2 should later consider if the grant size indication is mapped onto an additional PRACH space.

(2.3. EDT Failure Cases)

(2.3.1. UL Grant Failure (Msg1/Msg2))

RAN2 agreed, "For CP during the UL EDT procedure, if the UE receives a grant in which data does not fit, the UE does not send the data in Msg3. For UP solution it is FFS if the EDT grant can be used for UL data if the grant is smaller than the UL data size." It means at least for CP solution, even if the UE sends the EDT Indication on Msg1, the eNB may reject the EDT procedure with the legacy size UL grant on Msg2. It could be considered as a failure case from the EDT procedure point of view.

Observation 3: The EDT procedure fails when the UL grant does not fit to the data size, at least for CP solution.

The current agreements only say the condition whether the data can be transmitted on Msg3, i.e., there's no mention of what the UE should do if the UL grant is smaller than it expected. Thus, the UE behavior upon the failure should be specified for e.g., testing. A couple of options should be considered as follows.

Option 1: The UE transmits the legacy Msg3 (i.e., without data).

Option 2: The UE may retry the EDT procedure (i.e., start over from Msg1).

Option 1 may be the baseline from our impression during the discussion. Option 2 is somewhat different from the current behavior, i.e., the UE skips PUSCH transmission even though it receives the corresponding UL grant. However, since the EDT is a new function, it's still worth considering to optionally introduce Option 2, e.g., only when the eNB allows this functionality, to minimize unnecessary UE power consumption to transition to RRC Connected.

Proposal 5: RAN2 should agree that the UE transmits the legacy Msg3 if the UL grant size is not enough for UL EDT, at least for CP solution.

Proposal 6: RAN2 should discuss whether the UE is optionally allowed to retransmit the EDT Indication if the UL grant size is not large enough.

(2.3.2. Reception Failure (Msg3/Msg4))

It has not been discussed how to handle the reception failure of data in EDT procedure.

In UL EDT discussion so far, the UE behavior only assumed the case when the UE does receives Msg4, but it's not yet clear what happens if the UE does not receive Msg4. Although some options were discussed, it may be simpler if the UE follows the current random access procedure, i.e., restarting from Random Access Resource selection, whereby UL EDT may be also retried.

Proposal 7: RAN2 should agree that the UE restarts the random access procedure (and UL EDT procedure) from Random Access Resource selection, if the contention resolution is considered not successful, as it is today.

It should be discussed where the data for retransmission is stored since currently the HARQ buffer is flushed when the contention resolution is considered not successful. From the CP solution's perspective, the traffic data is encapsulated as NAS PDU within an RRC message. It may be possible to encapsulate the traffic data in the RRC layer until the data transmission is successfully completed. On the other hand, from the UP solution's perspective the traffic data on DTCH is multiplexed in the MAC layer, so the traffic data cannot be stored in the RRC layer but in one of user plane layers. From the perspective of having common UE behavior for CP and UP, the MAC layer should also not flush the HARQ buffer even if the contention resolution is considered not successful.

Observation 4: It's unclear which layer stores the data until UL EDT is successfully completed, in RRC or MAC.

Proposal 8: RAN2 should agree that MAC layer handles the data retransmission in UL EDT.

In DL EDT, the reception failure of Msg4 is indicated by HARQ feedback. So, the retransmission of data may simply follow the current HARQ retransmission.

Proposal 9: RAN2 should agree that DL EDT retransmission is performed over Msg4 HARQ retransmission, as same with today.

(2.3.3. T300 and Contention Resolution Timer Failures (Msg3/Msg4))

In the current specification, there are two timers running between Msg3 and Msg4, T300 in RRC and mac-Contention Resolution Timer in MAC. The T300 values are 100 ms-2000 ms for LTE and 2500 ms-60000 ms for NB-IoT. The mac-Contention Resolution Timer values are sf8~sf64 for LTE and pp1~pp64 for NB-IoT. When these timers expire, the UE considers the RRC Connection Establishment/Resume or the Contention Resolution is not successful respectively.

In case that UL EDT is for sensor data transmission and DL EDT is for TCP ACK (i.e., "Full EDT procedure" in FIG. 26), the Msg4 transmission in the EDT procedure will likely be delayed more than legacy Msg4 since it depends on the round-trip time in higher layer. So, it's straightforward to define longer timer values to prevent unnecessary failure.

Proposal 10: RAN2 should define the longer value for the timer that runs between UL EDT on Msg3 and DL EDT on Msg4.

However, it may cause additional UE power consumption due to continuous PDCCH monitoring until reception of Msg4. So, some kind of DRX-like reception mode should be introduced in the EDT procedure.

Proposal 11: RAN2 should consider if a discontinuous reception is allowed in EDT procedure (i.e., after Msg3 transmission until Msg4 reception).

In addition, it's questionable how the eNB configures the timer values, since it's unknown when the TCP ACK returns due to higher layer message. It's assumed that there are number of UEs implementing various applications in a cell, so it seems difficult to set appropriate timer values for all UEs.

One possibility would be the dedicated configuration on Msg2, but it's still difficult to determine the timer value without application layer knowledge. On the other hand, the UE may help to set suitable timer value based on it's timeout setting in higher layer. For example, the UE may inform the eNB of the self-configured timer value on Msg3.

Proposal 12: RAN2 should consider if the UE is allowed to inform the eNB of the self-configured timer value on Msg3.

If one of Proposal 10~Proposal 12 is agreeable, the concept of timers for EDT is different from legacy timers. Also, it's still possible that the UE capable of EDT will initiate legacy RRC Connection Establishment/Resume due to e.g., larger packet transmission, whereby the legacy timers shall be applicable in this case. So, it's worth discussing whether the timer for EDT reuses legacy timer(s) or defines a new timer.

Proposal 13: RAN2 should discuss whether the timer for EDT reuses legacy timer(s) or defines a new timer.

Figure 28:
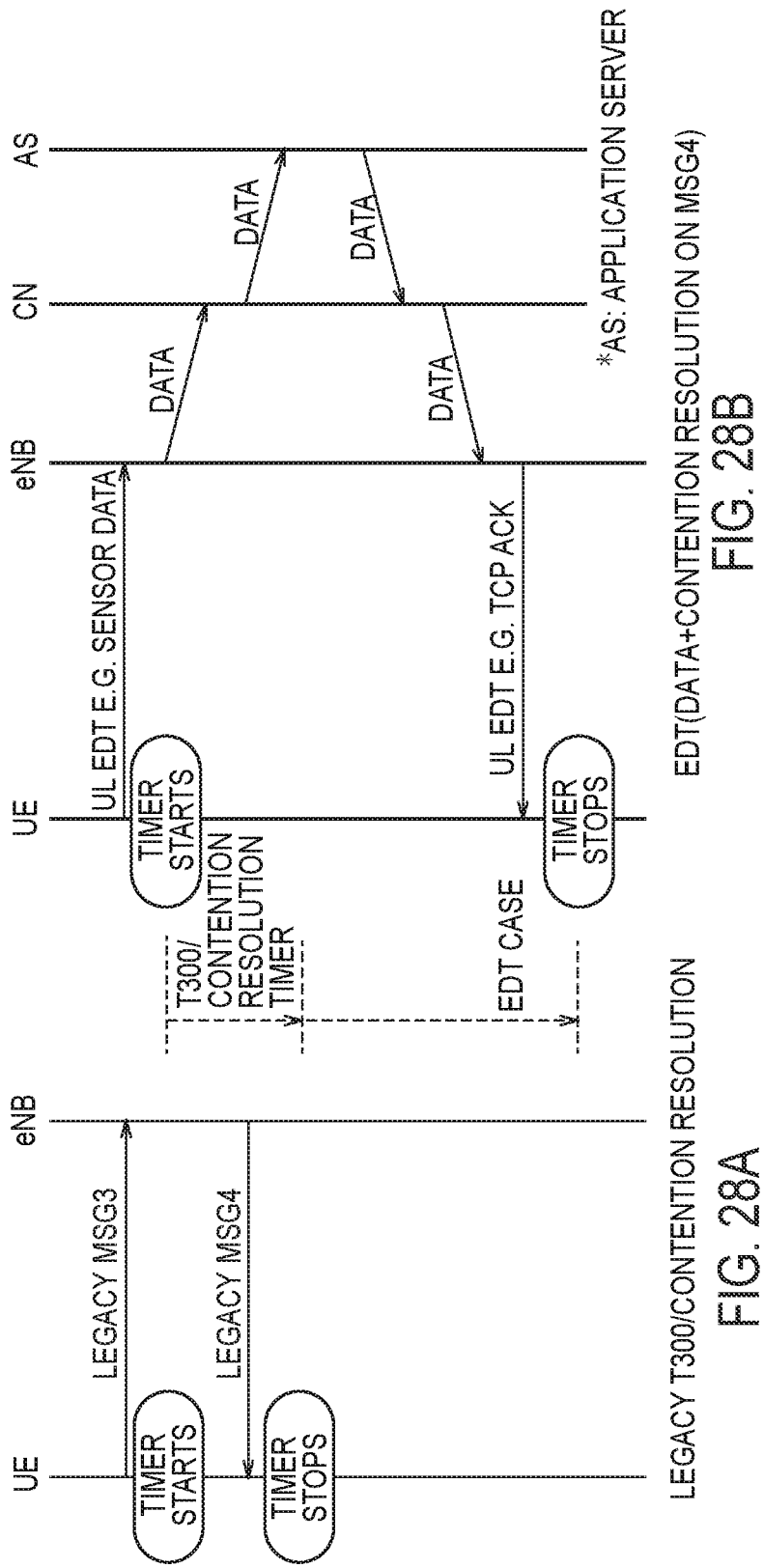
FIGS. 28A and 28B are diagrams related to a supplementary note.

FIGS. 28A and 28B show delay due to round-trip time in higher layer.

(2.4. Authorization Mechanism)

It was captured in the chairman's note that "Further consideration is needed if there is a need to introduce an authorization mechanism", such an authorization mechanism was out of scope in the email discussions.

In our understanding, EDT is an AS functionality and is not costly from the standpoints of NW and UE (unlike CE). In addition, the NW may always disable EDT function e.g., by removing the PRACH partitioning parameters and/or the maximum possible grant size from SIB. So, there is no technical reason to introduce the authorization mechanism.

Proposal 14: RAN2 should agree that any authorization mechanism for EDT is unnecessary.

APPENDIX 4

(1. Introduction)

RAN2#100 discussed the details of Early Data Transmission (EDT) Indication over Msg1 and achieved the following agreements.

Agreements

The UE initiates EDT in Msg1 when the size of Msg3 including the user data, which UE intends to transmit, is equal or smaller than the maximum possible TBS size for Msg3 broadcast per CE.

PRACH partitioning for EDT indication is configured per enhanced coverage level.

Working assumption: Support for segmentation for this case is not prioritized.

Working assumption: PRACH resource partitioning is not supported to indicate the intended data size other than legacy or maximum TBS broadcast per CE.

how to adress the padding issue in Msg3.

UE category is not indicated in Msg1.

For EDT indication, PRACH resources can be configured as in legacy eMTC or NB-IoT with respect to physical layer resources, preambles/subcarriers.

PRACH resource pool, i.e. physical layer resources, preambles/subcarriers, for EDT indication is separate from PRACH resource pool for legacy RACH procedure.

It was identified as FFS on how to address the padding issue; the problem occurs when the UL grant for UL EDT mismatches the data size that the UE intends to transmit. The details of issue is well described in the corresponding email discussion.

In this appendix, the supplementary explanations for the email discussion are provided.

(2. Discussion)

The solutions for the padding issue are suggested and summarized in the email discussion as follows.

The following solutions for the padding issue were presented above.

1. (N)PRACH partitioning where UE indicates the intended data size/TBS for EDT Msg3 using Msg1.

2. The network provides multiple transport block sizes along with a combination of UL grant information, e.g. RUs, PRBs, number of repetitions, in RAR message for the UE to select from considering the intended data transmission in Msg3

3. The network provides dual (or more) grants for Msg3 transmission.

4. Combination of expressing data size with Msg1 and flexible grant in RAR.

5. Repetition of MAC SDUs or PDUs in padding region (the details of this solution are not clear, it would be good to elaborate for better understanding)

6. Implicit allocation, e.g., multiple common UL resource pools for Msg3 transmission that are associated with multiple "maximum TBS broadcast per CE" (the details of this solution are not clear, it would be good to elaborate for better understanding).

7. For UP only: segmentation to avoid padding for legacy Msg3 transmission.

(2.1. Solution 5 (Repetition of MAC PDU))

Figure 29:
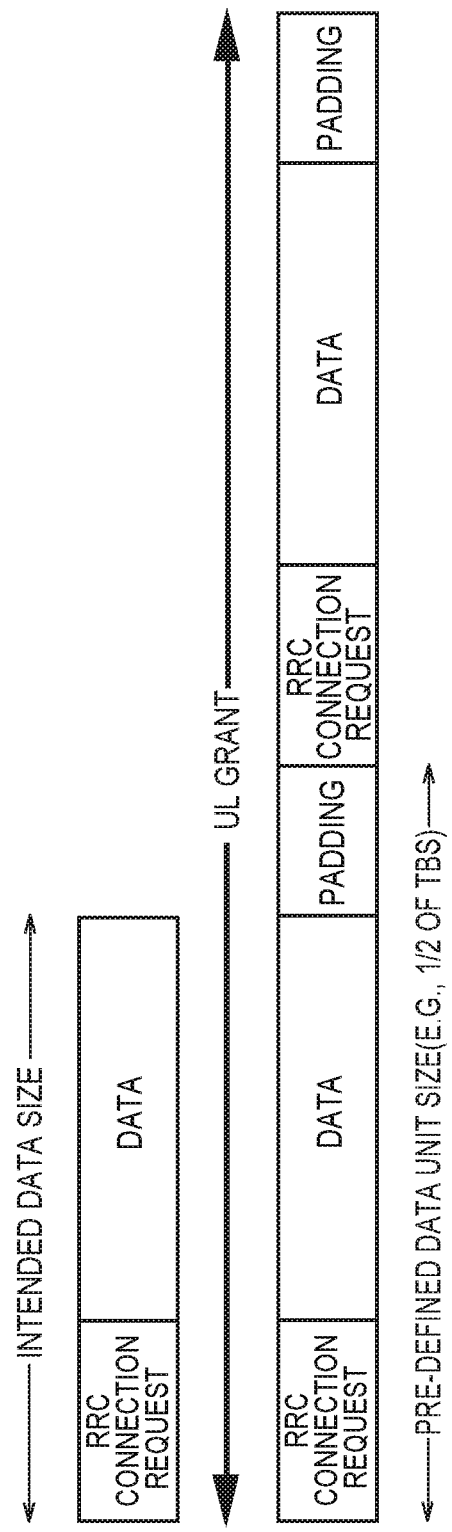
FIG. 29 is a diagram related to a supplementary note.
Figure 30:
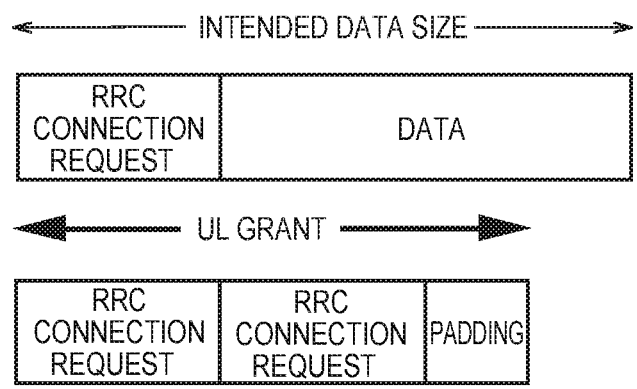
FIG. 30 is a diagram related to a supplementary note.

This solution uses the padding region as the redundancy opportunity. In other words, the existing repetition scheme over subframes is done within a transmission. The examples are shown in FIG. 29 and FIG. 30. FIG. 29 shows in case UL grant is larger than intended data size. FIG. 30 shows in case UL grant is smaller than intended data size.

Further consideration is needed which entity in a layer should perform the additional redundancy process, while one possibility is in the physical layer. For example, the UE generates the bit string from MAC PDU, stores in the circular buffer and transmits the bits according to the UL grant size.

The pros and cons are expected as follows:

Pros: Possibility of the Rx soft combining gain and/or Tx power reduction to compensate for the repetition, compared to the transmission of padding bits.

Cons: There may be RAN1 impacts if the repetition is handled in the physical layer.

(2.2. Solution 6 (Common UL Resource Pools))

This solution provides the common UL resource pools for EDT, whereby the resource pool is similar to Mode 2/Type 1 Sidelink transmissions, i.e., common resource used by multiple UEs. It could be assumed the legacy Msg3 resource is always provided by the UL grant (as it is today), but the UE is allowed to transmit the data part using the common resource pool, with the same temporary C-RNTI used in the legacy Msg3 transmission. The configuration of the common resource pool is provided in SIB. This solution may be seen as a "semi-static" version of multiple UL grant solution, whereby the second granted resource intended for data may be shared by multiple UEs.

Figure 31:
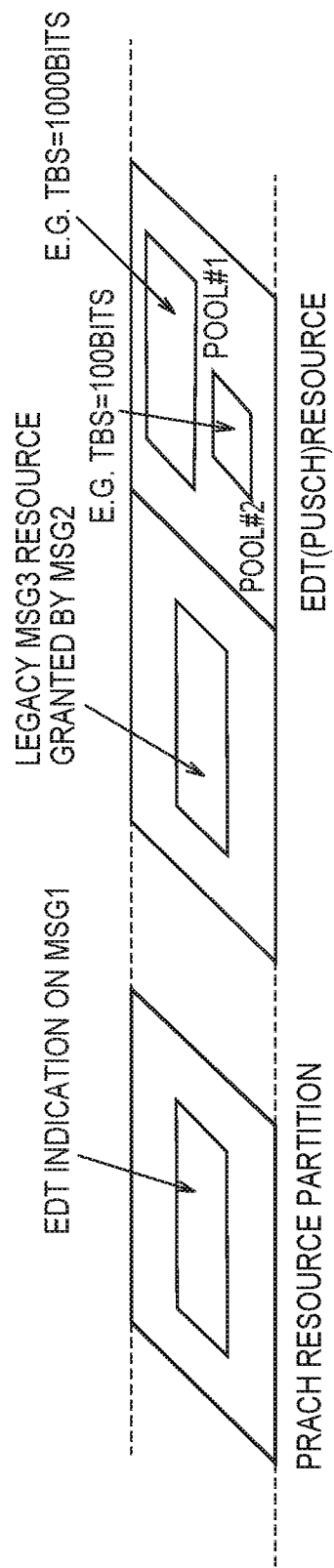
FIG. 31 is a diagram related to a supplementary note.

FIG. 31 shows common resource pool for UL transmission.

The pros and cons are considered as follows.

Pros: No change to Msg2 is needed. The UE may transmit the data without padding (unless the size exceeds the common resource), assuming Sidelink-like transmission. If we consider EDT to be an IDLE mode procedure, the use of common resource is also reasonable, similar to the case for Mode2/Type1 resources. This means resources can be allocated without dedicated signaling which again reinforces the idea that Msg2 doesn't need to be modified.

Cons: Collision happens with the use of common resource.

APPENDIX 5

(1. Introduction)

RAN2#100 achieved to form the outlook of Early Data Transmission (EDT) feature with significant progress. For the details, however, there are still many further considerations needed and one of them is as follows.

Agreements

For CP solution

[ . . . ]

Further considerations is needed whether changes to T300 and mac-contention Resolution Timer are needed.

In this appendix, further consideration of the timer aspect is discussed.

(2. Discussion)

(2.1. Assumptions)

During the discussion, it seems to be the common understanding that the EDT procedure is initiated by UL EDT e.g., a sensor data on higher layer and it ends with DL EDT e.g., a corresponding higher layer ACK, i.e., a higher layer round-trip is done within an EDT procedure (i.e., refer to the "Full EDT procedure" in FIG. 26).

Observation 1: Typical EDT procedure contains UL EDT and DL EDT (within a random access procedure).

On the other hand, the UL-only EDT procedure and/or the DL-only EDT procedure are also useful in the following cases (refer to FIG. 26 for more comparisons).

UDP type of data transmission, i.e., no ACK on higher layer.

Longer delay in higher layer round trip, i.e., higher layer ACK needs a certain time before response.

Command from an application server to a device, i.e., communication is triggered by DL.

The DL data in Msg4 is optionally transmitted regardless of CP/UP, i.e., "For CP solution, NAS PDU data in the DL can be optionally encapsulated in the RRC message sent in Msg4 and transmitted as CCCH SDU" and "For UP solution, DL data can be optionally multiplexed in MAC, i.e. DCCH (RRC message(s)) and DTCH (UP data) in Msg4."

Observation 2: The UL-only EDT procedure is supported based on the current agreements.

On the other hand, the support of DL-only EDT procedure is still unclear based on the current agreements, since the UE does not know whether DL EDT transmission will occur until it receives Msg4 and the eNB does not know the UE's capability for DL EDT reception until it receives UL EDT from the UE.

Proposal 1: RAN2 should discuss whether the DL-only EDT procedure is supported or not.

(2.2. T300 and Contention Resolution Timer)

(2.2.1. Msg4 Delay Issue)

In the current specification, there are two timers running between Msg3 and Msg4, T300 in RRC and mac-Contention Resolution Timer in MAC. The T300 values varies from 100 ms-2000 ms for LTE and 2500 ms-60000 ms for NB-IoT. The mac-Contention Resolution Timer value varies from sf8~sf64 for LTE and pp1~pp64 for NB-IoT. When these timers expire, the UE considers the RRC Connection Establishment/Resume or the Contention Resolution is not successful respectively. While it's still not yet clear what the UE behavior should be if these existing timers were to expire under EDT, it's also true that the current random access procedure is the baseline of EDT procedure. Thus, further consideration is needed regarding the timers.

In case sensor data is transmitted over UL EDT and the corresponding TCP ACK is transmitted over DL EDT (i.e., refer to the "Full EDT procedure" in FIG. 26), the Msg4 transmission in the EDT procedure will likely be delayed more than legacy Msg4 since it depends on the round-trip time from the higher layer (as shown in FIG. 2).

Observation 3: The duration between Msg3 and Msg4 in EDT becomes longer than legacy, due to the round-trip time from the higher layer.

Therefore, it's straightforward to define longer timer values to prevent unnecessary failure due to T300 expiry.

Proposal 2: RAN2 should define longer value for the timer that runs between UL EDT on Msg3 and DL EDT on Msg4, to prevent unnecessary failure due to Full EDT procedure expiry.

(2.2.2.: DRX for Msg4 Reception)

If Proposal 2 is agreeable, it would be straightforward to extend the timer values of the existing T300 and mac-Contention Resolution. However, it may cause additional UE power consumption due to continuous PDCCH monitoring until reception of Msg4, whereby the Msg4 may be delayed in EDT as discussed in the previous section. To avoid such unnecessary power consumption, some kind of DRX-like reception mode should be introduced in the EDT procedure.

For example, as a simple solution, the UE may monitor PDCCH only in a subframe just before the timer expires, i.e., "one-shot" monitoring. It could work better than the continuous monitoring under some MTC/NB-IoT use cases like the high latency communication.

Proposal 3: RAN2 should consider if a discontinuous reception is allowed in EDT procedure (i.e., after Msg3 transmission until Msg4 reception).

(2.2.3. Configuration of Timer Value)

In addition, it is questionable how the eNB configures the timer values, since it is unknown to the eNB when the TCP ACK will arrive from the higher layer message. It is assumed that there are a number of UEs implementing various applications in a cell, so it will be difficult for the eNB to set appropriate timer values for all UEs.

Observation 4: It would be difficult to configure appropriate timer value, considering different UEs may use different applications.

One possibility would be to configure timers using dedicated signaling for Msg2, but it is still difficult to determine the timer value without application layer knowledge at the eNB. On the other hand, the UE may help to set suitable timer value based on its timeout setting in the higher layer. For example, the UE may inform the eNB of the self-configured timer value on Msg3.

Proposal 4: RAN2 should consider if the UE is allowed to inform the eNB of the self-configured timer value on Msg3.

(2.2.4. Definition of Timer)

If one or more of the above proposals (Proposal 2~Proposal 4) are agreeable, the concept of timers for EDT will be different from legacy timers. It is still also possible that the UE capable of EDT will initiate legacy RRC Connection Establishment/Resume due to e.g., larger packet transmission, whereby the legacy timers shall be applicable in this case. In this sense, it would be a simpler to keep the existing timers as they are and define a new timer specific for EDT, instead of extending the existing timers.

Proposal 5 RAN2 should agree to define a new timer that runs between UL EDT (over Msg3) and DL EDT (over Msg4), instead of legacy timers.

APPENDIX 6

(1. Introduction)

RAN2#100 achieved to form the outlook of Early Data Transmission (EDT) feature with significant progress. For the details, however, there are still many further considerations needed and one of them is as follows.

Agreements

For CP solution

[ . . . ]

Further considerations is needed whether changes to T300 and mac-contention Resolution Timer are needed.

In this appendix, further consideration of the timer aspect is discussed.

(2. Discussion)

(2.1. Assumptions)

Proposal 1: RAN2 should discuss whether the DL-only EDT procedure is supported or not.

(2.2. T300 and Contention Resolution Timer)

(2.2.1. Msg4 Delay Issue)

Observation 1: The duration between Msg3 and Msg4 in EDT is longer than before due to round-trip time from a higher layer.

For mac-Content Resolution Timer, early contention resolution could be used to prevent timer expiration. In the case of NB-IoT UE, it is agreed that Rel-14 and later support early contention resolution, but whether it is optional requires further consideration.

Proposal 2: If early contention resolution is supported by an EDT-enabled NB-IoT UE, RAN2 should agree that no change to mac-Contention Resolution is required.

T300 is directly affected by the round-trip time from the upper layer. It has been proposed to extend the timer value in consideration of retransmission and retransmission of CE mode B.

Therefore, it is easy to define a longer timer value to prevent unnecessary failures due to the expiration of T300.

Proposal 3: RAN2 should define longer value for the timer that runs between UL EDT on Msg3 and DL EDT on Msg4, to prevent unnecessary failure due to T300 expiry.

(2.2.2.: DRX for Msg4 Reception)

If Proposal 3 is agreeable, it would be straightforward to extend the timer values of the existing T300. However, it may cause additional UE power consumption due to continuous PDCCH monitoring until reception of Msg4, whereby the Msg4 may be delayed in EDT as discussed in the previous section. To avoid such unnecessary power consumption, some kind of DRX-like reception mode should be introduced in the EDT procedure.

For example, as a simple solution, the UE may monitor PDCCH only in a subframe just before the timer expires, i.e., "one-shot" monitoring. It could work better than the continuous monitoring under some MTC/NB-IoT use cases like the high latency communication.

Proposal 4: RAN2 should consider if a discontinuous reception is allowed in EDT procedure (i.e., after Msg3 transmission until Msg4 reception).

(2.2.3. Configuration of Timer Value)

In addition, it is questionable how the eNB configures the timer values, since it is unknown to the eNB when the TCP ACK will arrive from the higher layer message. It is assumed that there are a number of UEs implementing various applications in a cell, so it will be difficult for the eNB to set appropriate timer values for all UEs.

Observation 4: It would be difficult to configure appropriate timer value, considering different UEs may use different applications.

One possibility would be to configure timers using dedicated signaling for Msg2, but it is still difficult to determine the timer value without application layer knowledge at the eNB. On the other hand, the UE may help to set suitable timer value based on its timeout setting in the higher layer. For example, the UE may inform the eNB of the self-configured timer value on Msg3.

Proposal 5: RAN2 should consider if the UE is allowed to inform the eNB of the self-configured timer value on Msg3.

(2.2.4. Definition of Timer)

If one or more of the above proposals (Proposal 3~Proposal 5) are agreeable, the concept of timers for EDT will be different from legacy timers. It is still also possible that the UE capable of EDT will initiate legacy RRC Connection Establishment/Resume due to e.g., larger packet transmission, whereby the legacy timers shall be applicable in this case. In this sense, it would be a simpler to keep the existing timers as they are and define a new timer specific for EDT, instead of extending the existing timers.

Proposal 6 RAN2 should agree to define a new timer that runs between UL EDT (over Msg3) and DL EDT (over Msg4), instead of legacy timers.

APPENDIX 7

(1. Introduction)

RAN2#101 agreed the solution for the padding issue in UL EDT as follows.

Agreements

The EDT UL grant shall always allow the max TB size broadcasted in system information unless the provided UL grant is for legacy Msg3.

The EDT UL grant shall allow the UE to choose an appropriate TB size, MCS, repetitions, and RUs (for NB-IoT) from a set of TB sizes provided based on the UL data. It is FFS how the set of possible TB sizes, MCS, repetitions, and RUs (for NB-IoT) is provided, e.g. hardcoded in the specs. This is pending RAN1 confirmation.

RAN2 assumes that 8 possible candidate values for the maximum TB size broadcasted in system information. RAN2 assumes that for each maximum TB size broadcasted, up to 4 possible TB sizes, i.e. blind decoding options, are allowed.

For eMTC, the reserved bit in MAC RAR can be used for the EDT feature in eMTC only if it is necessary.

Send an LS reply to RAN1 capturing the agreements above including the agreement on the maximum and minimum possible TB sizes and ask RAN1 for confirmation.

In this appendix, further consideration on how the solution works is discussed.

(2. Discussion)

The association of TBS in the solution under current assumptions could be depicted as shown in FIG. 32. FIG. 32 shows UL grant size and actual UL transmission for EDT.

From the UE's point of view, the UL grant for EDT with the 4 blind decoding options allows the UE to select the TBS that minimizes the required padding bits. However, if the granted UL data size for EDT does not "fit" (at least for CP solution) the UE may initiate the legacy procedure and transitions to RRC Connected. So, from the UE's perspective, the maximum TBS and number of blind coding options should be set as high as possible.

Observation 1: The UE may initiate EDT when the maximum TBS and/or blind decoding options is a good "fit" with its UL data size.

In contrast, from the NW's point of view, the maximum TBS should be set to as low a value as practically feasible in order to minimize resource waste. So, the configuration of the maximum TBS value would tend to be more conservative in some implementations. However, this configuration will have a direct impact on how many UEs utilize EDT, i.e., in terms of whether the NW supports UE's low power operation. As the NW may not be aware of the required UL data sizes of the UEs with the various MTC applications, it is not yet clear if the NW implementation has the proper means for optimizing the maximum TBS and blind decoding options.

Observation 2: The usefulness of EDT will depend on optimal maximum TBS configuration.

Observation 3: The configuration of the maximum TBS and the blind decoding options should be based on the UL data size requirements of the MTC applications.

In view of the above observations, it should be considered as part of NW optimization whether the UE should provide feedback regarding its intended application, esp. in regards to the UL data size.

Before the UE transitions back to RRC IDLE (e.g., sending RAI), the UE could have the opportunity to inform the eNB of its preferred TBS for EDT, as an assistance information. The assistance information will make sense in the following cases.

Case 1: Similar to BSR, the information may be used as the expected data size for the next EDT, whereby it will be one of references to change the configurations in SIB.

Case 2: Similar to UE Capability, the information may be used to determine whether NCC should be provided to the UE for the next EDT possibility.

Case 3: Similar to MDT, the information may be used in statistical analysis and for NW optimizations.

Therefore, the assistance information associated with EDT operation should be introduced.

Proposal 1: RAN2 should agree to allow the UE to send the assistance information for TBS configuration optimization, e.g., its preferred TBS.

In addition, there may be the case that the UE falls back to legacy by itself, i.e., the UE sends legacy Msg3 even after sending EDT Indication in Msg1 and receiving UL grant for EDT, due to e.g., additional UL data is generated by applications. If the case should be taken into account, the EDT UL grant should always allow the blind decoding option for legacy Msg3 size, in addition to the agreed 4 options.

Proposal 2: RAN2 should discuss whether the EDT UL grant should always allow the blind decoding option for legacy Msg3 size, in addition to the agreed 4 options.

The invention claimed is:

1. A communication control method in a mobile communication system, comprising:
receiving from a base station, by a user equipment in RRC connected mode, an RRC connection release message for transitioning the user equipment from the RRC connected mode to an RRC idle mode, wherein the RRC connection release message includes information for the user equipment to determine whether the user equipment is able to perform early data transmission which transmits uplink user data using a message during a random access procedure;
transitioning to the RRC idle mode, by the user equipment;
transmitting, by the base station, a system information block (SIB) indicating an allowable amount of uplink data allowed to be transmitted in the early data transmission;
receiving, by the user equipment in the RRC idle mode, the SIB;
determining, by the user equipment, to perform the early data transmission when an amount of transmission data to the base station is less than or equal to the allowable amount of data indicated by the SIB; and
transmitting, by the user equipment, the allowable amount of uplink data during the random access procedure.

2. The communication control method according to claim 1, further comprising:
selecting, by the user equipment, a PRACH resource used for a random access preamble transmission from among PRACH resources used for the early data transmission, after determining to perform the early data transmission; and
transmitting, by the user equipment, the random access preamble to the base station using the selected PRACH resource.

3. The communication control method according to claim 2,
wherein the PRACH resource used for the early data transmission is provided for each extended coverage level, and
the selecting includes selecting a PRACH resource corresponding to the extended coverage level applied to the user equipment.

4. The communication control method according to claim 2, further comprising:
transmitting, by the base station to the user equipment, a random access response including an uplink grant in response to a reception of the random access preamble, wherein the random access response includes information indicating whether the uplink grant is used for the early data transmission.

5. The communication control method according to claim 4, further comprising:
receiving, by the user equipment, the random access response from the base station; and
terminating, by the user equipment, the early data transmission when the uplink grant included in the random access response is not used for the early data transmission.

6. The communication control method according to claim 1, further comprising:
receiving, by the user equipment in the idle mode, a predetermined message for maintaining the use equipment in the idle mode, from the base station after the message used for the early data transmission is transmitted to the base station.

7. The communication control method according to claim 6, wherein
receiving the predetermined message including receiving downlink early data together with the predetermined message from the base station.

8. A user equipment including a processor, the processor being configured to:
receive from a base station, when the user equipment is in RRC connected mode, an RRC connection release message for transitioning the user equipment from the RRC connected mode to an RRC idle mode, wherein the RRC connection release message includes information for the user equipment to determine whether the user equipment is able to perform early data transmission which transmits uplink user data using a message during a random access procedure;
transition to the RRC idle mode;
receive from a base station, a system information block (SIB) indicating an allowable amount of uplink data allowed to be transmitted in the early data transmission;
determine to perform the early data transmission when an amount of transmission data to the base station is less than or equal to the allowable amount of data indicated by the SIB; and
transmit, by the user equipment, the allowable amount of uplink data during the random access procedure.

9. A base station comprising:
a processor configured to:
transmit an RRC connection release message for transitioning a user equipment from an RRC connected mode to an RRC idle mode, wherein the RRC connection release message includes information for the user equipment to determine whether the user equipment is able to perform early data transmission which transmits uplink user data using a message during a random access procedure;
transmit system information block (SIB) indicating an allowable amount of uplink data allowed to be transmitted in the early data transmission;

receive, from the user equipment, early data transmission in which an amount of transmission data is less than or equal to the allowable amount of data indicated by the SIB; and receive, from the user equipment, the allowable amount of uplink data during the random access procedure.

* * * * *